(12) United States Patent
Cai

(10) Patent No.: US 11,944,918 B1
(45) Date of Patent: Apr. 2, 2024

(54) ASSEMBLY ROBOT TOY

(71) Applicant: Zeluan Cai, Guangdong (CN)

(72) Inventor: Zeluan Cai, Guangdong (CN)

(*) Notice: Subject to any disclaimer, the term of this patent is extended or adjusted under 35 U.S.C. 154(b) by 0 days.

(21) Appl. No.: 18/454,427

(22) Filed: Aug. 23, 2023

(30) Foreign Application Priority Data

Aug. 18, 2023 (CN) .......................... 202311047616.X

(51) Int. Cl.
*A63H 33/04* (2006.01)
*A63H 17/26* (2006.01)
*A63H 31/00* (2006.01)

(52) U.S. Cl.
CPC ............. *A63H 33/04* (2013.01); *A63H 17/26* (2013.01)

(58) Field of Classification Search
CPC ...... A63H 17/26; A63H 33/04; A63H 33/042; A63H 31/00; A63H 33/26; Y10S 901/01; B25J 9/08; G05B 2219/40304
USPC .................. 446/90, 91, 102, 103; 901/1, 23; 318/568.11, 568.12
See application file for complete search history.

(56) References Cited

U.S. PATENT DOCUMENTS

| | | | | |
|---|---|---|---|---|
| 4,183,173 A * | 1/1980 | Ogawa | ................ | A63H 33/003 446/92 |
| 4,712,184 A * | 12/1987 | Haugerud | ................ | B25J 5/007 377/16 |
| 5,241,875 A * | 9/1993 | Kochanneck | .......... | H02K 11/20 310/112 |
| 5,411,428 A * | 5/1995 | Orii | ....................... | A63H 33/042 446/128 |
| 5,779,515 A * | 7/1998 | Chung | ................... | A63H 33/04 446/90 |
| 5,890,943 A * | 4/1999 | Poulsen | ............... | A63H 33/042 446/128 |
| 6,084,373 A * | 7/2000 | Goldenberg | ............... | B25J 9/08 901/23 |
| 6,421,585 B1 * | 7/2002 | Takamura | .................. | B25J 9/08 700/263 |
| 6,454,624 B1 * | 9/2002 | Duff | ........................... | B25J 9/08 446/93 |
| 6,575,802 B2 * | 6/2003 | Yim | ....................... | A63H 33/04 901/1 |
| 6,605,914 B2 * | 8/2003 | Yim | ..................... | A63H 33/042 901/23 |
| 6,733,360 B2 * | 5/2004 | Dooley | .................. | A63H 30/04 446/454 |
| 6,893,316 B2 * | 5/2005 | Maxwell | ............... | A63H 33/042 446/246 |
| 6,902,461 B1 * | 6/2005 | Munch | ................. | A63H 33/042 446/85 |

(Continued)

*Primary Examiner* — Alexander R Niconovich

(57) ABSTRACT

An assembly robot toy includes a gear box, a head part and an assembly component. The head part and the assembly component are detachably arranged on the gear box, the gear box internally is provided with a gear set, and a motor and a plurality of transmission rods which are respectively connected with the gear set. The assembly component is connected with the gear set and/or the transmission rod, and the bottom of the gear box is provided with a second avoidance hole corresponding to the position of the gear group for the assembly connection. The head part is provided with a power supply module which is electrically connected with the motor and used for supplying power to the motor; and the transmission rod is configured to rotate by transmission of the gear set when the motor is driven.

18 Claims, 33 Drawing Sheets

(56) References Cited

U.S. PATENT DOCUMENTS

| | | | | |
|---|---|---|---|---|
| 6,939,192 | B1* | 9/2005 | Munch | A63H 30/04 446/436 |
| 7,204,455 | B2* | 4/2007 | Sinclair | B64C 39/028 244/72 |
| 7,322,873 | B2* | 1/2008 | Rosen | A63H 33/046 446/124 |
| 7,862,398 | B2* | 1/2011 | Yoneda | A63H 11/18 446/330 |
| 8,087,970 | B2* | 1/2012 | Sambenedetto | A63H 3/16 446/85 |
| 9,320,980 | B2* | 4/2016 | Schweikardt | A63H 33/046 |
| 9,592,603 | B2* | 3/2017 | Hardouin | B25J 9/1617 |
| 9,808,731 | B1* | 11/2017 | Liu | A63H 33/003 |
| 9,845,122 | B2* | 12/2017 | Takanishi | B62D 57/032 |
| 10,105,845 | B1* | 10/2018 | Jackowski | B25J 9/1664 |
| 10,610,792 | B2* | 4/2020 | Adekunle | A63H 33/042 |
| 10,695,688 | B2* | 6/2020 | Choi | A63H 29/22 |
| 2012/0122059 | A1* | 5/2012 | Schweikardt | G09B 23/00 434/118 |
| 2013/0324002 | A1* | 12/2013 | Rottjer | A63H 3/46 446/98 |
| 2018/0370025 | A1* | 12/2018 | Didey | B25J 9/102 |
| 2022/0023767 | A1* | 1/2022 | Gaba | A63H 30/02 |

* cited by examiner

ASSEMBLY ROBOT TOY

CROSS-REFERENCE TO RELATED APPLICATIONS

The application claims priority of Chinese patent application CN202311047616X, filed on 2023 Aug. 18, which is incorporated herein by reference in its entireties.

TECHNICAL FIELD

The present disclosure relates to the technical field of assembly toys, in particular to an assembly robot toy.

BACKGROUND

As everyone knows, the assembly toy is a toy with a certain shape by using parts with various shapes. However, at present, existing assembled electric toys can only be assembled into one shape which is driven, are extremely limited, and cannot stimulate the creativity of children well. In addition, the power output of an existing driving mechanism generally refers to a power output end through one or more rotating rods, so that the power transmission of the assembled electric toy starts from two sides, resulting in the limitation of assembly.

SUMMARY

The main purpose of the present disclosure is to provide an assembly robot toy so as to solve the problem that an assembled electric toy is limited because power of a driving mechanism of an existing assembled electric toy is output from two ends.

In order to solve the above technical problem, the technical solution of the present disclosure is as follows: an assembly robot toy includes a gear box, a head part and an assembly component. The head part and the assembly component are detachably arranged on the gear box, the gear box internally is provided with a gear set, and a motor and a plurality of transmission rods which are respectively connected with the gear set; first avoidance holes are formed in the left and right side walls of the gear box, a second avoidance hole corresponding to the position of the gear set is formed in the bottom of the gear box, and at least two of the transmission rods are arranged on the outer side of the gear box after respectively passing through the first avoidance holes in left and right side walls of the gear box; or, at least two of the transmission rods are respectively arranged near the positions of the first avoidance holes in the left and right side walls of the gear box; the assembly component is connected with the gear set and/or the transmission rod, and the head part is provided with a power supply module which is electrically connected with the motor and used for supplying power to the motor; and the transmission rod is configured to rotate by transmission of the gear set when the motor is driven, and at least part of the assembly component is configured to move and drive the gear box to move when the gear set and/or the transmission rod rotate/rotates.

In one embodiment, the gear set includes a first rotating rod, a first straight gear arranged on a rotating shaft of the motor, a first face gear arranged on the first rotating rod and meshed with the first straight gear, and a second straight gear arranged on the first rotating rod and connected with the assembly component; the number of the transmission rods is two, and the two transmission rods are respectively arranged at both ends of the first rotating rod; and when the motor drives the first straight gear to rotate, the first rotating rod rotates through the transmission of the first face gear and drives the second straight gear and the transmission rods to rotate.

In one embodiment, the second straight gear includes a straight gear I, a straight gear II, a straight gear III and a straight gear IV which are arranged on the first rotating rod in turn, and a straight gear V and a straight gear VI which are rotatably arranged in the gear box; and the straight gear I is integrally molded with the first face gear, the straight gear V is integrally molded with the straight gear VI, the straight gear III, the straight gear IV and one transmission rod are integrally molded, the straight gear I is meshed with the straight gear V, the straight gear VI is meshed with the straight gear II, the straight gear III and the straight gear IV are both used for connecting with the assembly component, and the two transmission rods are respectively arranged on the outer side of the gear box after passing through the first avoidance holes in the left and right side walls of the gear box.

In one embodiment, the gear box includes a first shell and a second shell, and the second shell is detachably connected with the first shell to form a first mounting cavity, a second mounting cavity and a second avoidance hole; and the motor is mounted in the first mounting cavity, the gear set is mounted in the second mounting cavity, and a wiring hole connected with the first mounting cavity is formed in the first shell and/or the second shell.

In one embodiment, a rotating hole is formed in the second mounting cavity; the gear set also includes a second rotating rod with one end arranged in the rotating hole after passing through the straight gear V and the straight gear VI, and a limit cap arranged at the other end of the second rotating rod; and the straight gear III is located between the straight gear V and the limit cap.

In one embodiment, the first shell protrudes on one side opposite to the second shell to form a plurality of first plugging ends, a plurality of first plugging grooves are formed in one side, opposite to the first shell, of the second shell, and the first plugging end is arranged in the first plugging groove; and the gear box also includes a plurality of reinforcing cover plates, a plurality of first clamping holes are formed in the reinforcing cover plate, and a plurality of first clamping buckles are arranged on both sides of the first shell and the second shell, and the first clamping buckle is clamped with the first clamping hole.

In one embodiment, wherein the head part is rotatably connected with the gear box, and the head part is located at one of the top, front and back positions of the gear box.

In one embodiment, a first connecting rod and a second connecting rod are arranged between the head part and the gear box, and the first connecting rod is rotatably connected with the second connecting rod; and the first connecting rod is configured to drive the head part to rotate along a central axis of the first connecting rod under the action of external force, and the second connecting rod is configured to drive the head part to rotate along a direction perpendicular to the central axis of the first connecting rod under the action of external force.

In one embodiment, the power supply module is a solar panel.

In one embodiment, the head part includes a bottom shell, a face shell which is detachably connected with the bottom shell and forms a third mounting cavity and two fourth mounting cavities with the bottom shell, a solar panel arranged in the third mounting cavity and two conducting springs respectively arranged in the two fourth mounting cavities and welded to the solar panel; and the solar panel is arranged in the third mounting cavity, the two fourth mounting cavities are arranged at intervals and are both connected with the third mounting cavity, a third avoidance hole is formed in the face shell and/or the bottom shell at the position corresponding to the fourth mounting cavity, a display port is formed in the face shell at the position corresponding to the solar panel, the motor is electrically connected with two conducting wires, the tail end of the conducting wire is provided with a conducting plate, and the conducting plate is plugged in the conducting spring.

In one embodiment, the bottom of one end of the face shell extends downward to form a second plugging end, the bottom of the other end of the face shell extends downward to form a plurality of first stop blocks arranged at intervals, and the first stop block protrudes at the bottom of one side opposite to the second plugging end to form a second stop block; a second plugging groove with a length larger than the length of the second plugging end is formed in the bottom shell, a front end of the bottom shell is arranged above the second stop block, and the second plugging end is arranged in the second plugging groove; and the head part also includes a plurality of cover bodies with accommodating grooves, the bottom shell is connected with the face shell to form first joint ends on both sides of the head part, and the first joint ends are arranged in the accommodating grooves.

In one embodiment, the assembly component includes a plurality of bolts, fixed plates, connecting plates, third rotating rods, wheels, straight-line connecting rods, symmetrical semicircular sole pieces, U-shaped pieces, force arm connecting rods, arc-shaped connecting rods, T-shaped connecting rods, first cams, second cams, fluctuating gears, third straight gears and fixed rods; any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod, the third straight gear can be used for being meshed with the second straight gear, the third straight gear, the wheel, the first cam, the second cam, the fluctuating gear and the wheel can detachably sleeve the third rotating rod or the fixed rod, and the second cam is detachably plugged in the transmission rod.

In one embodiment, a first sliding hole and a second sliding hole perpendicular to the first sliding hole are formed in the T-shaped connecting rod, and the fluctuating gear is provided with a plurality of arc-shaped teeth arranged around the fluctuating gear; the symmetrical semicircular piece is formed by connecting two semicircular plates in central symmetry, a side wall of the second cam is surrounded by first gear teeth, and the inner side of the arc-shaped connecting rod is provided with second gear teeth meshed with the second cam.

In one embodiment, at least one plane is formed on an outer side wall of the third rotating rod.

In one embodiment, a plurality of annular clamping grooves are formed in the outer side walls of the fixed rod and the third rotating rod at equal intervals, the assembly component also includes a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove; and the position of the third straight gear on the third rotating rod or the fixed rod is limited by two fixed sleeves respectively sleeving both sides of the third straight gear.

In one embodiment, the cross section of the outer side wall of the third rotating rod is a hexagon, the cross section of an outer side wall of the fixed rod is circular, and the diameter of the fixed rod is equal to the distance between two opposite sides of the hexagon.

In one embodiment, the shape of the assembly robot toy is one of a baby carriage robot, a quadruped robot, a turtle robot, a puppy robot, a beetle robot, a Walker robot, a crab robot, a pudgy robot, a crawling robot and a zombie robot;

when the assembly robot toy is a baby carriage robot, the head part is located on the top of the gear box; the number of the fixed plates is two, and the two fixed plates are respectively detachably arranged on the left and right side walls of the gear box through bolts; the number of the connecting plates is four, a front end of each fixed plate is connected with another connecting plate through one connecting plate, and each fixed plate and two connecting plates on the same side form a first long arm; the number of the third rotating rods is two, and the two third rotating rods are respectively located at front and rear ends of the first long arm and at the bottom of the gear box; the number of the wheels is four, and both ends of each third rotating rod are connected with the wheels after respectively passing through two opposite first long arms; the number of the fixed rods is five, and the five fixed rods are located at the bottom of the gear box and are plugged and arranged on the first long arm at intervals and located between the two third rotating rods; the number of the third straight gears is six, and the six third straight gears respectively sleeve five fixed rods and the third rotating rod at the front end; the two adjacent third straight gears are meshed, and the third straight gear located at a rear end of the first long arm is meshed with the second straight gear;

when the assembly robot toy is a quadruped robot, the head part is arranged at a front end of the gear box; the number of the fixed plates is two, and the two fixed plates are respectively detachably arranged on the left and right side walls of the gear box through bolts; the number of the connecting plates is two, the two connecting plates are respectively fixed at front ends of the two fixed plates; the two fixed plates and the connecting plates on the same side of the two fixed plates respectively form two second long arms; the number of the third rotating rods is two, the number of the first cams is four, both ends of one third rotating rod are connected with the first cams after respectively passing through tail ends of two opposite fixed plates, and both ends of the other third rotating rod are connected with the first cams after respectively passing through front ends of two opposite connecting plates; the number of the fixed rods is three, and the three fixed rods are plugged and arranged on the second long arm at intervals and between the two third rotating rods; the number of the third straight gears is five, and the five third straight gears respectively sleeve three fixed rods and two third rotating rods and are located at the bottom of the gear box; two adjacent third straight gears are meshed, and the third straight gear near the third rotating rod at the front end is meshed with the second straight gear; the number of the T-shaped connecting rods is four, each T-shaped connecting rod is connected with one first cam at the position between the first sliding hole and the second sliding hole through a bolt, and the first sliding hole sleeves one end of one fixed rod and is located above the second sliding hole;

when the assembly robot toy is a turtle robot, the head part is arranged on the front side wall of the gear box; the number of the fixed plates is two, and the two fixed plates are respectively detachably arranged on the left and right side walls of the gear box through two bolts; the number of the connecting plates is four, and front and rear ends of each fixed plate are connected with one connecting plate; the number of the third rotating rods is two, the number of the first cams is four, both ends of one third rotating rod are connected with the first cams after respectively passing through front ends of two opposite fixed plates, and both ends of the other third rotating rod are connected with the first cams after respectively pass through rear ends of two opposite fixed plates; the numbers of the arc-shaped connecting rods and the T-shaped connecting rods are four, each T-shaped connecting rod is connected with the first cam at the position between the first sliding hole and the second sliding hole through a bolt, and the second sliding hole sleeves the bolt, connected with the gear box, of the fixed plate; every two arc-shaped connecting rods are connected to form a turtle shell piece, two turtle shell pieces are respectively detachably arranged on the left and right side walls of the gear box through bolts, one end of each turtle shell piece is located above the connecting plate at a front end of the fixed plate, and the other end of each turtle shell piece is located at the back of the connecting plate at a rear end of the fixed plate; the number of the fixed rods is five, one fixed rod is connected between every two opposite arc-shaped connecting rods, both ends of one fixed rod are arranged on two opposite fixed plates and located between two third rotating rods, both ends of one fixed rod are respectively plugged into two opposite connecting plates at the front end of the fixed plate, and both ends of one fixed rod are respectively plugged into two opposite connecting plates at the rear end of the fixed plate; the number of the third straight gears is three, the three third straight gears are respectively arranged on the two third rotating rods and the fixed rods located between the two third rotating rods, the third straight gears are located at the bottom of the gear box, two adjacent third straight gears are meshed, and the third straight gear located in the middle is meshed with the second straight gear;

when the assembly robot toy is a puppy robot, the head part is arranged on the top of the gear box; the number of the fixed plates is two, and the two fixed plates are respectively detachably arranged on the left and right side walls of the gear box through two bolts; the number of the connecting plates is two, and the two connecting plates are respectively fixed at rear ends of the two fixed plates; the numbers of the third rotating rods and the symmetrical semicircular pieces are two, both ends of one third rotating rod are connected with one symmetrical semicircular piece after respectively passing through rear ends of two opposite fixed plates, and both ends of the other third rotating rod are respectively plugged in the middle positions of two opposite connecting plates; the number of the fixed rods is three, both ends of one fixed rod are detachably arranged at rear ends of two opposite connecting plates, and the two fixed rods are respectively located at front ends and middle positions of the two opposite fixed plates; the number of the third straight gears is at least three, and the at least three third straight gears respectively sleeve the two third rotating rods and the fixed rod located in the middle of the fixed plate; two adjacent third straight gears are meshed, and the third straight gear located on the fixed rod is meshed with the second straight gear; the number of the straight-line connecting rods is two, the two straight-line connecting rods are detachably connected through bolts to form a tail piece, and the tail piece sleeves the fixed rod at the rear end of the connecting plate; the number of the fluctuating gears is one, and the fluctuating gear sleeves the third rotating rod located in the middle of the connecting plate; one end of the tail piece is arranged between two adjacent arc-shaped teeth; the number of the T-shaped connecting rods is two, one end of each T-shaped connecting rod respectively sleeves the bolts, connected with the fixed plate, of the left and right side walls of the gear box, the first sliding hole is limited on the fixed plate through the bolt and located between two fixed rods, and the second sliding hole and the first sliding hole are splayed; when the second straight gear rotates, the tail piece swings along the fixed rod through the transmission of the third straight gear and a fluctuating part;

when the assembly robot toy is a beetle robot, the head part is arranged on the front side of the gear box; the number of the fixed plates is two, and the two fixed plates are respectively detachably arranged on the left and right side walls of the gear box through bolts; the number of the connecting plates is four, and the four connecting plates are respectively detachably arranged at front and rear ends of the two fixed plates through bolts; the number of the third rotating rods is three, the number of the symmetrical semicircular pieces is six, both ends of one third rotating rod are connected with one symmetrical semicircular piece after respectively passing through two opposite fixed plates, both ends of one third rotating rod are connected with one symmetrical semicircular piece after respectively passing through the connecting plates at front ends of the two opposite fixed plates, and both ends of the third rotating rod are connected with one symmetrical semicircular piece after respectively passing through the connecting plates at rear ends of the two opposite fixed plates; the number of the fixed rods is two, and the two fixed rods are respectively located between two adjacent third rotating rods; the number of the third straight gears is five, and the five third straight gears respectively sleeve three third rotating rods and two fixed rods, the third straight gears are located at the bottom of the gear box, the third straight gear on the third rotating rod in the middle is meshed with the second straight gear, and two adjacent third straight gears are meshed;

when the assembly robot toy is a Walker robot, the head part is arranged on the top of the gear box; the number of the fixed plates is two, and the two fixed plates are respectively detachably arranged on the left and right side walls of the gear box through bolts; the numbers of the U-shaped pieces, the force arm connecting rods, the T-shaped connecting rods, the straight-line connecting rods and the first cams are two; the number of the third rotating rods is one, and both ends of the third rotating rod are connected with the first cam after respectively passing through two opposite fixed plates; the number of the fixed rods is two, and the two fixed rods are respectively located on the two opposite fixed plates and on both sides of the third rotating rod; the middle of each force arm connecting rod is detachably connected with one first cam through a bolt, one end of each force arm connecting rod is plugged into one U-shaped piece, the other end of each force arm is detachably connected with one end of one T-shaped connecting rod through a bolt, each T-shaped connecting rod is detachably arranged on the gear box on the side connected with the force arm connecting rod through a bolt, and the first sliding hole is located below the second sliding hole and forms an L shape inclined forward with the second sliding hole; one end of each straight-line connecting rod is detachably arranged at one end, away from the force arm connecting rod, of the U-shaped piece through a bolt; the two U-shaped pieces are at least partially oppositely arranged and both located below the third rotating rod; the number of the third straight gears is one, and the third straight gear sleeves the third rotating rod and is meshed with the second straight gear; when the second straight gear rotates, the U-shaped piece is driven by the third straight gear, the third rotating rod, the first cam and the force arm connecting rod to perform a stepping motion forward;

when the assembly robot toy is a crab robot, the head part is located on the top of the gear box; the number of the fixed plates is two, and the two fixed plates are detachably arranged on the left and right sides of the gear box through two bolts respectively; the numbers of the third rotating rods, the straight-line connecting rods and the U-shaped pieces are two, the numbers of the first cams, the T-shaped connecting rods and the symmetrical semicircular pieces are four, and both ends of each third rotating rod are connected with the first cam after respectively passing through two opposite fixing plates; the number of the fixed rods is one, and both ends of the fixed rod are plugged into two opposite fixed plates and located between two third rotating rods; the third rotating rod and the fixed rod are respectively located below the gear box, the number of the third straight gears is three, and the three third straight gears respectively sleeve the fixed rod and the two third rotating rods; two adjacent third straight gears are meshed, and the third straight gear located on the fixed rod is meshed with the second straight gear; the T-shaped connecting rod is connected with one first cam at the position between the first sliding hole and the second sliding hole through a bolt, and the second sliding hole sleeves the bolt, connected with the gear box, of the fixed plate; the central positions of every two symmetrical semicircular pieces are rotatably connected through a bolt to form a crab clamp, and one end of the crab clamp is fixed on the top of the left side wall of the gear box through a bolt; both ends of each straight-line connecting rod are respectively fixed at one end of the crab clamp and one end, located above the second sliding hole, of the T-shaped connecting rod, the first sliding hole is located below the second sliding hole, the two U-shaped pieces are respectively fixed on the front and rear side walls of the gear box through bolts, and openings of the U-shaped pieces are downward;

when the assembly robot toy is a zombie robot, the head part is arranged on the top of the gear box; the number of the fixed plates is two, and the two fixed plates are respectively detachably arranged on the left and right side walls of the gear box through bolts; the number of the connecting plates is four, and every two connecting plates are respectively detachably and vertically arranged at the bottom of both ends of one fixed plate; the numbers of the third rotating rods, the first cams, the force arm connecting rods, the T-shaped connecting rods, the U-shaped pieces and the second cams are two, and both ends of one third rotating rod are connected with the first cam after respectively passing through tail ends of two opposite fixed plates and the connecting plate; both ends of the other third rotating rod are connected with the second cam after respectively passing through bottom ends of two opposite connecting plates; the number of the fixed rods is four, both ends of one fixed rod are fixed on two opposite connecting plates located at the back of the fixed plates and between two third rotating rods, both ends of the two fixed rods are respectively fixed on two opposite fixed plates and located on one side of one third rotating rod, and both ends of one fixed rod are respectively fixed at the bottom of two opposite connecting plates located at the front ends of the fixed plates; the number of the third straight gears is five, and the five third straight gears respectively sleeve two third rotating rods, two fixed rods adjacent to the third rotating rods and the fixed rod located at the bottom of the connecting plate; the third straight gear on the fixed rod connected with the fixed plate is meshed with the second straight gear, and two adjacent third straight gears are meshed; both ends of each force arm connecting rod are respectively connected with one end of the T-shaped connecting rod and the first cam, the first sliding hole is located below the second sliding hole, the number of the symmetrical semicircular pieces is six, and every three symmetrical semicircular pieces are matched with bolts to form a zombie arm; in each zombie arm, one end of each of three symmetrical semicircular pieces is connected through bolts, the other end of the symmetrical semicircular piece in the middle is arranged in the second sliding hole through bolts and connected with one T-shaped connecting rod, and the central positions of the other two symmetrical semicircular pieces are connected through bolts and located on one side away from the T-shaped connecting rod; the two U-shaped pieces are fixed on the rear side wall of the gear box through bolts and are arranged in parallel;

when the assembly robot toy is a chunky robot, the head part is arranged on the top of the gear box; the numbers of the wheels and the second cams are two, the two second cams are respectively plugged into two transmission rods, and each wheel is coaxially fixed at the center of one second cam through a bolt; the number of the arc-shaped connecting rods is eight, every four arc-shaped connecting rods are connected end to end to form an annular wheel, and the second cam is located on the inner side of the annular wheel and meshed with the second gear teeth; the numbers of the T-shaped connecting rods, the third straight gears and the symmetrical semicircular pieces are four, one end of each of the four symmetrical semicircular pieces and one end of the T-shaped connecting rod are fixed at two top corners of the left and right side walls of the gear box through bolts, and each third straight gear is plugged into a central position of the symmetrical semicircular piece and the second sliding hole through both ends of the bolt to realize the connection with the symmetrical semicircular piece and the T-shaped connecting rod and is located between the symmetrical semicircular piece and the T-shaped connecting rod; the third straight gear is located on the inner side of the annular wheel, and the annular wheel is located between the symmetrical semicircular piece and the T-shaped connecting rod;

when the assembly robot toy is a crawling robot, the head part is arranged on the top of the gear box; the number of the fixed plates is two, and the two fixed plates are respectively detachably arranged on the left and right sides of the gear box through bolts; the number of the connecting rods is four, and the four connecting rods are respectively arranged at the front and rear ends of the two fixed plates; the numbers of the first cams and the force arm connecting rods are two, the number of the third rotating rods is two, the number of the fixed rods is at least two, the number of the wheels is four, the number of the arc-shaped connecting rods is eight, both ends of one third rotating rod are connected with the first cam after respectively passing through the front ends of two opposite fixed plates, and both ends of one fixed rod are respectively connected with the rear ends of the two opposite fixed plates; one end of each of every two arc-shaped connecting rods is rotatably connected through a bolt to form a similarly semicircular connecting rod, three-quarters and one-quarter positions of every two similarly semicircular connecting rods are connected through a bolt to form a crawling component, and the opening directions of the two similarly semicircular connecting rods in the crawling component are opposite; both ends of each force arm connecting rod are respectively connected with the first cam and one end of the crawling component through bolts, and both ends of one third rotating rod are connected with the wheels after respectively passing through the other end of the crawling component; the two wheels are respectively connected with the front ends of two opposite connecting plates at the front end of the fixed plate through bolts; the number of the third straight gears is at least two, one third straight gear sleeves the third rotating rod with the first cam, and the other third straight gear sleeves the fixed rod adjacent to one third straight gear and is respectively meshed with the second straight gear and the third straight gear located on the fixed rod.

In one embodiment, the assembly component also includes a hull, two first lugs arranged at intervals are formed on the hull, and a fourth assembly hole is formed in the first lug; the number of the fixed plates is two, and the two fixed plates are respectively fixed on the front and rear side walls of the gear box; and the first lug is connected to the fixed plate after passing through the fourth assembly hole through a bolt.

In one embodiment, the hull includes a foldable plastic sheet, a first plug connector and a cap body with a third plugging groove, and the first lug is foldably connected to the hull; the plastic sheet includes two connected first sheets, and the first lug is located at the position where the two first sheets are connected; both ends of the first sheet are provided with two second lugs at intervals, a fifth assembly hole is formed in the second lug, and the first plug connector is arranged in the third plugging groove after passing through the fourth assembly holes in the two lugs at one end of the first sheet.

In one embodiment, the assembly robot toy is a surfing robot, and the head part is arranged on the front side wall of the gear box; the numbers of the second cams, the fixed rods, the straight-line connecting rods and the force arm connecting rods are all two, the two second cams are respectively plugged on two transmission rods, the two fixed rods are respectively plugged at non-central positions of two second cams, and the two straight-line connecting rods respectively sleeve two fixed rods; the numbers of the arc-shaped connecting rods and the T-shaped connecting rods are four, both ends of every two arc-shaped connecting rods are connected to form a wave-shaped leg part, and one end of each of the two leg parts is respectively connected to two straight-line connecting rods through bolts; every two T-shaped connecting rods are oppositely arranged side by side through bolts to form a sole piece, and the first sliding hole and the second sliding hole on each T-shaped piece are splayed; both ends of each force arm connecting rod are respectively connected to the other end of the leg part and one end of the sole piece through bolts, and the middle position of each force arm connecting rod is rotatably connected to the first plug connector through bolts; the number of the symmetrical semicircular pieces is six, and every three symmetrical semicircular pieces are matched with the bolts to form a paddling arm; in each paddling arm, one end of each of the three symmetrical semicircular pieces is connected through bolts, the other end of the symmetrical semicircular piece in the middle is arranged on one fixed rod through a bolt, and the central positions of the other two symmetrical semicircular pieces are connected through bolts and away from one side of the fixed plate;

or, the assembly robot toy is a rowing robot, and the head part is arranged on the top of the gear box; the numbers of the second cams, the straight-line connecting rods and the force arm connecting rods are all two, the two second cams are respectively fixed on two transmission rods, the numbers of the arc-shaped connecting rods, the fixed rods and the T-shaped connecting rods are four, the two fixed rods are respectively plugged on two second cams, and the two straight-line connecting rods respectively sleeve two fixed rods; the two arc-shaped connecting rods are oppositely connected through a bolt to form a rowing paddle; the number of the rowing paddles is two, and the two rowing paddles are respectively fixed on the fixed rod connected with the first cam; both ends of the two arc-shaped connecting rods are connected through two fixed rods to form a survival suit piece with a sleeve opening, the gear box is arranged in the sleeve opening, and both sides of the survival suit piece are fixed on the gear box through bolts; one end of each of the two T-shaped connecting rods is connected to the bolt, connected with the gear box, of the survival suit piece, the other ends of the two T-shaped connecting rods are rotatably connected to the straight-line connecting rod through bolts, one end of each of the two force arm connecting rods is respectively plugged on both sides of the fixed plate, and the two T-shaped connecting rods are respectively corresponding to one force arm connecting rod and are connected through bolts.

Beneficial effects: compared with the prior art, in the embodiment, two transmission rods are arranged on both sides of the gear box, and a second avoidance hole is formed in the bottom of the gear box at the position corresponding to the gear set. Both sides and the bottom of the gear box can be of power output, so that the assembly component is convenient to connect and use. The problem that conventional assembled electric toys are limited since generally both-end or symmetrical power output is of assembly diversity is solved, the assembly diversity of the assembly robot toy in the embodiment is improved, the imagination and creativity of child assembly are simulated, and the interestingness of the toy is increased.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DETAILED DESCRIPTION OF THE EMBODIMENTS

The technical solutions in the embodiments of the present disclosure will be clearly and completely described below in conjunction with the accompanying drawings in the embodiments of the present disclosure. Apparently, the described embodiments are only a part of the embodiments of the present disclosure, rather than all the embodiments. Based on the embodiments in the present disclosure, all other embodiments obtained by those ordinarily skilled in the art without doing creative work shall fall within the protection scope of the present disclosure.

Figure 1:
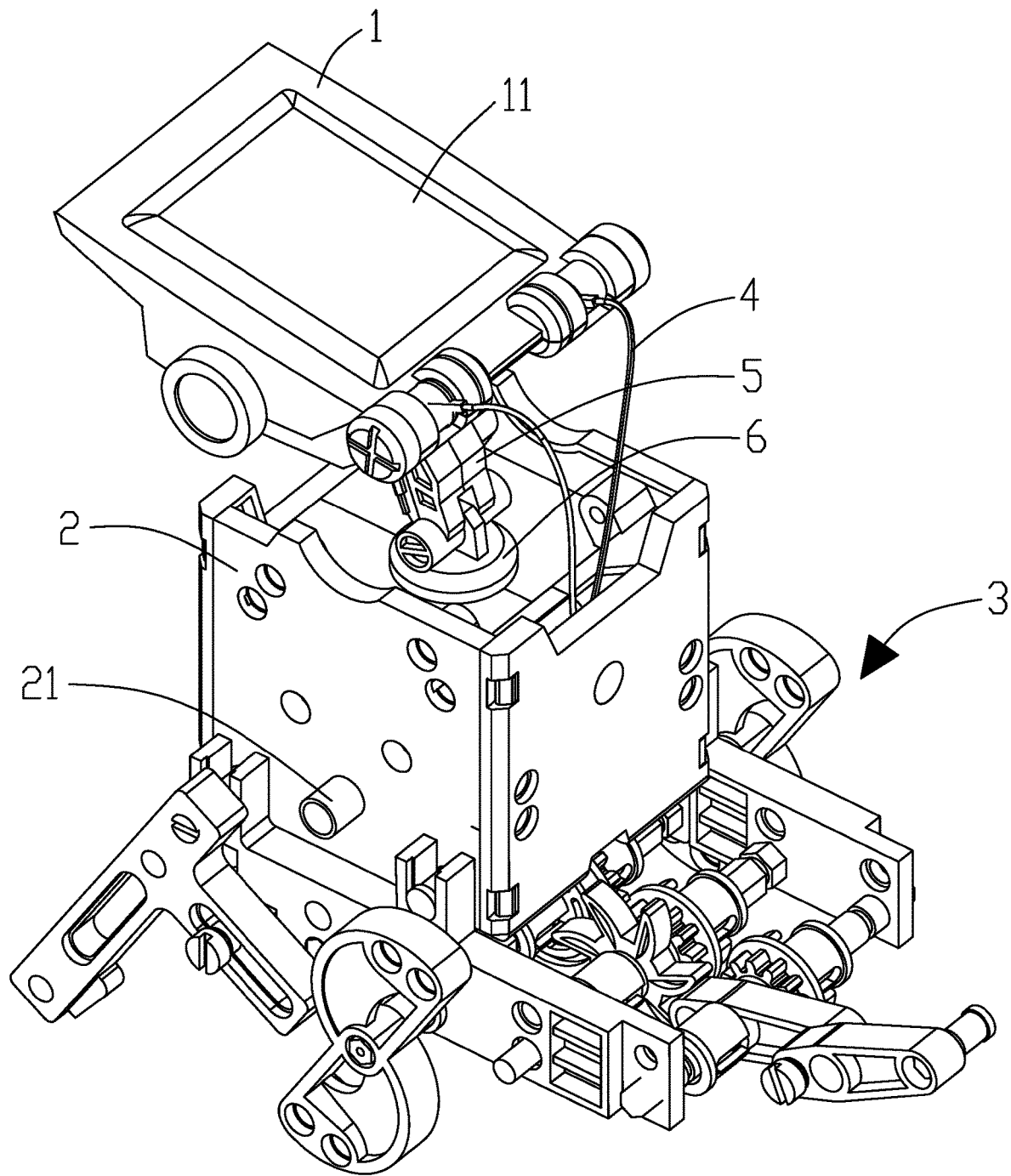
FIG. 1 is a space diagram of the present disclosure.
Figure 2:
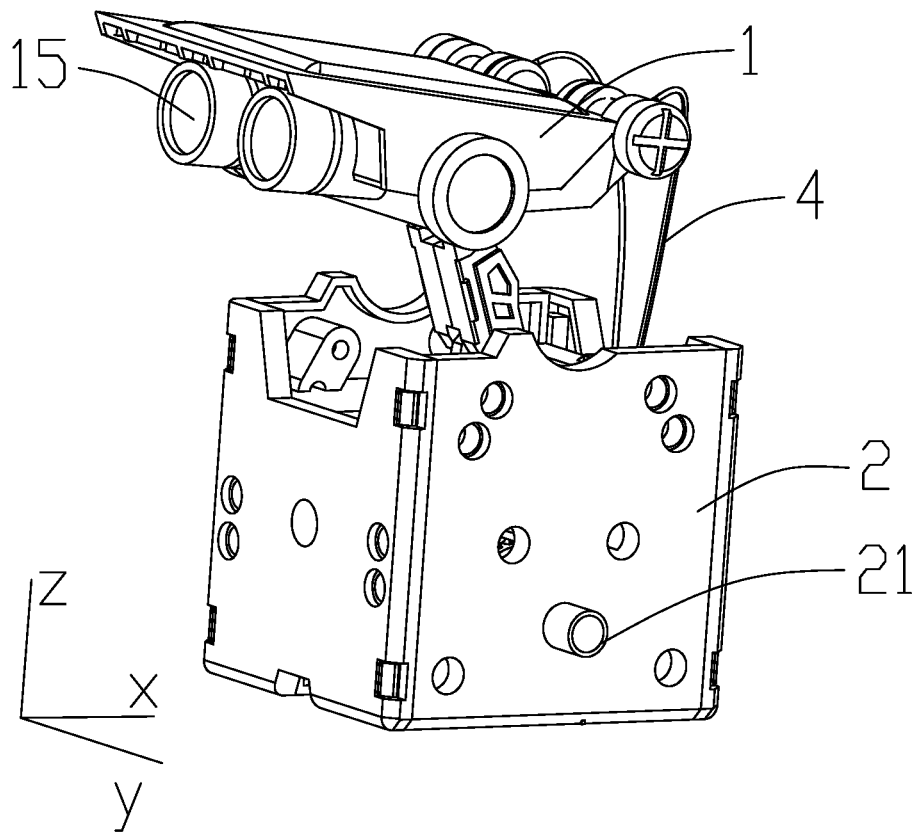
FIG. 2 is a schematic diagram of a head part located on the top of a gear box in the present disclosure.
Figure 3:
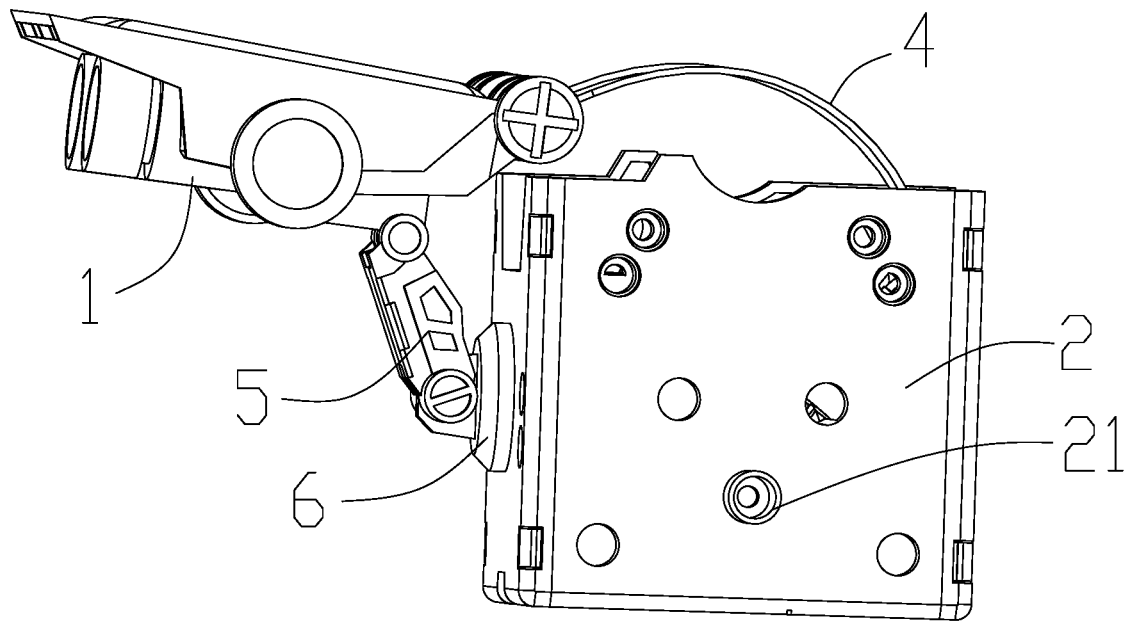
FIG. 3 is a schematic diagram of a head part located at a front end of a gear box in the present disclosure.
Figure 56:
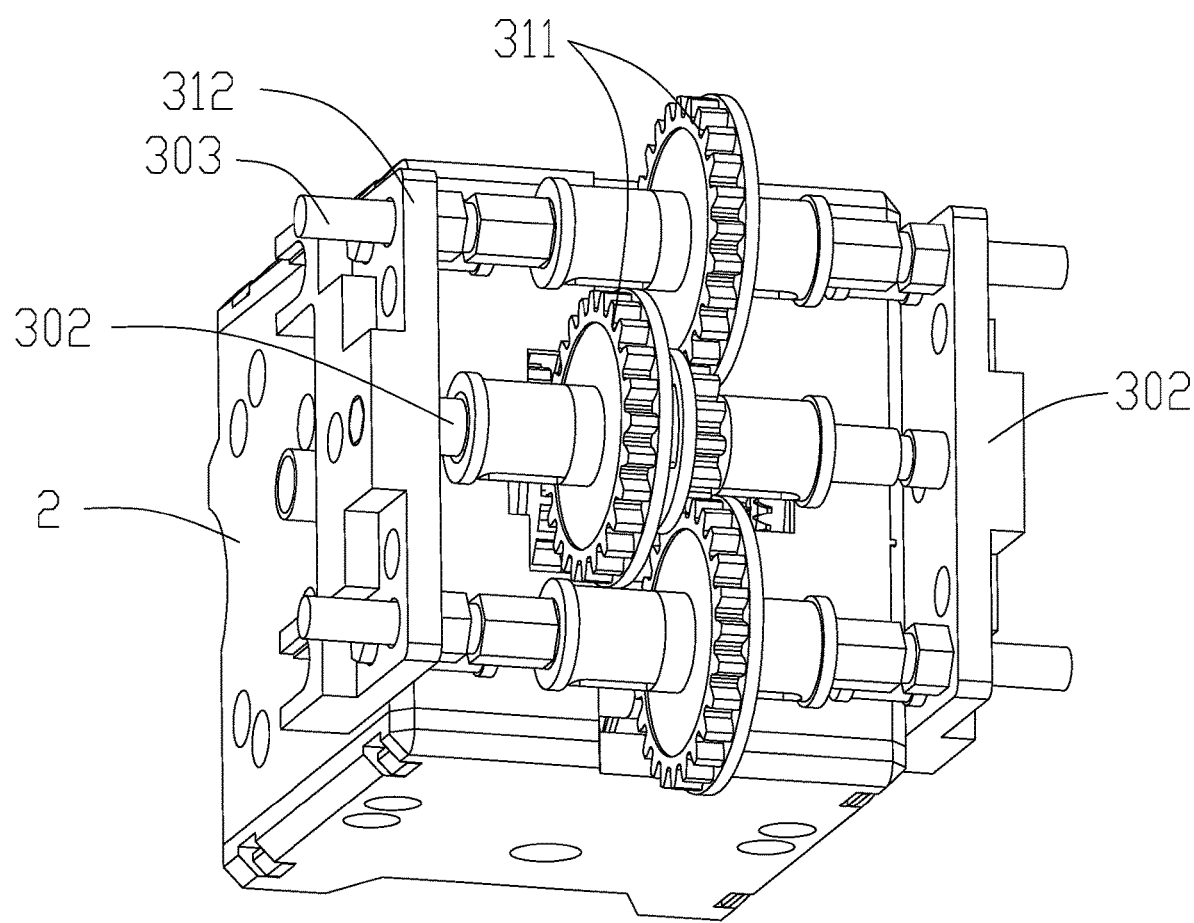
FIG. 56 is an assembly schematic diagram of a fixed plate, a third rotating rod, a fixed rod and a third straight gear in the present disclosure.

Referring to FIG. 1 to FIG. 56, an assembly robot toy is disclosed in the embodiment of the present disclosure.

Figure 9:
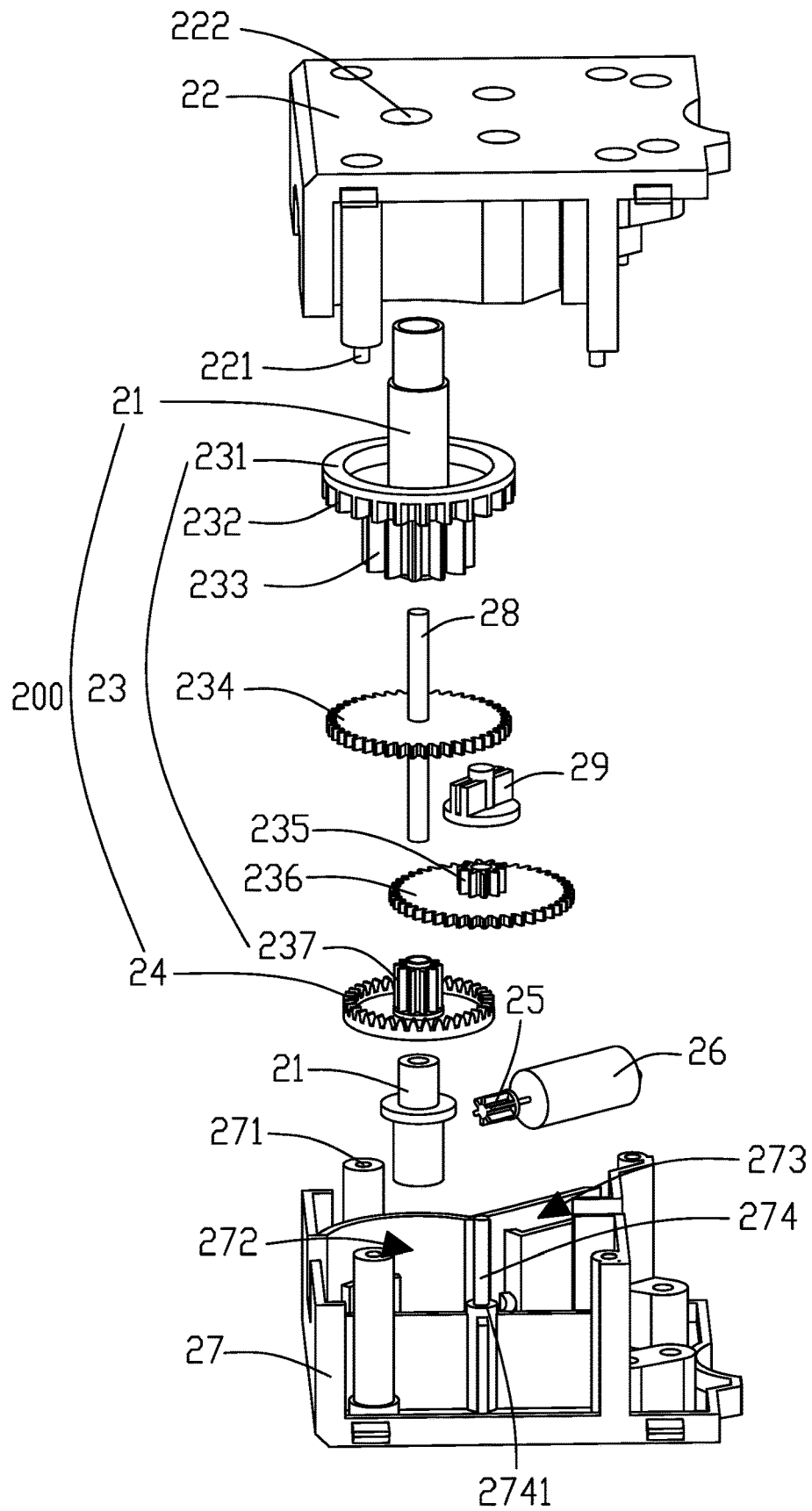
FIG. 9 is an explosive view of a gear box without a reinforcing cover plate in the present disclosure.
Figure 10:
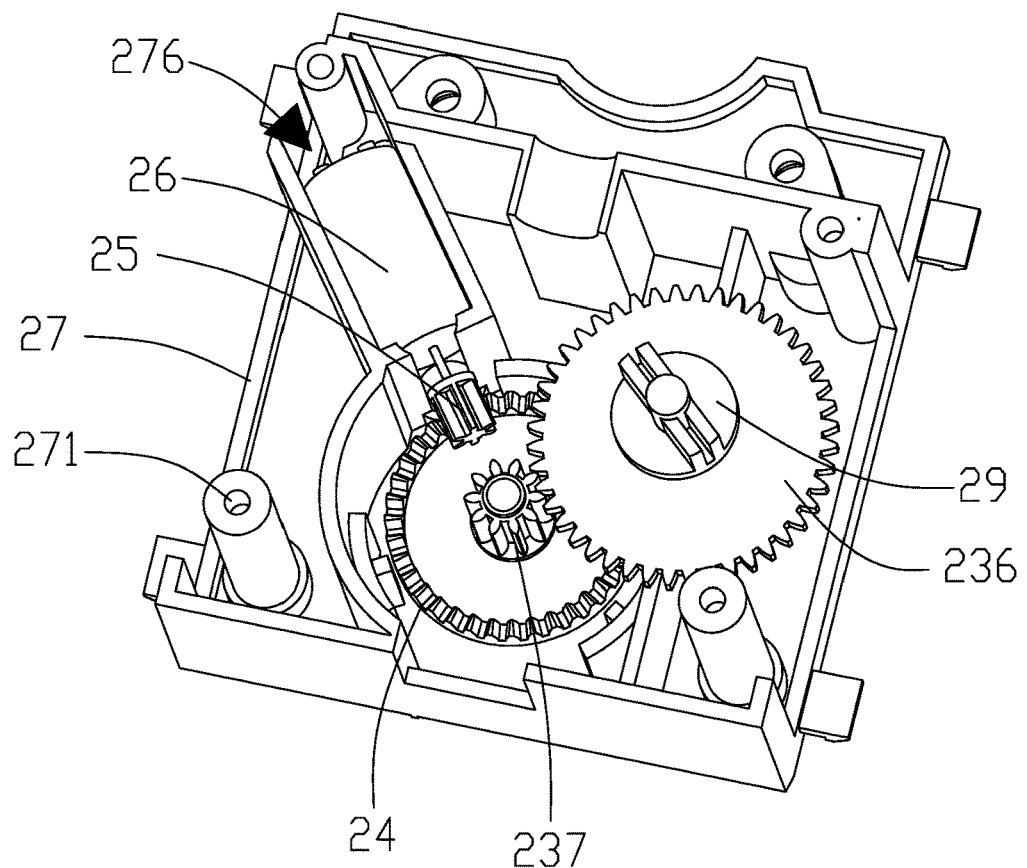
FIG. 10 is an assembly diagram of a motor and part of a gear set mounted on a second shell in the present disclosure.
Figure 11:
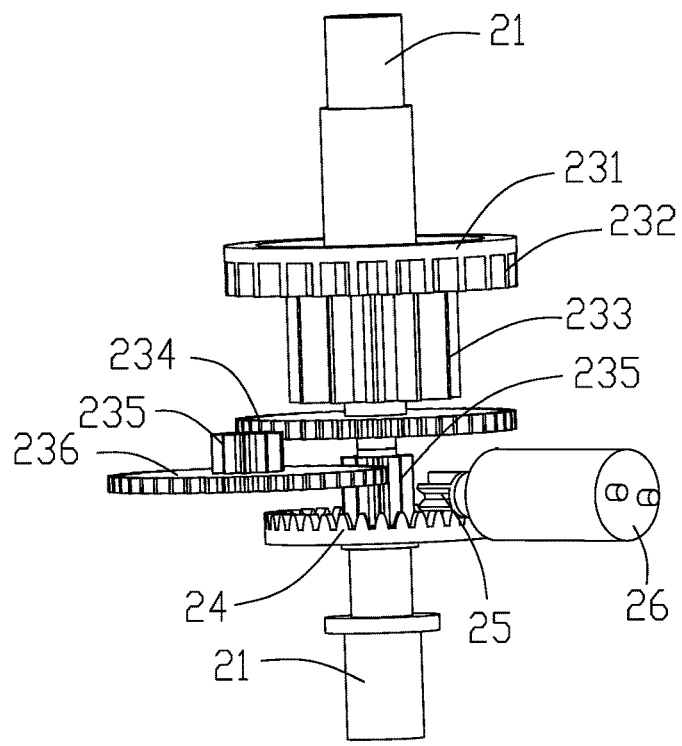
FIG. 11 is an assembly diagram of a gear box without a first shell or a second shell in the present disclosure.
Figure 12:
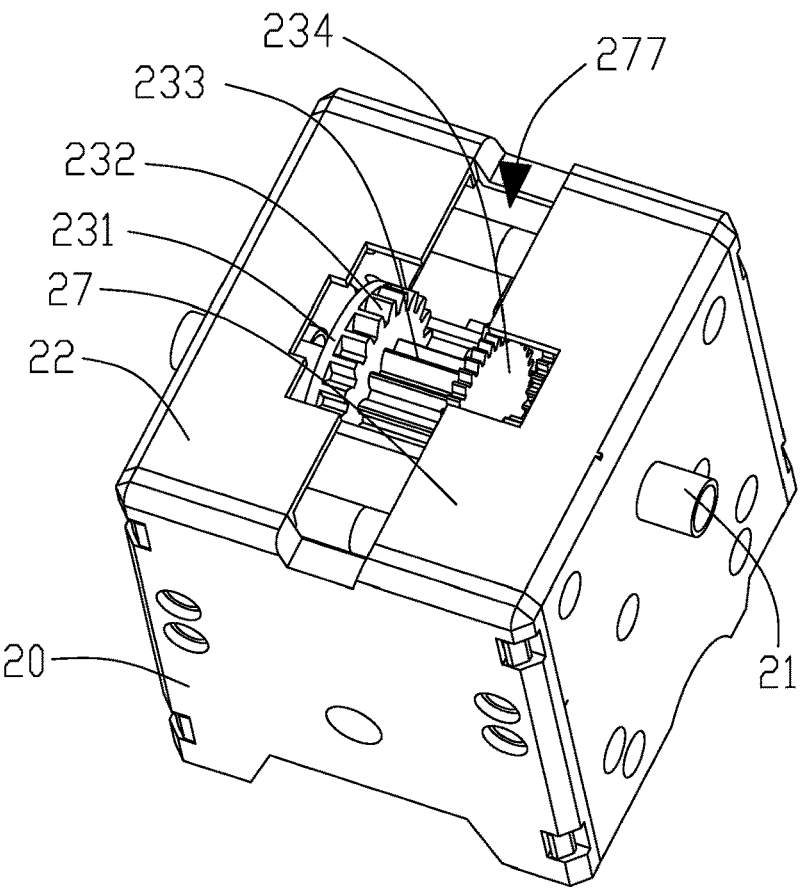
FIG. 12 is a schematic diagram of a gear box in the present disclosure.

Referring to FIG. 1 and FIG. 9, an assembly robot toy includes a gear box 2, a head part 1 and an assembly component 3. The head part 1 and the assembly component 3 are detachably arranged on the gear box 2. The gear box 2 internally is provided with a gear set 200, and a motor 26 and a plurality of transmission rods 21 which are respectively connected with the gear set 200. First avoidance holes 222 are formed in the left and right side walls of the gear box 2. A second avoidance hole 277 corresponding to the position of the gear set 200 is formed in the bottom of the gear box 2. At least two of the transmission rods 21 are arranged on the outer side of the gear box 2 after respectively passing through the first avoidance holes 222 in left and right side walls of the gear box 2. Or, at least two of the transmission rods 21 are respectively arranged near the positions of the first avoidance holes 222 in the left and right side walls of the gear box 2. The assembly component 3 is connected with the gear set 200 and/or the transmission rod 21, and the head part 1 is provided with a power supply module 11 which is electrically connected with the motor 26 and used for supplying power to the motor 26. The transmission rod 21 is configured to rotate by transmission of the gear set 200 when the motor 26 is driven, and at least part of the assembly component 3 is configured to move and drive the gear box 2 to move when the gear set 200 and/or the transmission rod 21 rotate/rotates.

In the embodiment, two transmission rods 21 are arranged on both sides of the gear box 2, and a second avoidance hole 277 is formed in the bottom of the gear box 2 at the position corresponding to the gear set 200. Both sides and the bottom of the gear box 2 can be of power output, so that the assembly component 3 is convenient to connect and use. The problem that conventional assembled electric toys are limited since generally both-end or symmetrical power output is of assembly diversity is solved, the assembly diversity of the assembly robot toy in the embodiment is improved, the imagination and creativity of child assembly are simulated, and the interestingness of the toy is increased.

In one embodiment, referring to FIG. 8 to FIG. 11, the gear set 200 includes a first rotating rod 28, a first straight gear 25 arranged on a rotating shaft of the motor 26, a first face gear 24 arranged on the first rotating rod 28 and meshed with the first straight gear 25, and a second straight gear 23 arranged on the first rotating rod 28 and connected with the assembly component 3. The number of the transmission rods 21 is two, and the two transmission rods 21 are respectively arranged at both ends of the first rotating rod 28. When the motor 26 drives the first straight gear 25 to rotate, the first rotating rod 28 rotates through the transmission of the first face gear 24 and drives the second straight gear 23 and the transmission rods 21 to rotate. In this way, when the motor 26 is driven, the first straight gear 25 is driven to rotate, so that the first rotating rod 28 can rotate through the first face gear 24 to drive the second straight gear 23 and the two transmission rods 21 to rotate together, and power output is realized from both sides and the bottom of the gear box 2.

Specifically, in the embodiment, in order to achieve compactness of the gear seat 200, the second straight gear 23 includes a straight gear I 237, a straight gear II 234, a straight gear III 233 and a straight gear IV 232 which are arranged on the first rotating rod 28 in turn, and a straight gear V 236 and a straight gear VI 235 which are rotatably arranged in the gear box 2. The straight gear I 237 is meshed with the straight gear V 236. The straight gear 235 VI is meshed with the straight gear II 234. The straight gear III 233 and the straight gear 232 IV are used for being connected with the assembly component 3, so that when the first rotating rod 28 rotates, the straight gear I 237, the straight gear II 234, the straight gear III 233 and the straight gear IV 232 can be driven to rotate together. The straight gear I 237 and the first face gear 24 are integrally molded to form a first injection molded part. The straight gear V 236 and the straight gear VI 235 are integrally molded to form a second injection molded part. The straight gear III 233, the straight gear IV 232 and one transmission rod 21 are integrally molded to form a third injection molded part. Thus, too many parts of the gear set 200 can be prevented from being difficult to find after being lost. The first injection molded part and the straight gear II 234 are also meshed through the third injection molded part, so that the movement stability of the gear set 200 can be improved. The two transmission rods 21 are respectively arranged on the outer side of the gear box 2 after passing through the first avoidance holes 222 in the left and right side walls of the gear box 2, so that the assembly component 3 is assembled and connected.

Certainly, in other embodiments, the straight gear II 23 may also not include one or more of the straight gear V 236, the straight gear VI 235, the straight gear I 237, the straight gear II 234, the straight gear III 233 and the straight gear IV 232, and the number of gears may be limited according to the needs of the demand side and the need for stability, and the number of the straight gears included in the second straight gear 23 is not limited herein. It should also be noted that the number of the second straight gears 23 may be one or more and the number of the second straight gears 23 is not limited here.

In one embodiment, the gear box 2 includes a first shell 22 and a second shell 27, and the second shell 27 is detachably connected with the first shell 22 to form a first mounting cavity 273, a second mounting cavity 272 and a second avoidance hole 277. The motor 26 is mounted in the first mounting cavity 273. The gear set 200 is mounted in the second mounting cavity 272. A wiring hole 276 connected with first mounting cavity 273 is formed in the first shell 22 and/or the second shell 27. The first shell 22 and the second shell 27 are detachable, so that the gear set 200, the motor 26 and the transmission rod 21 can be mounted in the first shell 22 and the second shell 27 so as to complete the assembly of the whole gear box 2. A user can understand the mechanical principle of how to drive the gear set 200 and the transmission rod 21 after the motor 26 is driven, thus expanding the cognition. Moreover, the arrangement of the wiring hole 276 can facilitate the wiring of a wire, electrically connected with the motor 26, of the power supply module 11 in the head part 1, so that the motor 26 is electrically connected with the power supply module 11.

In the above embodiment, a rotating hole 2741 is formed in the second mounting cavity 272. The gear set 200 also includes a second rotating rod 274 with one end arranged in the rotating hole 2741 after passing through the straight gear V 236 and the straight gear VI 235, and a limit cap 29 arranged at the other end of the second rotating rod 274. The straight gear III 233 is located between the straight gear V 236 and the limit cap 29, so that when the assembly robot toy in the embodiment is assembled, one end of the second rotating rod 274 can be arranged in the rotating hole 2741 and the motor 26 can be arranged in the first mounting cavity 273. Then, the independent transmission rod 21 is arranged in the first avoidance hole 222. Then, one end of the first rotating rod 28 is plugged in the middle of the transmission rod 21. Then, sequentially, the first injection molded part sleeves the first rotating rod 28, the third injection molded part sleeves the second rotating rod 274, the straight gear II 234 sleeves the first rotating rod 28, the limit cap 29 is plugged at one end, away from the rotating hole 2741, of the second rotating rod 274, and the second injection molded part sleeves the first rotating rod 28. By using mutual limitation of the first face gear 24, the straight gear V 236, the straight gear II 234 and the limit cap 29, the second rotating rod 274 can be limited in the rotating hole 2741 to cooperate with the connection of the first shell 22 and the second shell 27. The whole gear set 200 and the motor 26 are completely limited after the two transmission rods 21 pass through the second avoidance hole 277, so that the gear box 2 is completely mounted.

Figure 13:
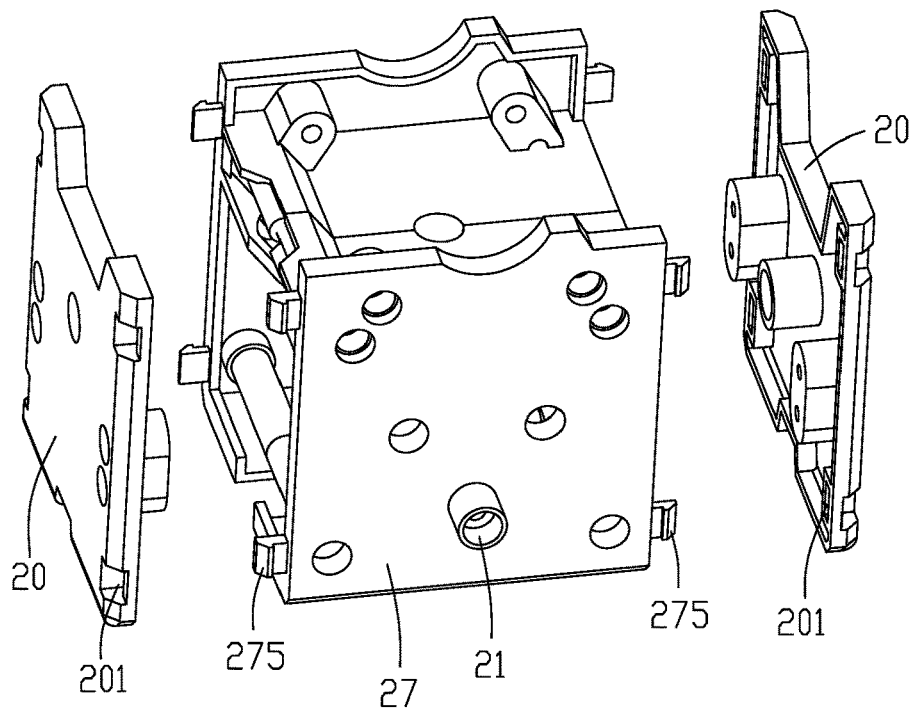
FIG. 13 is an exploded view of a part with a gear box in the present disclosure.
Figure 14:
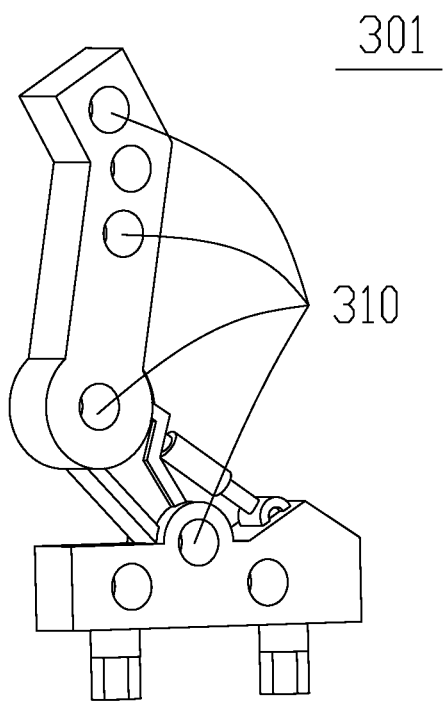
FIG. 14 is a schematic diagram of a force arm connecting rod in the present disclosure.
Figure 15:
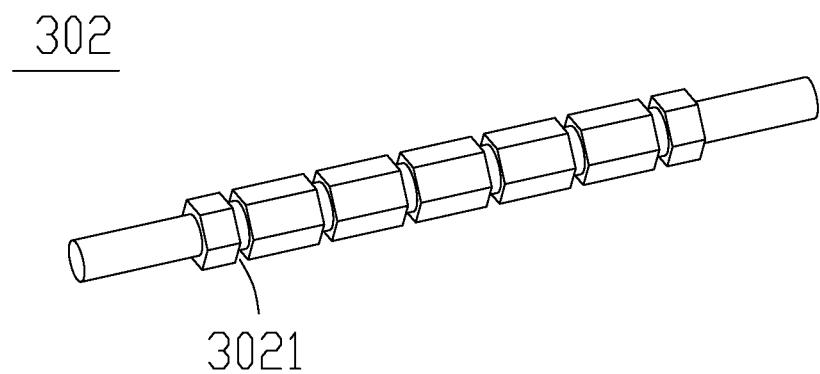
FIG. 15 is a schematic diagram of a third rotating rod in the present disclosure.
Figure 16:
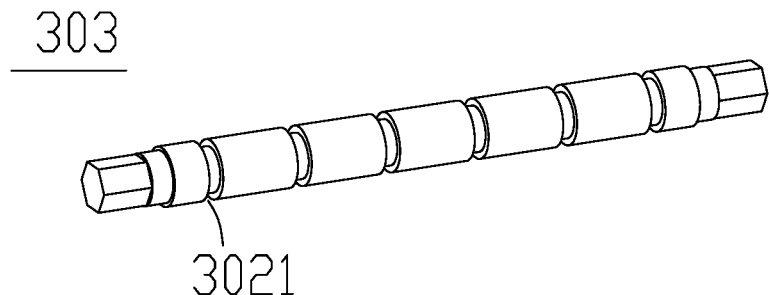
FIG. 16 is a schematic diagram of a fixed rod in the present disclosure.
Figure 17:
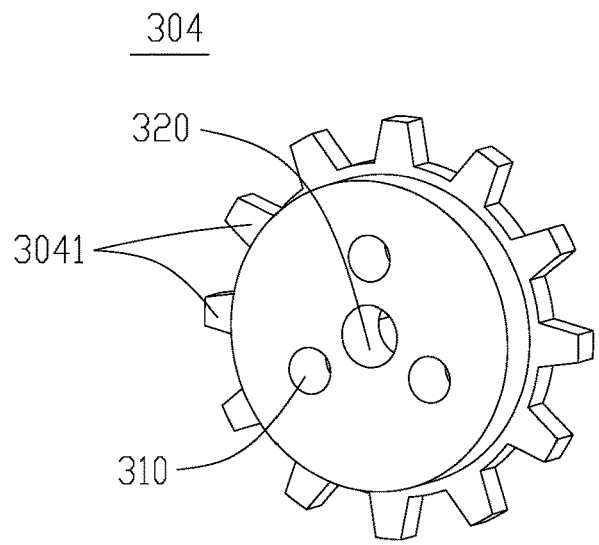
FIG. 17 and FIG. 18 are structural diagrams of a second cam in the present disclosure.
Figure 18:
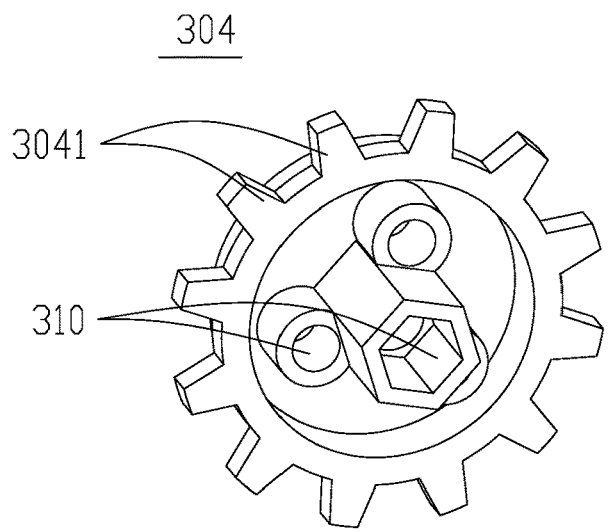
Figure 19:
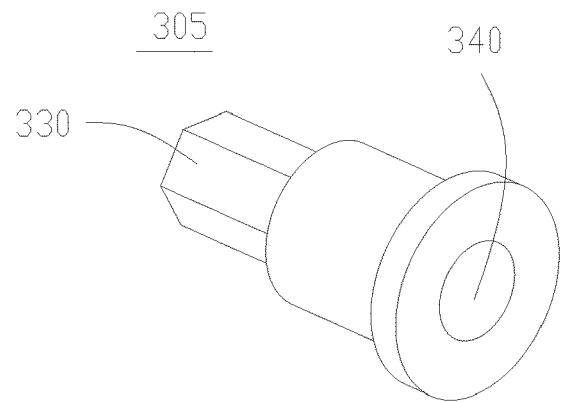
FIG. 19 is a schematic diagram of a switch part in the present disclosure.
Figure 20:
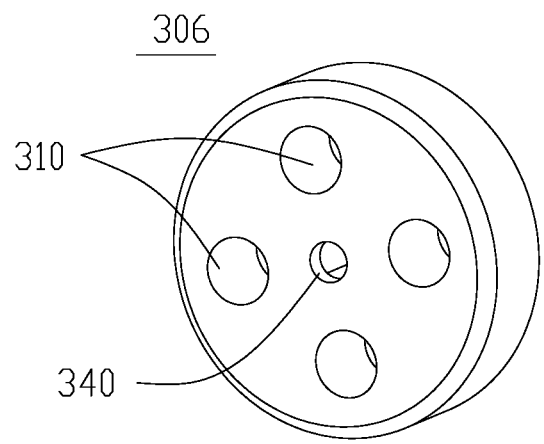
FIG. 20 and FIG. 21 are structural diagrams of a first cam in the present disclosure.
Figure 21:
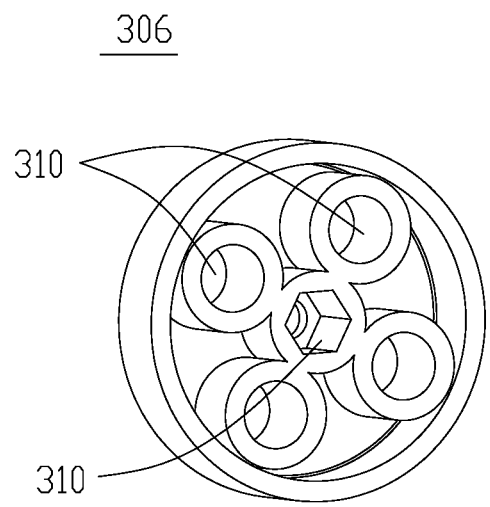
Figure 22:
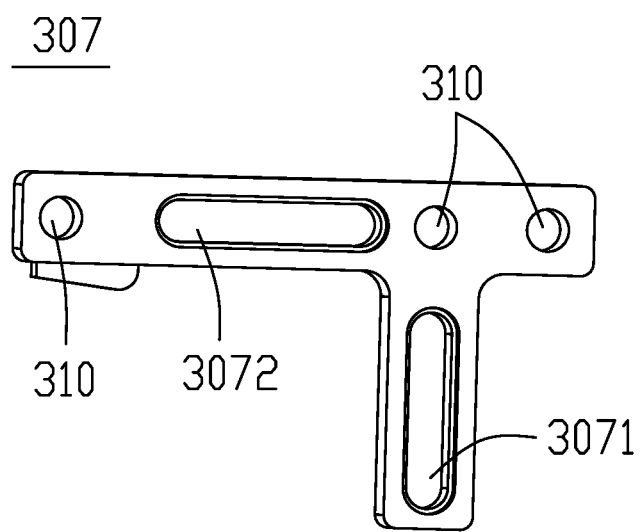
FIG. 22 is a schematic diagram of a T-shaped connecting rod in the present disclosure.
Figure 23:
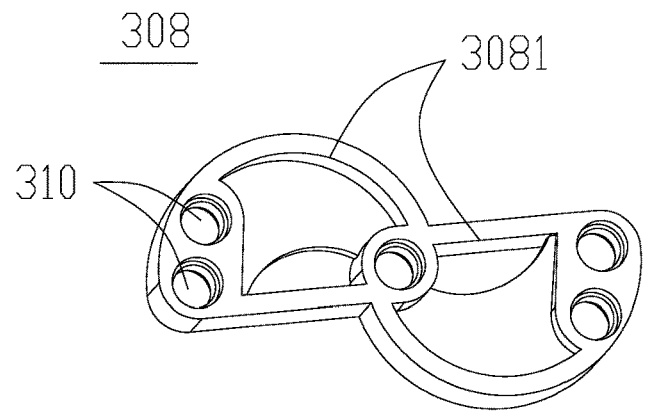
FIG. 23 is a schematic diagram of a symmetrical semi-circular piece in the present disclosure.
Figure 24:
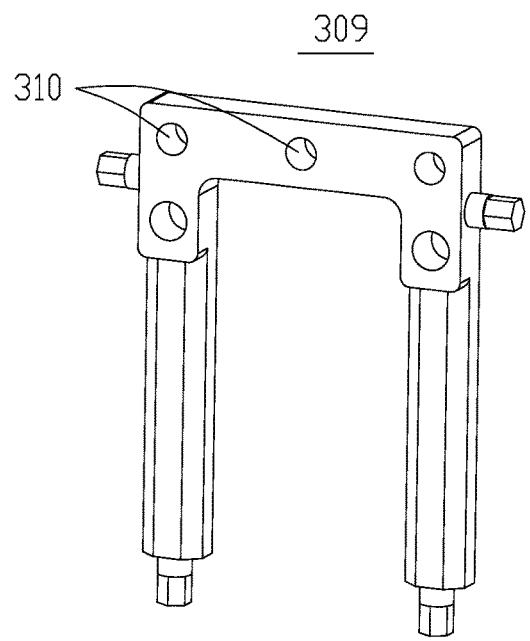
FIG. 24 is a schematic diagram of a U-shaped piece in the present disclosure.
Figure 25:
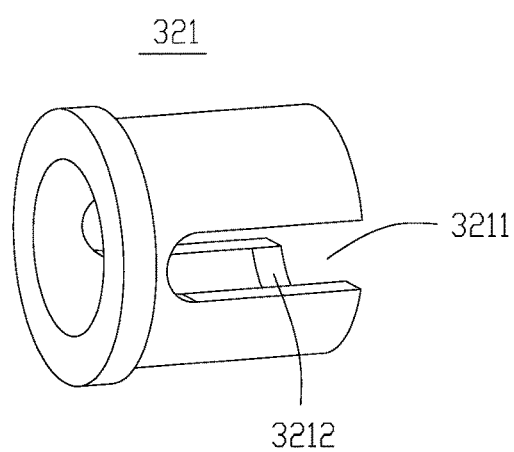
FIG. 25 is a schematic diagram of a fixed sleeve in the present disclosure.
Figure 26:
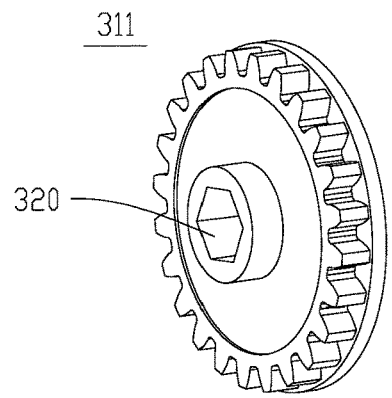
FIG. 26 and FIG. 27 are schematic diagrams of a third straight gear in the present disclosure.
Figure 27:
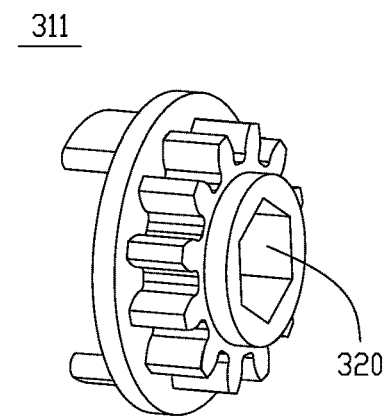
Figure 28:
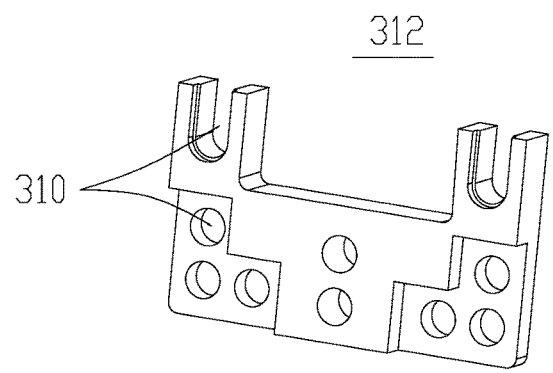
FIG. 28 is a schematic diagram of a fixed plate in the present disclosure.
Figure 29:
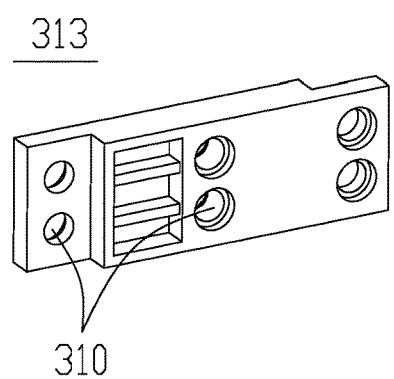
FIG. 29 is a schematic diagram of a connecting plate in the present disclosure.
Figure 30:
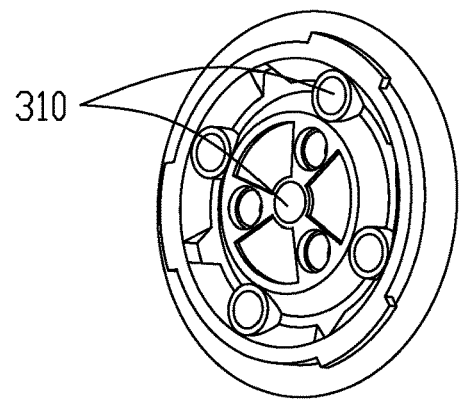
FIG. 30 is a schematic diagram of a wheel in the present disclosure.
Figure 31:
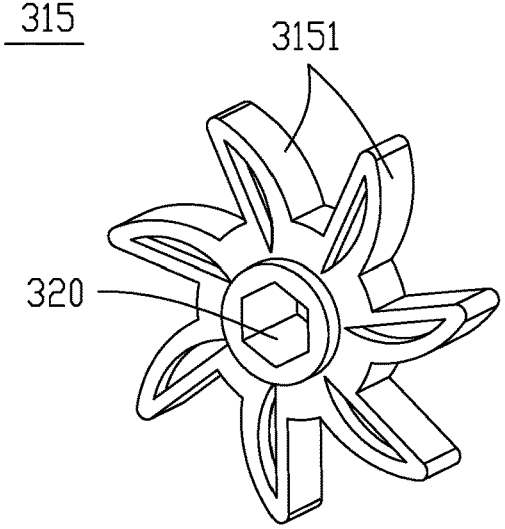
FIG. 31 is a schematic diagram of a fluctuating gear in the present disclosure.
Figure 32:
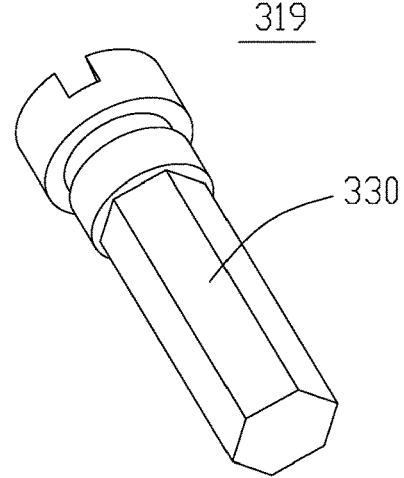
FIG. 32, FIG. 33 and FIG. 34 are schematic diagrams of a bolt in the present disclosure.
Figure 33:
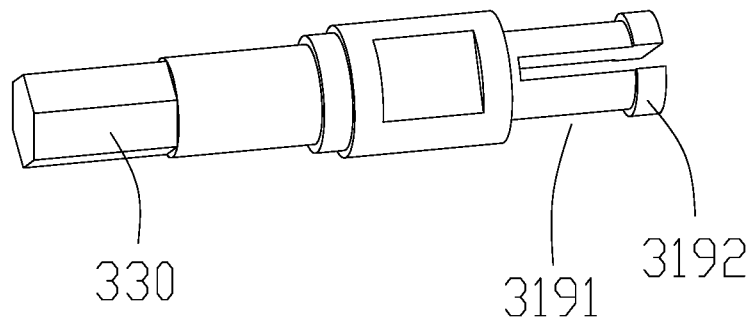
Figure 34:
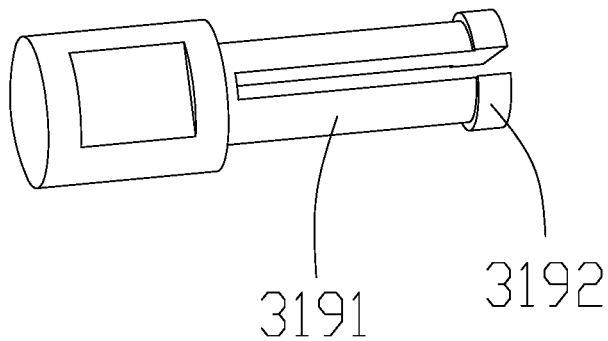
Figure 35:
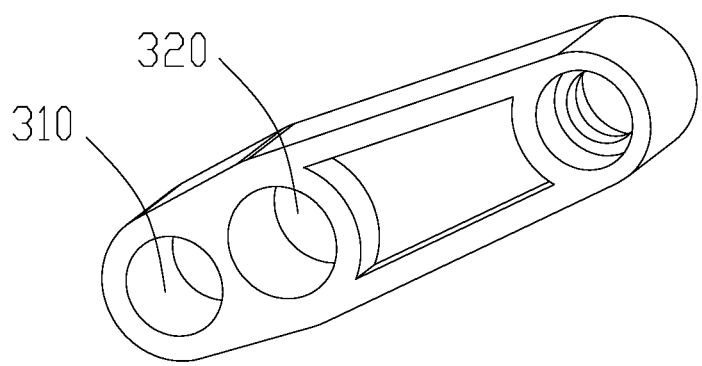
FIG. 35 is a schematic diagram of a straight-line connecting rod in the present disclosure.
Figure 36:
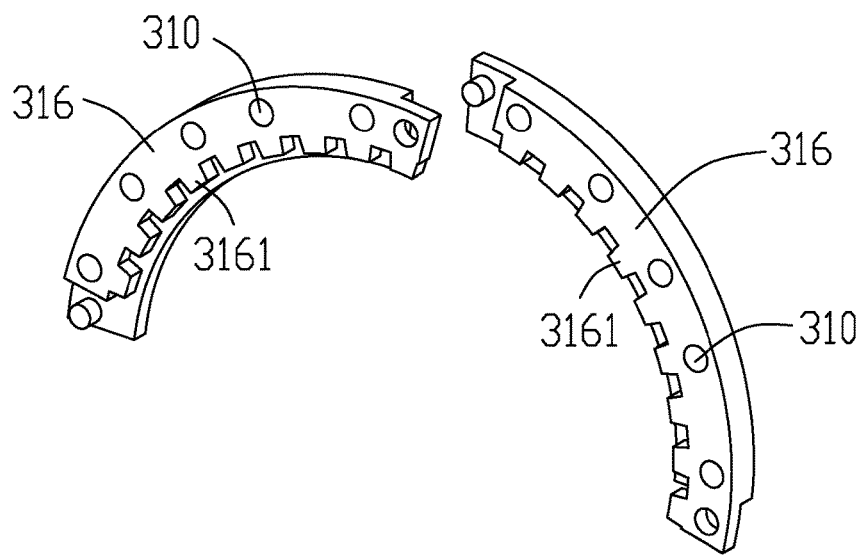
FIG. 36 is an exploded view of two arc-shaped connecting rods in the present disclosure.

In one embodiment, referring to FIG. 13, the first shell 22 protrudes on one side opposite to the second shell 27 to form a plurality of first plugging ends 221, a plurality of first plugging grooves 271 are formed in one side, opposite to the first shell 22, of the second shell 27, and the first plugging end 221 is arranged in the first plugging groove 271 so as to connect the first shell 22 and the second shell 27. The gear box 2 also includes a plurality of reinforcing cover plates 20. A plurality of first clamping holes 201 are formed in the reinforcing cover plate 20. A plurality of first clamping buckles 275 are arranged on both sides of the first shell 22 and the second shell 27. The first clamping buckle 275 is clamped with the first clamping hole 201, so that the reinforcing cover plates 20 are fixed on the first shell 22 and the second shell 27. The connection between the first shell 22 and the second shell 27 can be reinforced by the reinforcing cover plate 20, so that the first shell 22 is prevented from being separated from the second shell 27. In the embodiment, the first shell 22 and the second shell 27 are connected in left and right directions, and the number of the reinforcing cover plates 20 in one gear seat 2 is two, and the reinforcing cover plates 20 are located on the front and rear sides of the gear box 2. In other embodiments, the number of the reinforcing cover plates 20 in one gear box 2 can be four, and the reinforcing cover plates 20 are respectively arranged on four side walls of the gear box 2.

In other embodiments, the first shell 22 can be detachably connected to the second shell 27 directly by means of buckling or screwing, and the connection mode between the first shell 22 and the second shell 27 is not limited herein.

In one embodiment, referring to FIG. 1, the head part 1 is rotatably connected with the gear box 2, and the head part 1 is located at one of the top, front and back positions of the gear box 2, so that the diversity of assembly positions of the head part 1 is improved, and the user can adjust the position of the head part 1 according to the assembled assembly component 3, and the creativity of the user for assembling toys is increased.

Figure 4:
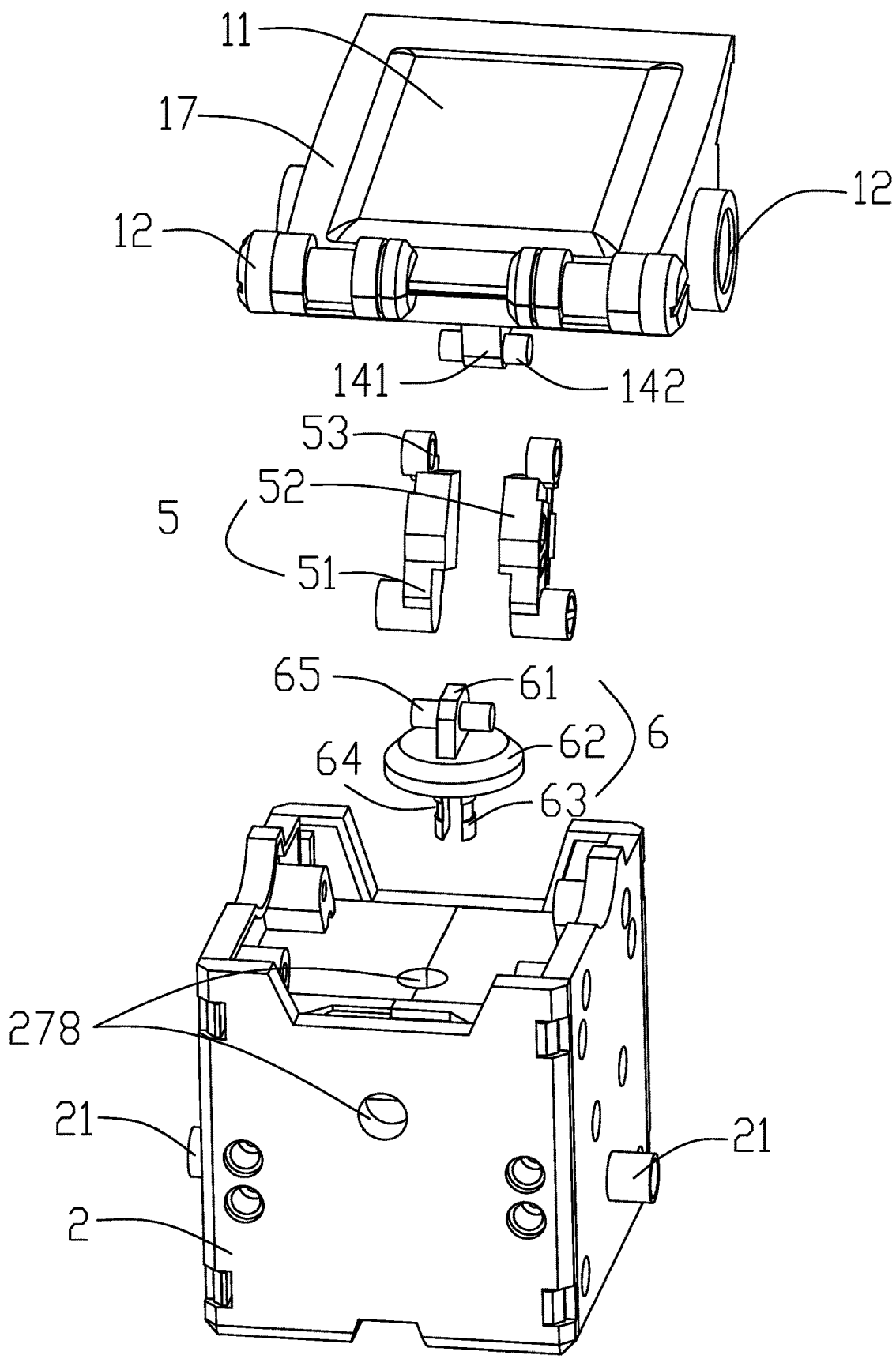
FIG. 4 is an exploded view of a part without an assembly component in the present disclosure.

In one embodiment, referring to FIG. 4, a first connecting rod 6 and a second connecting rod 5 are arranged between the head part 1 and the gear box 2, and the first connecting rod 6 is rotatably connected with the second connecting rod 5. The first connecting rod 6 is configured to drive the head part 1 to rotate along a central axis of the first connecting rod 6 under the action of external force, and the second connecting rod 5 is configured to drive the head part 1 to rotate along a direction perpendicular to the central axis of the first connecting rod 6 under the action of external force. If the head part 1 is mounted on a top surface of the gear box 2, the head part 1 can rotate along the Z axis through the first connecting rod 6, and the head part 1 can rotate along the X axis through the second connecting rod 5. If the head part 1 is mounted on the front side wall of the gear box 2, the head part 1 can rotate along the Y axis through the first connecting rod 6, and the head part 1 can rotate along the X axis through the second connecting rod 5, so that the angle between the head part 1 and the gear box 2 is increased, and the interestingness of assembling the robot toy in the embodiment is increased.

Wherein, it should be noted that the Z axis is in the direction of upper and lower ends of the gear box 2, the X axis is in the front-and-rear direction of the gear box 2, and the Y axis is in the left-and-right direction of the gear box 2.

Specifically, referring to FIG. 4, the first connecting rod 6 includes a first limit plate 62, a fourth clamping block 64 arranged at the bottom of the first limit plate 62, and a third lug 61 arranged on the top of the first limit plate 62. Both sides of the third lug 61 protrude to form a first rotating part 65, the fourth clamping block 64 is a cylinder, and a circumferential bottom of the cylinder protrudes to form an annular clamping block 63. The bottom of the head part 1 protrudes to form a fourth lug 141. Both sides of the fourth lug 141 protrude to form a second rotating part 142. Head assembly holes 278 are formed in the front and rear side walls and the top surface of the gear box 2 at central positions. The second connecting rod 5 includes a left connecting rod 52 and a right connecting rod 51, and shaft holes 53 are formed in upper and lower ends of the left connecting rod 52 and the right connecting rod. The fourth clamping block 64 is plugged into the head assembly hole 278, and the annular clamping block 63 and the first limit plate 62 are limited at both ends of the head assembly hole 278, so that the first connecting rod 6 is rotatably connected with the gear box 2. The shaft holes 53 in the upper and lower ends of the left connecting rod 52 and the right connecting rod respectively sleeve the second rotating part 142 and the first rotating part 65, and the head part 1 is connected with the first connecting rod 6 through the second connecting rod 5, so that the head part 1 can be rotate in a direction perpendicular to the central axis of the first connecting rod 6 under the action of external force, and the rotating angle of the head part 1 can be convenient for the user to adjust.

Certainly, in other embodiments, the head part 1 can be connected to the gear box 2 through the first connecting rod 6 and the second connecting rod 5 in turn, that is, the head assembly hole 278 is formed in the bottom of the head part 1, and the second clamping block 3212 of the first connecting rod 6 is plugged at the bottom of the head part 1. The fourth lug 141 is arranged on the gear box 2, and the first connecting rod 6 and the gear box 2 are connected through the second connecting rod 5, so that the gear box 2 can rotate in multiple directions. The positional relationship and the structures of the first connecting rod 6 and the second connecting rod 5 are not limited here. For example, the second connecting rod 5 can only include a left connecting rod 52.

In one embodiment, the power supply module 11 is a solar panel, so that when the assembly robot toy is arranged by the user in the sunlight, the gear box 2 and the head part 1 can be driven to move by cooperating with the assembly component 3.

Figure 5:
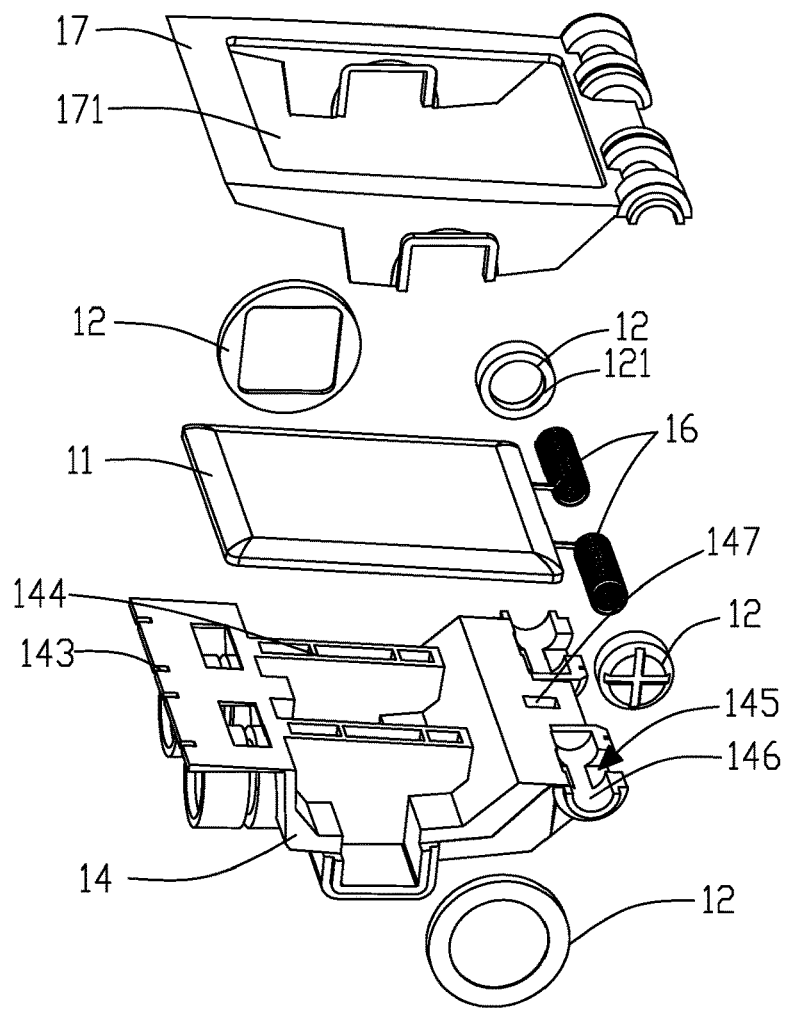
FIG. 5 is an explosive view of a head part in the present disclosure.
Figure 6:
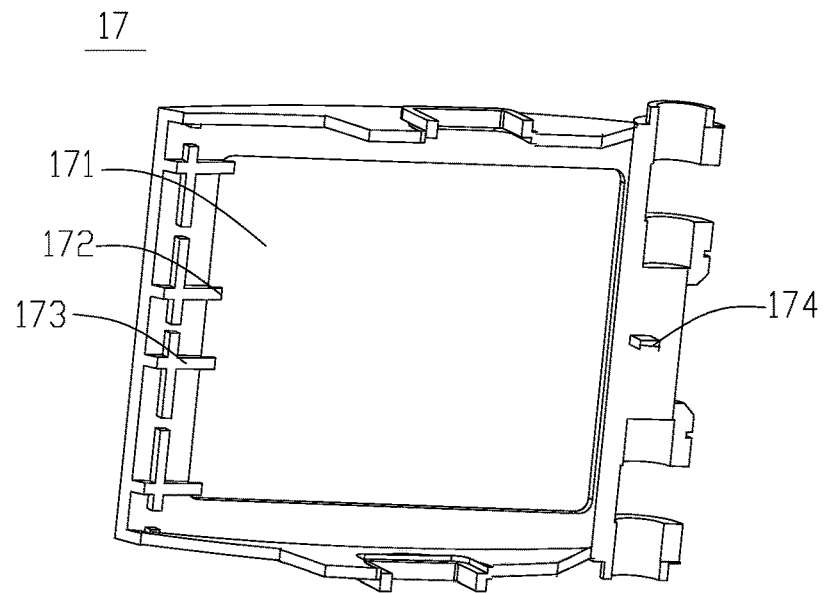
FIG. 6 is a structural diagram of a face shell in the present disclosure.
Figure 7:
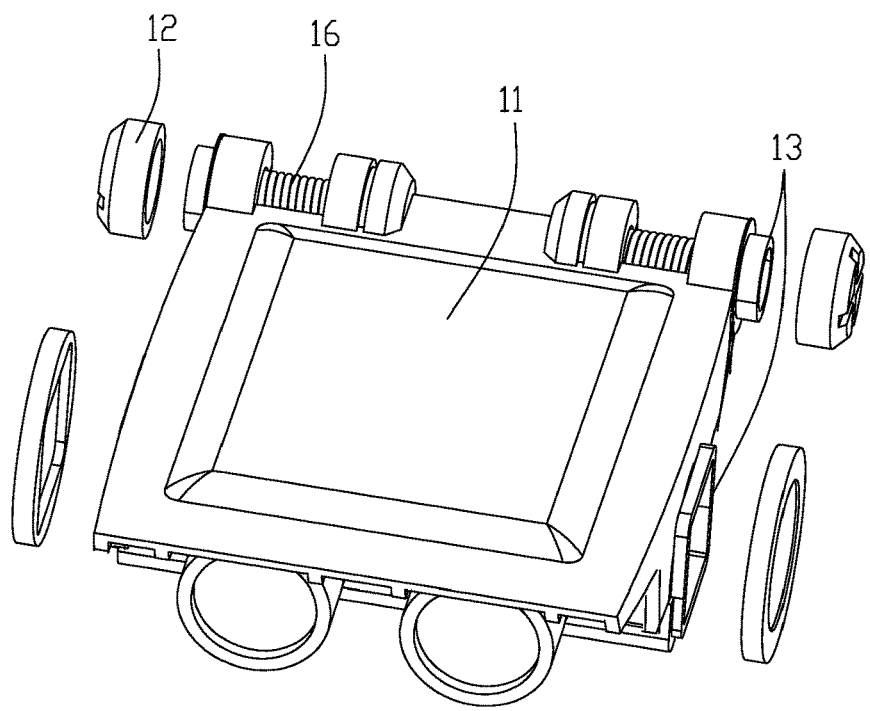
FIG. 7 is an exploded view of a part with a head part in the present disclosure.
Figure 8:
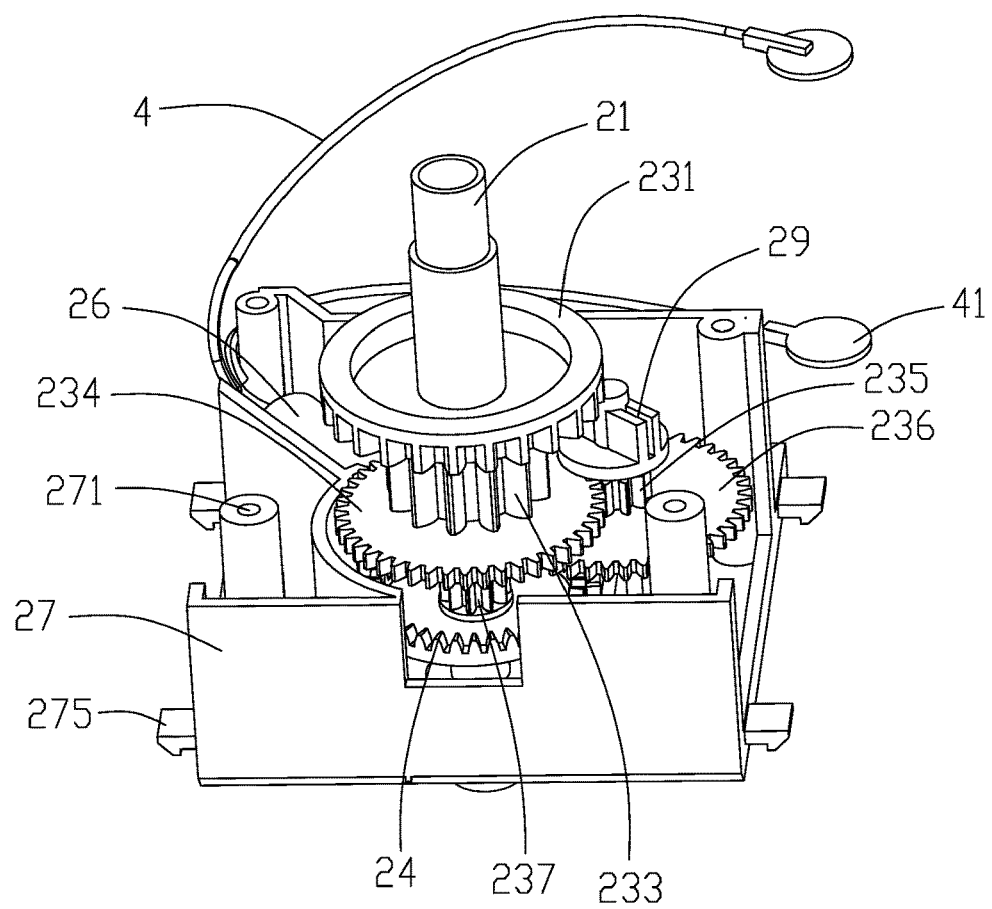
FIG. 8 is an assembly diagram of a gear set, a motor and a transmission rod mounted on a second shell in the present disclosure.

Specifically, in the embodiment, referring to FIG. 5 to FIG. 7, the head part 1 includes a bottom shell 14, a face shell 17 which is detachably connected with the bottom shell 14 and forms a third mounting cavity 144 and two fourth mounting cavities 145 with the bottom shell 14, and two conducting springs 16 respectively arranged in the two fourth mounting cavities 145. The two fourth mounting cavities 145 are arranged at intervals and are both connected with the third mounting cavity 144, and third avoidance holes 145 are formed in the face shell 17 and/or the bottom shell 14 at the positions corresponding to the fourth mounting cavities 145. The solar panel is arranged in the third mounting cavity 144, and a display port 171 is formed in the face shell 17 at the position corresponding to the solar panel, so that the solar panel is irradiated with light energy. The motor 26 is electrically connected with two conducting wires 4, the tail end of the conducting wire 4 is provided with a conducting plate 41, and the conducting plate 41 is plugged in the conducting spring 16. By using the third avoidance hole 145, the conducting plate 41 can be conveniently plugged on the conducting spring 16, and the conducting plate 41 and the conducting spring 16 can be conveniently assembled by the user and electrically connected to the solar panel and the motor 26.

In one embodiment, the conducting spring 16 is integrally welded with the solar panel at the factory. The bottom of one end of the face shell 17 extends downward to form a second plugging end 174, the bottom of the other end of the face shell 17 extends downward to form a plurality of first stop blocks 173 arranged at intervals, and the first stop block 173 protrudes at the bottom of one side opposite to the second plugging end 174 to form a second stop block 172.

A second plugging groove 147 with a length larger than the length of the second plugging end 174 is formed in the bottom shell 14, so that after the solar panel and the conducting spring 16 are mounted in the third mounting cavity 144 and the fourth mounting cavity 145, a front end of the bottom shell 14 is arranged above the second stop block 172, and the second plugging end 174 is arranged in the second plugging groove 147. The length of the second plugging end 147 is larger than that of the second plugging end 174, so that the second plugging end 174 can be conveniently arranged in the second plugging groove 147. The head part 1 also includes a plurality of cover bodies 12 with accommodating grooves 121, the bottom shell 14 is connected with the face shell 17 to form first joint ends 13 on both sides of the head part 1, and the first joint ends 13 are arranged in the accommodating grooves 121. The connection stability of the bottom shell 14 and the face shell 17 can be improved by using the cover bodies 12.

Here, it should be noted that the maximum output power of the solar panel to convert light energy into electric energy is not greater than the maximum power of the motor 26, so that the motor 26 is prevented from being easily damaged when the solar panel is directly connected with the motor 26. Although the voltage output by the solar panel in this way is unstable, the driving of the motor 26 is not influenced. Certainly, in order to stabilize the output voltage of the solar panel, a circuit board may be configured between the solar panel and the motor 26, wherein the circuit board is arranged in the gear box 2 or the head part 1.

In other embodiments, the solar panel can be directly pasted on an upper surface of the head part 1 or embedded in the upper surface of the head part 1, and the conducting plate 41 and the conducting spring 16 can be replaced by connectors, the power supply module 11 can also be a battery, and the bottom shell 14 and the face shell 17 can be detachably connected directly through screws or buckles.

In the embodiment, two second cylinders 15 are formed at the bottom of the bottom shell 14 and form two eyes of the head part 1, and the gear box 2 can be a robot body and is matched with the assembly component 3 to form a robot.

In the above embodiment, referring to FIG. 14 to FIG. 36, the assembly component 3 includes a plurality of bolts, fixed plates 312, connecting plates 313, third rotating rods 302, fixed rods 303, first cams 306, second cams 304, fluctuating gears 315, third straight gears 311, straight-line connecting rods 322, force arm connecting rods 301, arc-shaped connecting rods 316, T-shaped connecting rods 307, symmetrical semicircular pieces 308, U-shaped pieces 309 and wheels 314.

Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the bolt and the fixed rod. The third straight gear 311 can be used for being meshed with the second straight gear 23. The third straight gear 311, the second cam 304, the fluctuating gear 315 and the wheel 314 further can detachably sleeve the third rotating rod 302 or the fixed rod 303, and the second cam 304 is detachably plugged in the transmission rod 21. Thus, the user can assembly the assembly component 3 on the gear box 2 according to thoughts in a self-defined manner so as to realize the assembly of the robot.

Specifically, the bolt includes a rotating pin and a fixed pin. Wherein, one end of the rotating pin, both ends of the fixed pin and both ends of the fixed rod 303 are all polygonal cylinders 330, and one end of the rotating pin is a first cylinder 3191, and the first cylinder 3191 protrudes outward at one end away from the first polygonal cylinder 330 to form a third clamping block 3192.

A plurality of first assembly holes 310 which can be matched with the polygonal cylinder 330 and the first cylinder 3191 are formed in the side wall of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314. Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the rotating pin, the bolt and the fixed rod 303. A second assembly hole 320 for plugging the fixed rod 303 and the third rotating rod 302 is formed in the middle of the third straight gear 311, the second cam 304 and the fluctuating gear 315, so that the third straight gear 311, the second cam 304 and the fluctuating gear 315 can sleeve the fixed rod 303 and the third rotating rod 302. Besides the first assembly hole 310, a third assembly hole 340 is formed in the middle of the first cam 306, and is used for being matched and connected with both ends of the third rotating rod 302.

Wherein, the first assembly hole 310 and the third assembly hole 340 are both circular holes. The diameter of the third assembly hole 340 is slightly smaller than that of the third assembly hole 340. The second assembly hole 320 is a polygonal hole. The longest width of the polygonal cylinder 330 is matched with the diameter of the first assembly hole 310. The diameter of the first cylinder 3191 is slightly smaller than that of the first assembly hole 310. The width of the third clamping block 3192 is slightly larger than that of the first assembly hole 310. In this way, the polygonal cylinders 330 on the bolt and the rotating pin pass through the first assembly holes 310 of two parts, so that the two parts can be fixed and difficult to rotate. The first cylinder 3191 on the rotating pin passes through the first assembly holes 310 in the two parts, so that the two parts rotate mutually. And, the first cylinder 3191 passes through the first assembly hole 310 of one part, and the part can rotate along the first cylinder 3191.

The diameters of both ends of the third rotating rod 302 are smaller than the diameter of the first assembly hole 310 and are matched with the size of the third assembly hole 340. The assembly component 3 also includes a switch part 305. A third assembly hole 340 for plugging and connecting both ends of the third rotating rod 302 is formed in one end of the switch part 305. One end of the switch part 305 is also a polygonal cylinder 330 which is matched with the size of the first assembly hole 310, so that the third rotating rod 302 can rotate after passing through the first assembly hole 310, and then the switch part 305 is used for connecting the wheel 314, the second cam 304 and other parts.

A first sliding hole 3071 and a second sliding hole 3072 perpendicular to the first sliding hole 3071 are formed in the T-shaped connecting rod 307, and the widths of the first sliding hole 3071 and the second sliding hole 3072 are the same as the diameter of the first assembly hole 310. The first cylinder 3191 of the rotating pin is clamped and limited with the second sliding hole 3072 and the first sliding hole 3071 through the third clamping block 3192 after passing through the second sliding hole 3072 and the first sliding hole 3071, so that the first cylinder 3191 of the rotating pin can move back and forth along the length directions of the second sliding hole 3072 and the first sliding hole 3071.

The fluctuating gear 315 is provided with a plurality of arc-shaped teeth 3151 arranged around the fluctuating gear 315. The fluctuating gear 315 can be used for decoration or two adjacent arc-shaped teeth 3151 can accommodate one end of the straight-line connecting rod 322. The symmetrical semicircular piece 308 is formed by connecting two semicircular plates 3081 in central symmetry. A side wall of the second cam 304 is surrounded by first gear teeth 3041. The inner side of the arc-shaped connecting rod 316 is provided with second gear teeth 3161 meshed with the second cam 304, so that the assembly is convenient for the user.

In one embodiment, at least one plane is formed on an outer side wall of the third rotating rod 302. The shape of the second assembly hole 320 is consistent with the outer side wall of the third rotating rod 302, so that when the third straight gear 311 and the second cam 304 sleeve the third rotating rod 302, the third rotating rod 302 rotates to drive the third straight gear 311 and the second cam 304 to move and rotate, or when the third straight gear 311 and the second cam 304 rotate, the third rotating rod 302 is driven to rotate.

Specifically, the cross section of the outer side wall of the third rotating rod 302 is a hexagon, a pentagon, an octagon and the like. The cross section of an outer side wall of the fixed rod 303 is circular. The diameter of the fixed rod 303 is equal to the distance between two opposite sides of the hexagon, so that when the third straight gear 311 and the second cam 304 sleeve the fixed rod 303, the fixed rod 303 does not hinder the rotation of the third straight gear 311 and the second cam 304, and the assembly is convenient for the user.

In one embodiment, a plurality of annular clamping grooves 3021 are formed in the outer side walls of the fixed rod 303 and the third rotating rod 302 at equal intervals. The assembly component 3 also includes a plurality of fixed sleeves 321 sleeving the fixed rod 303 or the third rotating rod 302. At least one U-shaped opening 3211 is formed in a side wall of the fixed sleeve 321. One end of an inner side wall of the fixed sleeve 321 protrudes inward to form a second clamping block 3212 matched with the annular clamping groove 3021. And then, in order to fix the position of the third straight gear 311 and the second cam 304 on the fixed rod 303 or the third rotating rod 302, fixed sleeves 321 can respectively sleeve the third rotating rods 302 on both sides of the third gear and the second cam 304, and the second clamping block 3212 is clamped with the annular clamping groove 3021 to fix the fixed sleeve 321 on the third rotating rod 302 so as to limit the third straight gear 3102 and the second cam 304 on the fixed rod 303 or the third rotating rod 302.

In the above embodiment, referring to FIG. 37 to FIG. 54, the numbers of the gear box 2 and the head part 1 may be plural. In cooperation with the assembly component 3, the shape of the assembly robot toy may be assembled into a baby carriage robot 1001, a quadruped robot 1002, a turtle robot 1003, a puppy robot 1004, a beetle robot 1005, a Walker robot 1006, a crab robot 1007, a pudgy robot 1008, a crawling robot 1009, a zombie robot 1010 and the like.

Specifically, when the assembly robot toy is assembled into a baby carriage robot 1001, parts needed for the baby carriage robot 1001 and the positional relationship of the parts are as follows.

Figure 37:
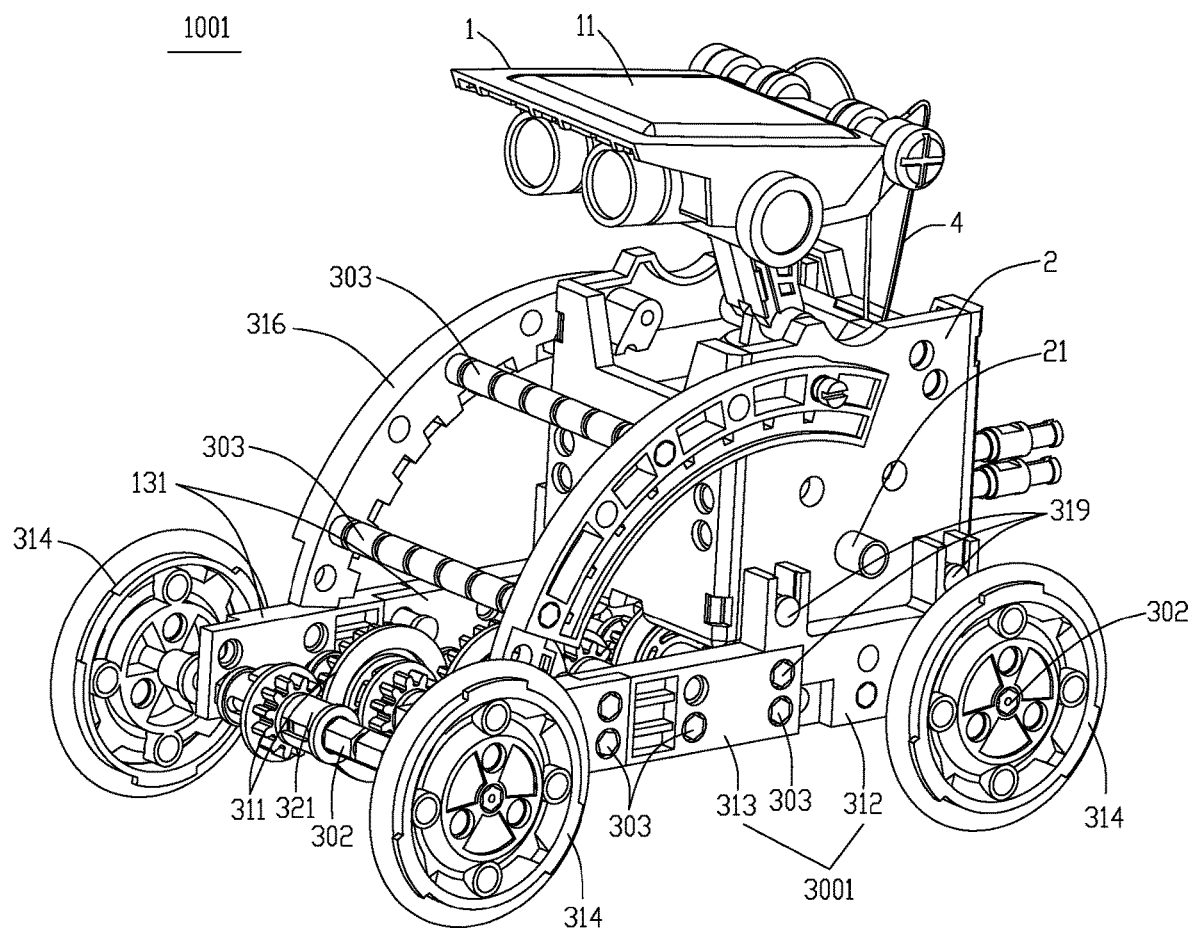
FIG. 37 is a schematic diagram of the form of a baby carriage robot in the present disclosure.
Figure 55:
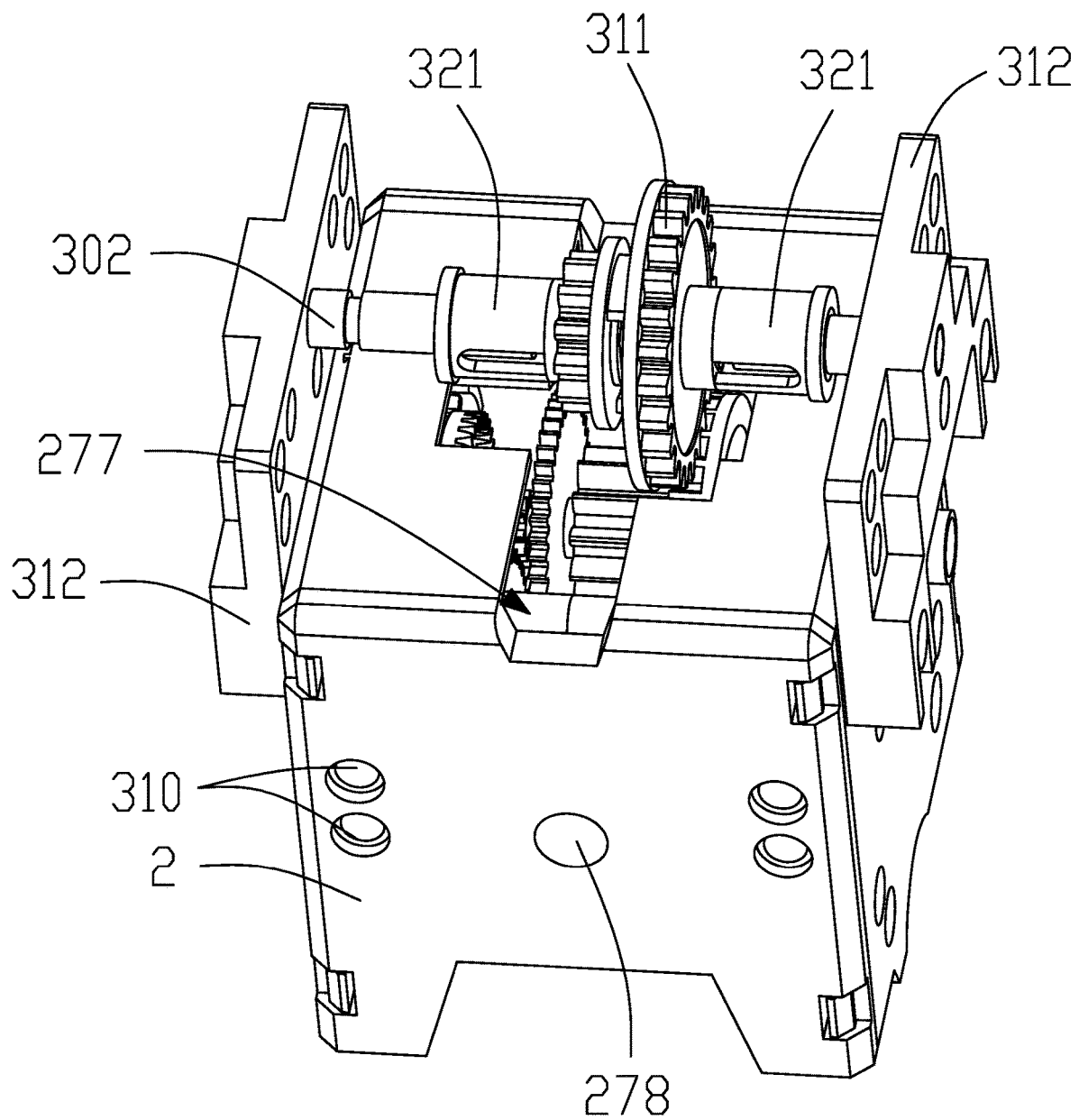
FIG. 55 is an assembly schematic diagram of a fixed plate, a third rotating rod and a third straight gear in the present disclosure.

Referring to FIG. 37, FIG. 55, and FIG. 56, the numbers of the gear boxes 2 and the head parts 1 are one, and the head part 1 is assembled on the top of the gear box 2. The number of the fixed plates 312 is two, and the two fixed plates 312 are respectively detachably arranged on the left and right side walls of the gear box 2 through bolts. The number of the connecting plates 313 is four, a front end of each fixed plate 312 is connected with another connecting plate 313 through one connecting plate 313, and each fixed plate 312 and two connecting plates 313 on the same side form a first long arm 3001. Wherein, the fixed plate 312 and the connecting plate 313 and the two connecting plates 313 are connected through bolts. The number of the third rotating rods 302 is two, and the two third rotating rods 302 are respectively located at front and rear ends of the first long arm 3001 and at the bottom of the gear box 2. The number of the wheels 314 is four, and both ends of each third rotating rod 302 are connected with the wheels 314 after respectively passing through two opposite first long arms 3001. Wherein, both ends of the third rotating rod 302 are connected to the wheels 314 through switch pins after respectively passing through the two opposite first long arms 3001. The number of the fixed rods 303 is five, and the five fixed rods 303 are plugged and arranged on the first long arm 3001 at intervals and between the two third rotating rods 302 and are located at the bottom of the gear box 2. The number of the third straight gears 311 is six, and the six third straight gears 311 respectively sleeve five fixed rods 303 and the third rotating rod 302 at the front end. The two adjacent third straight gears 311 are meshed, and the third straight gear 311 located at a rear end of the first long arm 3001 is meshed with the second straight gear 23.

Therefore, when the motor 26 drives the second straight gear 23 to rotate, the third rotating rod 302 located at the front end of the first long arm 3001 can rotate through the linkage of the third straight gear 311, that is, the two wheels 314 located at the front end of the first long arm 3001 can rotate, so that when the baby carriage robot 1001 is placed on the ground, the two wheels 314 located at the front end of the first long arm 3001 can drive the two wheels 314 located at the rear end of the first long arm 3001 to rotate during rotating so as to realize forward movement of the baby carriage robot 1001.

When the assembly robot toy is assembled into a quadruped robot 1002, parts needed for the quadruped robot 1002 and the positional relationship of the parts are as follows.

Figure 38:
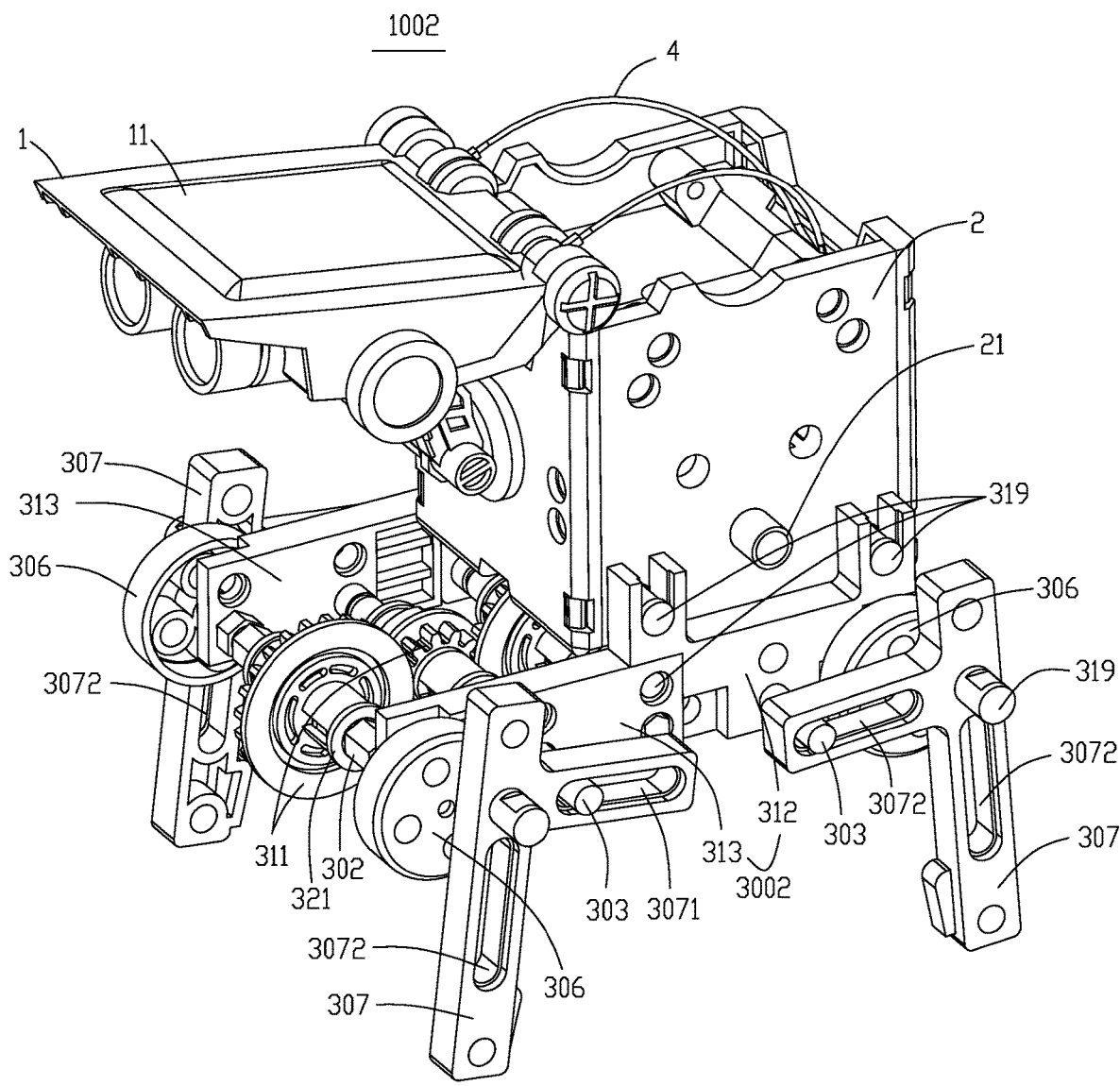
FIG. 38 is a schematic diagram of the form of a quadruped robot in the present disclosure.

Referring to FIG. 38, the numbers of the gear boxes 2 and the head parts 1 are one, and the head part 1 is arranged at a front end of the gear box 2. The number of the fixed plates 312 is two, and the two fixed plates 312 are respectively detachably arranged on the left and right side walls of the gear box 2 through bolts. The number of the connecting plates 313 is two, the two connecting plates 313 are respectively fixed at front ends of the two fixed plates 312. Wherein, the fixed plate 312 and the connecting plate 313 are connected through bolts. The two fixed plates 312 and the connecting plates 313 on the same side of the two fixed plates 312 respectively form two second long arms 3002.

The number of the third rotating rods 302 is two. The number of the first cams 306 is four. Both ends of one third rotating rod 302 are connected with the central positions of the first cams 306 after respectively passing through tail ends of two opposite fixed plates 312. Bod both ends of the other third rotating rod 302 are connected with the central positions of the first cams 306 after respectively passing through front ends of two opposite connecting plates 313. The number of the fixed rods 303 is three, and the three fixed rods 303 are plugged and arranged on the second long arm 3002 at intervals and located between the two third rotating rods 302. The number of the third straight gears 311 is five, and the five third straight gears 311 respectively sleeve three fixed rods 303 and two third rotating rods 302 and are located at the bottom of the gear box 2. Two adjacent third straight gears 311 are meshed, and the third straight gear 311 near the third rotating rod 302 at the front end is meshed with the second straight gear 23. The number of the T-shaped connecting rods 307 is four. Each T-shaped connecting rod 307 is connected with a non-central position of one first cam 306 at the position between the first sliding hole 3071 and the second sliding hole 3072 through a bolt. The first sliding hole 3071 of each T-shaped connecting rod 307 sleeves one end of one fixed rod 303 and is located above the second sliding hole 3072.

Therefore, when the motor 26 drives the second straight gear 23 to rotate, the two third rotating rods 302 can drive the cam to rotate through the linkage of the third straight gear 311, so that the T-shaped connecting rods 307 on both sides can move forward, and the quadruped robot 1002 can walk forward.

When the assembly robot toy is assembled into a turtle robot 1003, parts needed for the turtle robot 1003 and the positional relationship of the parts are as follows.

Figure 39:
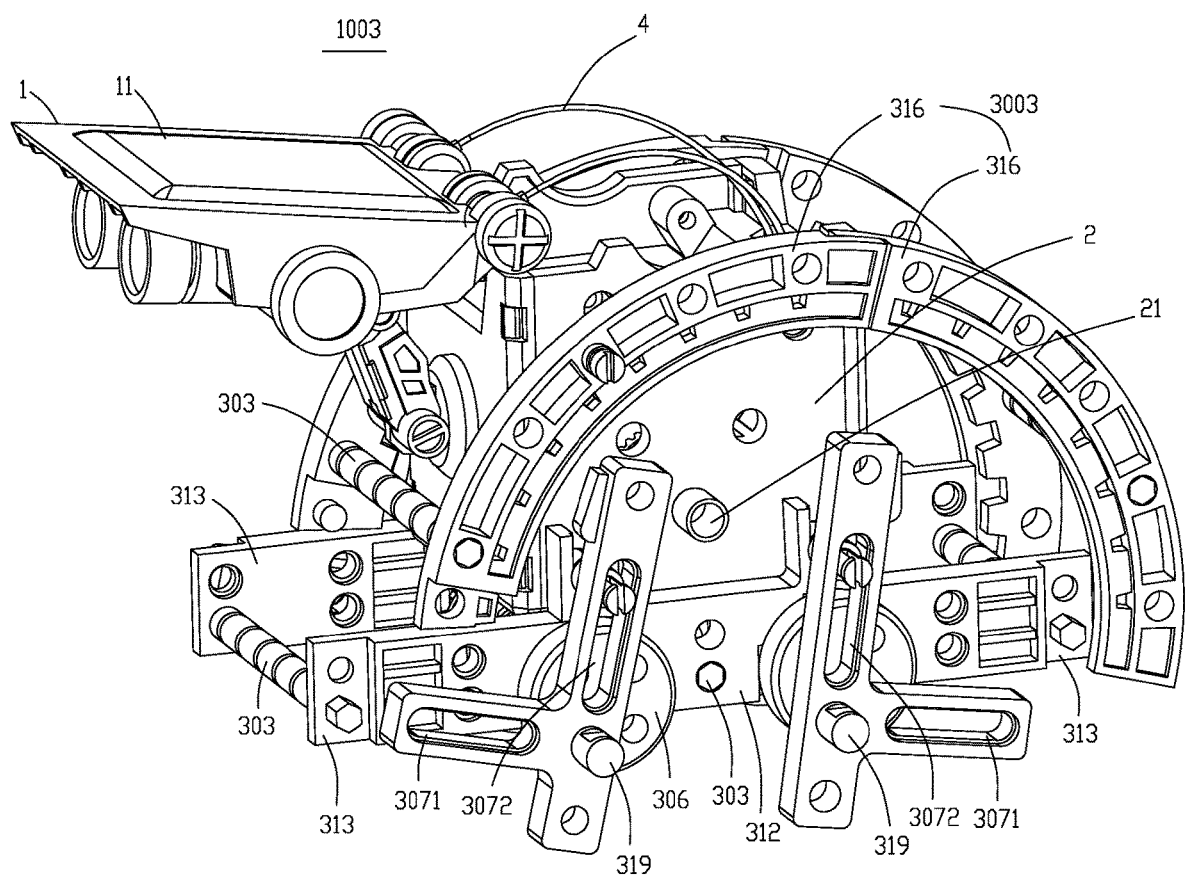
FIG. 39 is a schematic diagram of the form of a turtle robot in the present disclosure.

Referring to FIG. 39, the numbers of the gear boxes 2 and the head parts 1 are one, and the head part 1 is arranged at a front end of the gear box 2. The number of the fixed plates 312 is two, and the two fixed plates 312 are respectively detachably arranged on the left and right side walls of the gear box 2 through two bolts. The number of the connecting plates 313 is four, and front and rear ends of each fixed plate 312 are connected with one connecting plate 313. Wherein, the fixed plate 312 and the connecting plate 313 are connected through bolts. The number of the third rotating rods 302 is two. The number of the first cams 306 is four. Both ends of one third rotating rod 302 are connected with the first cams 306 after respectively passing through front ends of two opposite fixed plates 312. Both ends of the other third rotating rod 302 are connected with the non-central positions of the first cams 306 after respectively pass through rear ends of two opposite fixed plates 312. The numbers of the arc-shaped connecting rods 316 and the T-shaped connecting rods 307 are four. Each T-shaped connecting rod 307 is connected with a non-central position of the first cam 306 at the position between the first sliding hole 3071 and the second sliding hole 3072 through a bolt. The second sliding hole 3072 sleeves the bolt, connected with the gear box 2, of the fixed plate 312. Every two arc-shaped connecting rods 316 are connected to form a turtle shell piece 3003. Two turtle shell pieces 3003 are respectively detachably arranged on the left and right side walls of the gear box 2 through fixed bolts. One end of each turtle shell piece 3003 is located above the connecting plate 313 at a front end of the fixed plate 312. The other end of each turtle shell piece 3003 is located at the back of the connecting plate 313 at a rear end of the fixed plate 312. The number of the fixed rods 303 is five. One fixed rod 303 is connected between every two opposite arc-shaped connecting rods 316. Both ends of one fixed rod 303 are arranged on two opposite fixed plates 312 and located between two third rotating rods 302. Both ends of one fixed rod 303 are respectively plugged into two opposite connecting plates 313 at the front end of the fixed plate 312. Both ends of one fixed rod 303 are respectively plugged into two opposite connecting plates 313 at the rear end of the fixed plate 312. The number of the third straight gears 311 is three. The three third straight gears 311 are respectively arranged on the two third rotating rods 302 and the fixed rods 303 located between the two third rotating rods 302. The third straight gears 311 are located at the bottom of the gear box 2. Two adjacent third straight gears 311 are meshed. The third straight gear 311 located in the middle is meshed with the second straight gear 23.

In this way, the shape of a turtle is formed. When the motor 26 drives, the second straight gear 23 is driven to rotate. Therefore, the two third rotating rods 302 rotate through the linkage of the third straight gear 311 so as to drive the first cam 306 to rotate, so that the bottoms of the front and rear T-shaped connecting rods 307 move forward to realize forward movement of the whole turtle robot 1003 like a turtle.

When the assembly robot toy is assembled into a puppy robot 1004, parts needed for the puppy robot 1004 and the positional relationship of the parts are as follows.

Figure 40:
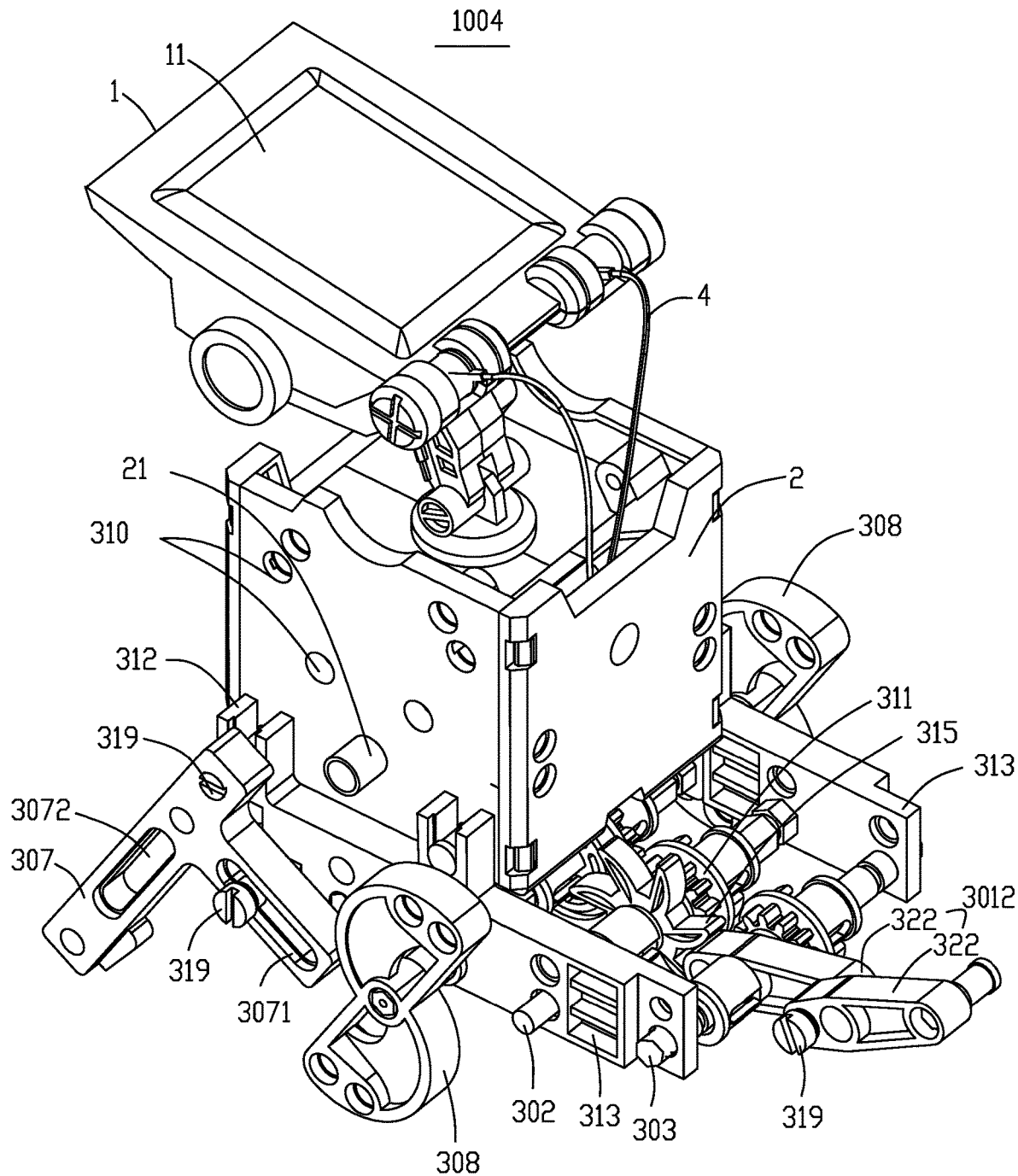
FIG. 40 and FIG. 41 are schematic diagrams of the form of a puppy robot in the present disclosure.
Figure 41:
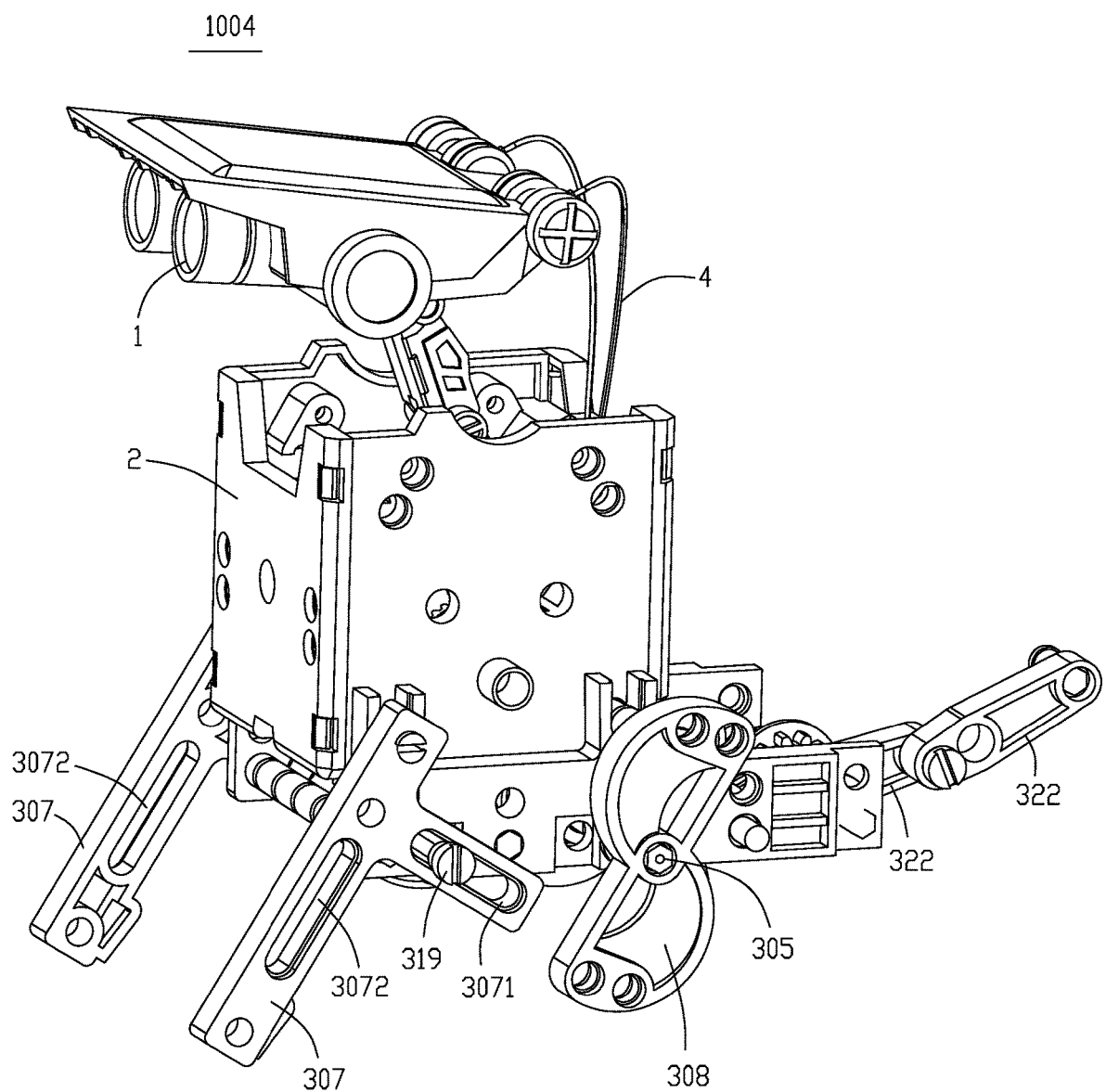

Referring to FIG. 40 and FIG. 41, the numbers of the gear boxes 2 and the head parts 1 are one, and the head part 1 is arranged on the top of the gear box 2. The number of the fixed plates 312 is two, and the two fixed plates 312 are respectively detachably arranged on the left and right side walls of the gear box 2 through two bolts. The number of the connecting plates 313 is two, the two connecting plates 313 are respectively fixed at rear ends of the two fixed plates 312. Wherein, the fixed plate 312 and the connecting plate 313 are connected through bolts. The numbers of the third rotating rods 302 and the symmetrical semicircular pieces 308 are two. Both ends of one third rotating rod 302 are connected with one symmetrical semicircular piece 308 after respectively passing through rear ends of two opposite fixed plates 312. Both ends of the other third rotating rod 302 are respectively plugged in the middle positions of two opposite connecting plates 313. Wherein, both ends of the third rotating rod 302 are connected to one symmetrical semicircular piece 308 through switch pins after respectively passing through rear ends of two opposite fixed plates 312. The number of the fixed rods 303 is three. Both ends of one fixed rod 303 are detachably arranged at rear ends of two opposite connecting plates 313. The two fixed rods 303 are respectively located at front ends and middle positions of the two opposite fixed plates 312. Both ends of each fixed rod 303 are respectively plugged in the front ends and middle positions of the two opposite fixed plates 312. The third rotating rod 302 and the fixed rod 303 are both located below the gear box 2. The number of the third straight gears 311 is at least three. The at least three third straight gears 311 respectively sleeve the two third rotating rods 302 and the fixed rod 303 located in the middle of the fixed plate 312. Two adjacent third straight gears 311 are meshed, and the third straight gear 311 located on the fixed rod 303 is meshed with the second straight gear 23. The number of the straight-line connecting rods 322 is two. The two straight-line connecting rods 322 are detachably connected through bolts to form a tail piece 3012. The tail piece 3012 sleeves the fixed rod 303 at the rear end of the connecting plate 313. The number of the fluctuating gears 315 is one. The fluctuating gear 315 sleeves the third rotating rod 302 located in the middle of the connecting plate 313. One end of the tail piece 3012 is arranged between two adjacent arc-shaped teeth 3151. The number of the T-shaped connecting rods 307 is two. One end of each T-shaped connecting rod 307 respectively sleeves the bolts, connected with the fixed plate 312, of the left and right side walls of the gear box 2. The first sliding hole 3071 is limited on the fixed plate 312 through the bolt and located between two fixed rods 303. The second sliding hole 3072 and the first sliding hole 3071 are splayed.

In this way, the shape of a puppy is formed. And when the second straight gear 23 rotates to drive the third straight gear 311 to rotate, the third rotating rod 302 can rotate and drive the symmetrical semicircular pieces 308 on both sides to rotate, so that the puppy robot 1004 can move forward. In addition, when the third rotating rod 302 rotates, the fluctuating gear 315 can be driven to rotate. During the rotation of the fluctuating gear 315, the arc-shaped teeth 3151 located above the tail piece 3012 can drive the tail piece 3012 to rotate, so that the tail piece 3012 located above the fixed rod 303 rotates closer to the gear box 2. In this process, the bottom of the tail piece 3012 can fall between the next two adjacent arc-shaped teeth 3151. And when the bottom of the tail piece 3012 falls between the next two adjacent arc-shaped teeth 3151, the tail piece 3012 located above the fixed rod 303 rotates to the rear part away from the gear box 2 under the action of own gravity, so that the tail piece 3012 can swing back and forth during the rotation of the fluctuating gear 315, the tail wagging action of the puppy is realized, and the simulation of the puppy robot 1004 is improved.

When the assembly robot toy is assembled into a beetle robot 1005, parts needed for the beetle robot 1005 and the positional relationship of the parts are as follows.

Figure 42:
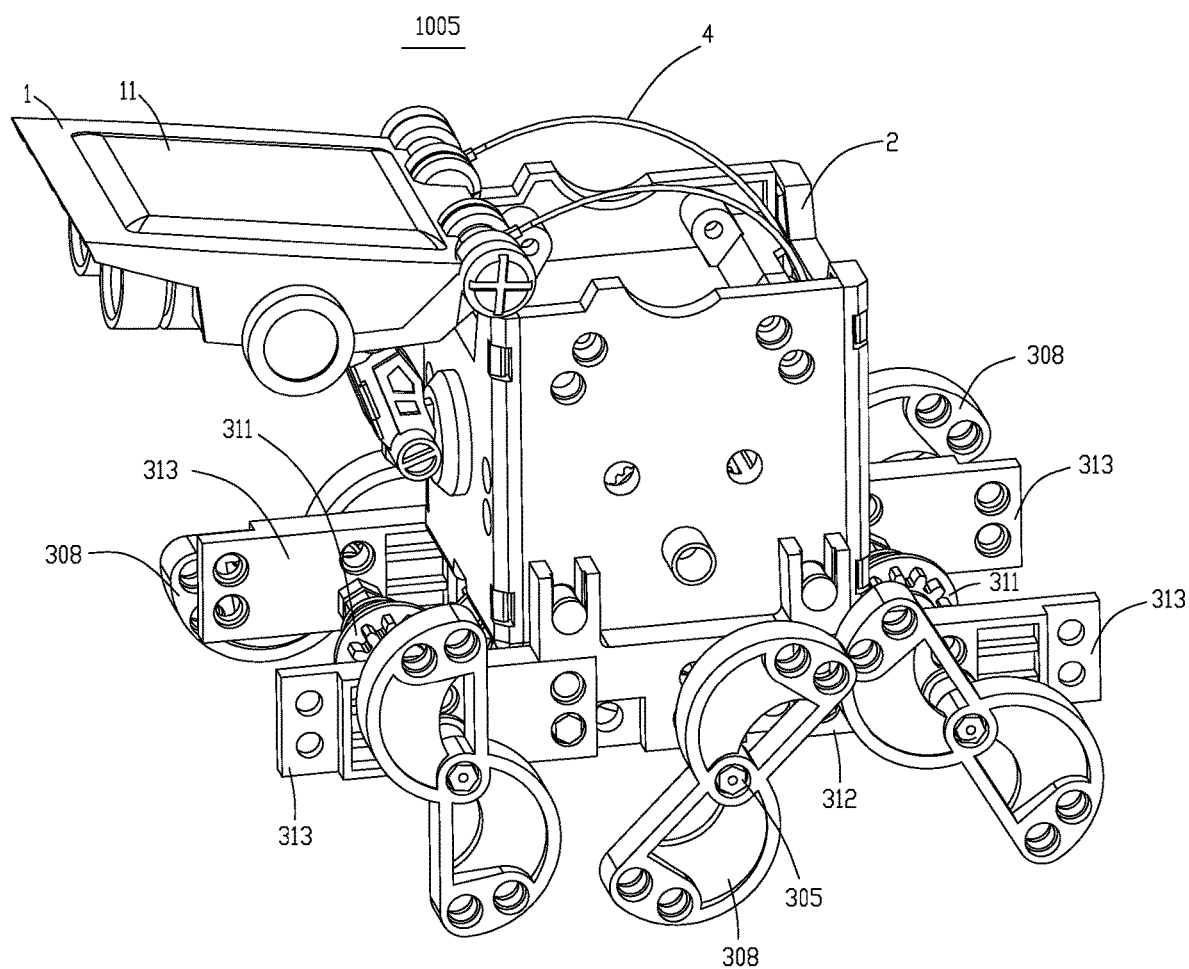
FIG. 42 is a schematic diagram of the form of a beetle robot in the present disclosure.

Referring to FIG. 42, the numbers of the gear boxes 2 and the head parts 1 are one, and the head part 1 is arranged at a front end of the gear box 2. The number of the fixed plates 312 is two, and the two fixed plates 312 are respectively detachably arranged on the left and right side walls of the gear box 2 through bolts. The number of the connecting plates 313 is four, and the four connecting plates 313 are respectively detachably arranged at front and rear ends of the two fixed plates 312 through bolts. Wherein, the fixed plate 312 and the connecting plate 313 are connected through bolts. The number of the third rotating rods 302 is three. The number of the symmetrical semicircular pieces 308 is six. Both ends of the third rotating rod 302 are connected with one symmetrical semicircular piece 308 after respectively passing through two opposite fixed plates 312. Both ends of one third rotating rod 302 are connected with one symmetrical semicircular piece 308 after respectively passing through the connecting plates 313 at front ends of the two opposite fixed plates 312. Both ends of one third rotating rod 302 are connected with one symmetrical semicircular piece 308 after respectively passing through the connecting plates 313 at rear ends of the two opposite fixed plates 312. Wherein, both ends of the third rotating rod 302 are connected to one symmetrical semicircular piece 308 through switch pins after passing through the fixed plate 312 or the connecting plate 313. The number of the fixed rods 303 is two, and the two fixed rods 303 are respectively located between two adjacent third rotating rods 302. The fixed rod 303 and the third rotating rod 302 are both located at the bottom of the gear box 2. The number of the third straight gears 311 is five. The five third straight gears 311 respectively sleeve three third rotating rods 302 and two fixed rods 303. The third straight gear 311 on the third rotating rod 302 in the middle is meshed with the second straight gear 23, and two adjacent third straight gears 311 are meshed.

In this way, the shape of a beetle is formed. Wherein, six symmetrical semicircular pieces 308 serve as a plurality of climbing feet of the beetle. And when the second straight gear 23 rotates to drive the third straight gear 311 to rotate, the third rotating rod 302 can rotate and drive the symmetrical semicircular pieces 308 on both sides to rotate, so that the beetle robot 1005 can move forward.

When the assembly robot toy is assembled into a Walker robot 1006, parts needed for the Walker robot 1006 and the positional relationship of the parts are as follows.

Figure 43:
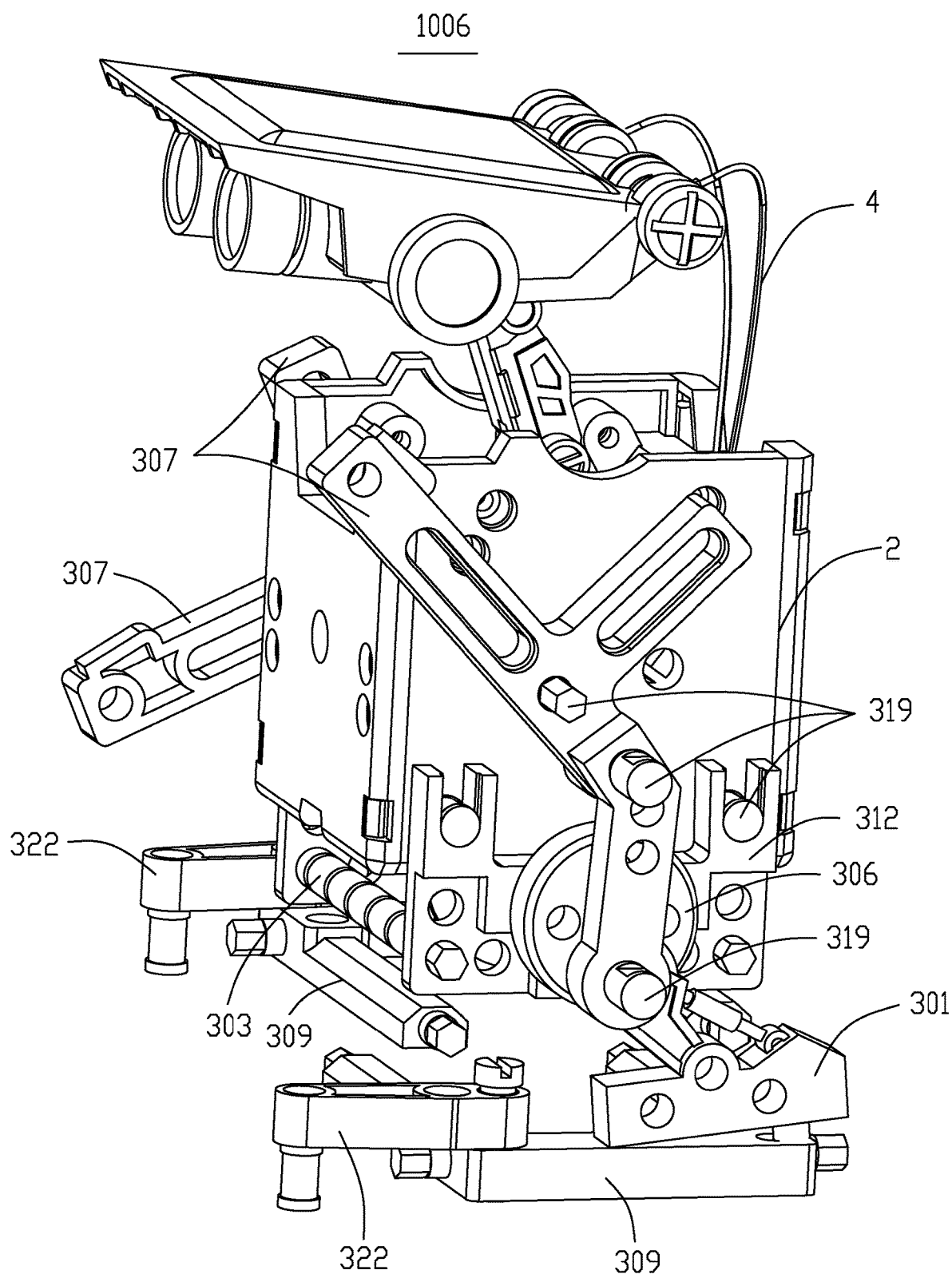
FIG. 43 is a schematic diagram of the form of a Walker robot in the present disclosure.

Referring to FIG. 43, the numbers of the gear boxes 2 and the head parts 1 are one, and the head part 1 is arranged on the top of the gear box 2. The number of the fixed plates 312 is two, and the two fixed plates 312 are respectively detachably arranged on the left and right side walls of the gear box 2 through bolts. The numbers of the U-shaped pieces 309, the force arm connecting rods 301, the T-shaped connecting rods 307, the straight-line connecting rods 322 and the first cams 306 are two. The number of the third rotating rods 302 is one. Both ends of the third rotating rod 302 are connected with the first cam 306 after respectively passing through two opposite fixed plates 312. The number of the fixed rods 303 is two, and the two fixed rods 303 are respectively located on the two opposite fixed plates 312 and on both sides of the third rotating rod 302. The middle of each force arm connecting rod 301 is detachably connected with a non-central position of one first cam 306 through a bolt. One end of each force arm connecting rod 301 is plugged into one U-shaped piece 309, and the other end of each force arm 301 is detachably connected with one end of one T-shaped connecting rod 307 through a bolt. Each T-shaped connecting rod 307 is detachably arranged on the gear box 2 on the side connected with the force arm connecting rod 301 through a bolt. The first sliding hole 3071 is located below the second sliding hole 3072 and forms an L shape inclined forward with the second sliding hole 3072. One end of each straight-line connecting rod 322 is detachably arranged at one end, away from the force arm connecting rod 301, of the U-shaped piece 309 through a bolt. The two U-shaped pieces 309 are at least partially oppositely arranged and both located below the third rotating rod 302. The number of the third straight gears 311 is one, and the third straight gear 311 sleeves the third rotating rod 302 and is meshed with the second straight gear 23.

Thus, when the second straight gear 23 rotates to drive the third straight gear 311 to rotate, the third rotating rod 302 can rotate and drive the first cams 306 on both sides to rotate, so that the U-shaped piece 309 performs a stepping motion forward to realize the movement of the Walker robot 1006.

When the assembly robot toy is assembled into a crab robot 1007, parts needed for the crab robot 1007 and the positional relationship of the parts are as follows.

Figure 44:
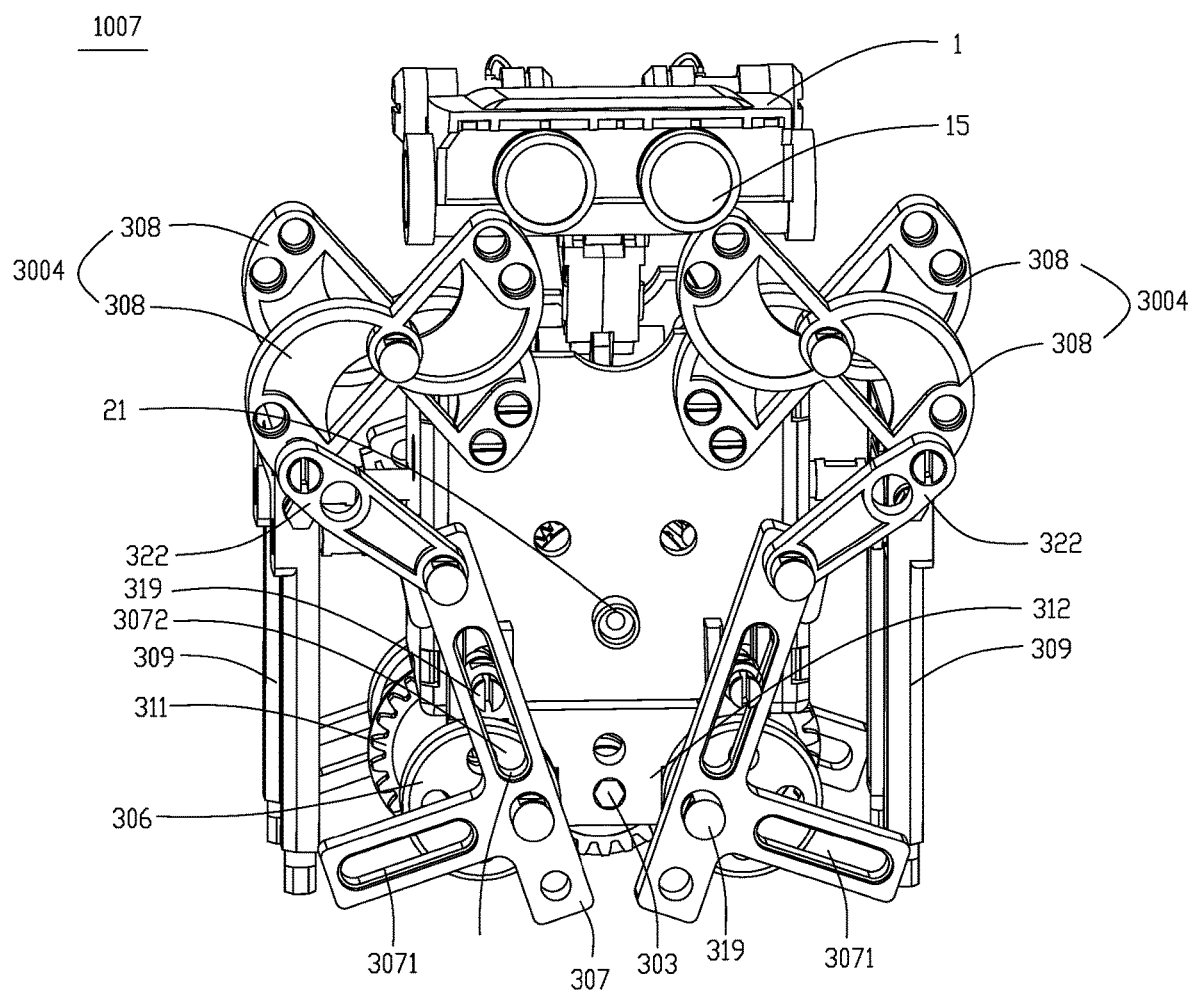
FIG. 44 and FIG. 45 are schematic diagrams of the form of a crab robot in the present disclosure.
Figure 45:
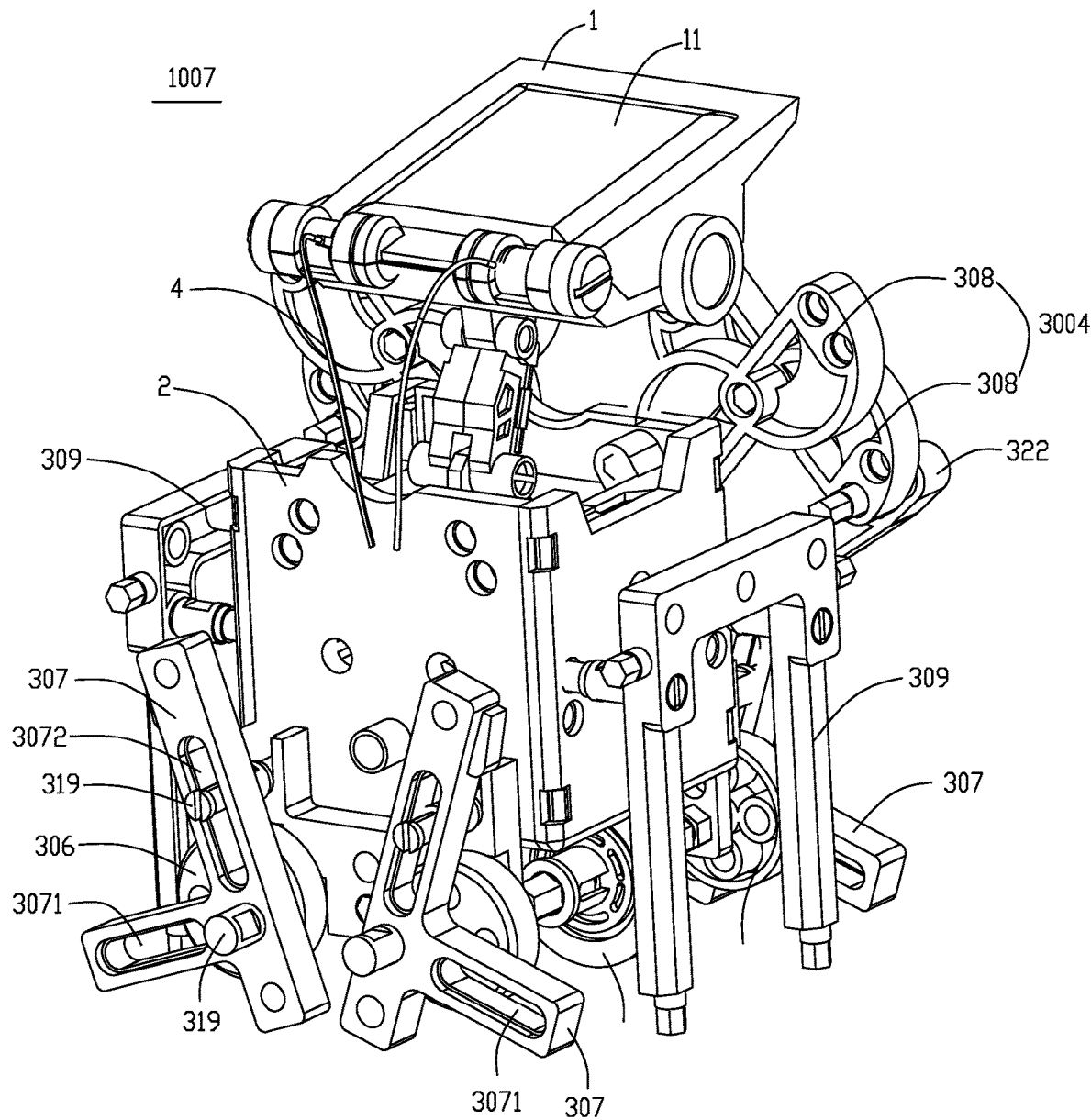

Referring to FIG. 44 and FIG. 45, the numbers of the gear boxes 2 and the head parts 1 are one, and the head part 1 is arranged on the top of the gear box 2. The number of the fixed plates 312 is two, and the two fixed plates 312 are detachably arranged on the left and right sides of the gear box 2 through two rotating pins respectively. The numbers of the third rotating rods 302, the straight-line connecting rods 322 and the U-shaped pieces 309 are two. The numbers of the first cams 306, the T-shaped connecting rods 307 and the symmetrical semicircular pieces 308 are four. Both ends of each third rotating rod 302 are connected with a central position of the first cam 306 after respectively passing through two opposite fixing plates 312. The number of the fixed rods 303 is one, and both ends of the fixed rod 303 are plugged into two opposite fixed plates 312 and located between two third rotating rods 302. The third rotating rod 302 and the fixed rod 303 are respectively located below the gear box 2. The number of the third straight gears 311 is three, and the three third straight gears 311 respectively sleeve the fixed rod 303 and the two third rotating rods 302. Two adjacent third straight gears 311 are meshed, and the third straight gear 311 located on the fixed rod 303 is meshed with the second straight gear 23. The T-shaped connecting rod 307 is connected with a non-central position of one first cam 306 at the position between the first sliding hole 3071 and the second sliding hole 3072 through a bolt, and the second sliding hole 3072 sleeves the rotating pin, connected with the gear box 2, of the fixed plate 312. The central positions of every two symmetrical semicircular pieces 308 are rotatably connected through a rotating pin to form a crab clamp 3004, and one end of the crab clamp 3004 is fixed on the top of the left side wall of the gear box 2 through a bolt. Both ends of each straight-line connecting rod 322 are respectively connected with one end of the crab clamp 3004 through a rotating pin and one end, located above the second sliding hole 3072, of the T-shaped connecting rod 307 through a bolt. The first sliding hole 3071 is located below the second sliding hole 3072. The two U-shaped pieces 309 are respectively fixed on the front and rear side walls of the gear box 2 through bolts, and openings of the U-shaped pieces 309 are downward.

In this way, the shape of a crab can be formed. Thus, when a side face of the gear box 2 is a front face, the second straight gear 23 rotates to drive the third straight gear 311 to rotate, the third rotating rod 302 can rotate and drive the first cam 306 to rotate, so that the crab robot 1007 transversely moves in cooperation with the T-shaped connecting rod 307. And when the T-shaped connecting rod 307 moves with the first cam 306, one symmetrical semicircular piece 308 in the crab clamp 3004 can be pulled by the straight-line connecting rod 322 to rotate back and forth by a certain angle, so that the opening and closing action of the crab clamp 3004 can be realized, the interestingness of the assembly robot toy can be improved.

When the assembly robot toy is assembled into a zombie robot 1010, parts needed for the zombie robot 1010 and the positional relationship of the parts are as follows.

Figure 48:
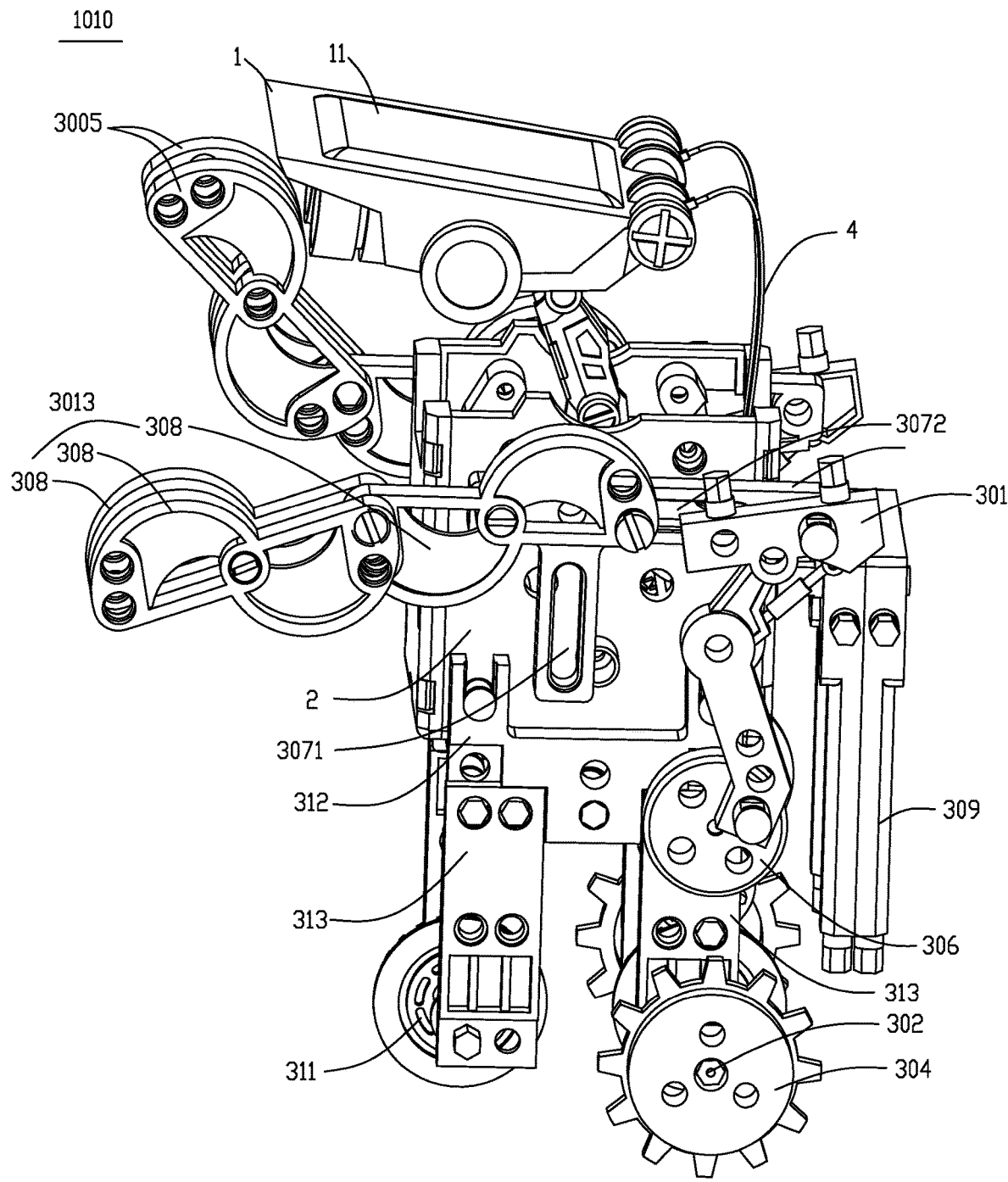
FIG. 48 is a schematic diagram of the form of a zombie robot in the present disclosure.

Referring to FIG. 48, the numbers of the gear boxes 2 and the head parts 1 are one, and the head part 1 is arranged on the top of the gear box 2. The number of the fixed plates 312 is two, and the two fixed plates 312 are respectively detachably arranged on the left and right side walls of the gear box 2 through bolts. The number of the connecting plates 313 is four, and every two connecting plates 313 are respectively detachably and vertically arranged at the bottom of both ends of one fixed plate 312. Wherein, the fixed plate 312 and the connecting plate 313 are connected through bolts. The numbers of the third rotating rods 302, the first cams 306, the force arm connecting rods 301, the T-shaped connecting rods 307, the U-shaped pieces 309 and the second cams 304 are two. Both ends of one third rotating rod 302 are connected with a central position of the first cam 306 after respectively passing through tail ends of two opposite fixed plates 312 and the connecting plate 313. Both ends of the other third rotating rod 302 are connected with the second cam 304 after respectively passing through bottom ends of two opposite connecting plates 313. Specifically, the third rotating rod 302 is connected to the first cam 306 through a switch pin. The number of the fixed rods 303 is four. Both ends of one fixed rod 303 are plugged on two opposite connecting plates 313 located at the back of the fixed plates 312 and located between two third rotating rods 302. Both ends of the two fixed rods 303 are respectively fixed on two opposite fixed plates 312 and located on one side of one third rotating rod 302. Both ends of one fixed rod 303 are respectively fixed at the bottom of two opposite connecting plates 313 located at the front ends of the fixed plates 312. The number of the third straight gears 311 is five, and the five third straight gears 311 respectively sleeve two third rotating rods 302, two fixed rods 303 adjacent to the third rotating rods 302 and the fixed rod 303 located at the bottom of the connecting plate 313. The third straight gear 311 on the fixed rod 303 connected with the fixed plate 312 is meshed with the second straight gear 23, and two adjacent third straight gears 311 are meshed. Both ends of each force arm connecting rod 301 are respectively connected with one end of the T-shaped connecting rod 307 and a non-central position of the first cam 306. The first sliding hole 3071 is located below the second sliding hole 3072. The number of the symmetrical semicircular pieces 308 is six. Every three symmetrical semicircular pieces 308 are matched with bolts to form a zombie arm. In each zombie arm 3013, one end of each of three symmetrical semicircular pieces 308 is connected through bolts. The other end of the symmetrical semicircular piece 308 in the middle is arranged in the second sliding hole 3072 through bolts and connected with one T-shaped connecting rod 307. The central positions of the other two symmetrical semicircular pieces 308 are connected through bolts and located on one side away from the T-shaped connecting rod 307. The two U-shaped pieces 309 are fixed on the rear side wall of the gear box 2 through bolts and are arranged in parallel.

In this way, the shape of a zombie can be formed. wherein, the two second cams 304 are matched with the connecting plate 313 to form a zombie leg. The third straight gear 311 located on the fixed rod 303 at the front end is used for balancing the zombie robot 1010, so that the zombie robot 1010 can be placed and stood stably. And when the second straight gear 23 rotates to drive the third straight gear 311 to rotate, the third rotating rod 302 can rotate and drive the first cam 306 and the second cam 304 to rotate, and the second cam 304 rotates so that the whole zombie robot 1010 can move forward. When the first cam 306 rotates, zombie arms can be driven to rotate up and down by a certain angle through the force arm connecting rod 301, so that the arms can swing upright and downward when the zombie robot jumps. In cooperation with the first gear teeth 3041 on the outer side of the second cam 304, the zombie robot 1010 jumps a little when moving forward, and the zombie robot 1010 is more vivid.

When the assembly robot toy is assembled into a pudgy robot 1008, parts needed for the pudgy robot 1008 and the positional relationship of the parts are as follows.

Figure 46:
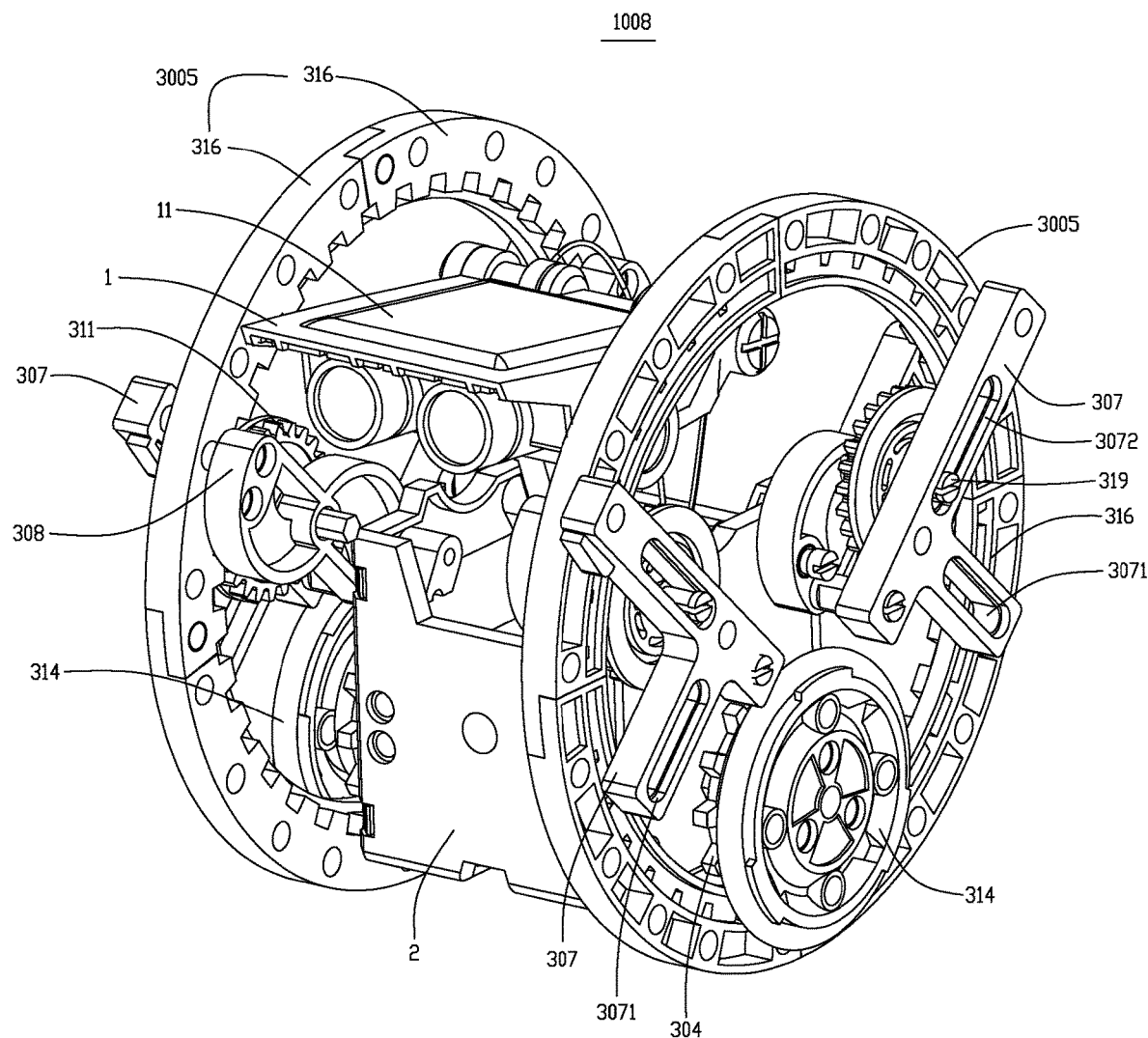
FIG. 46 is a schematic diagram of the form of a pudgy robot in the present disclosure.
Figure 47:
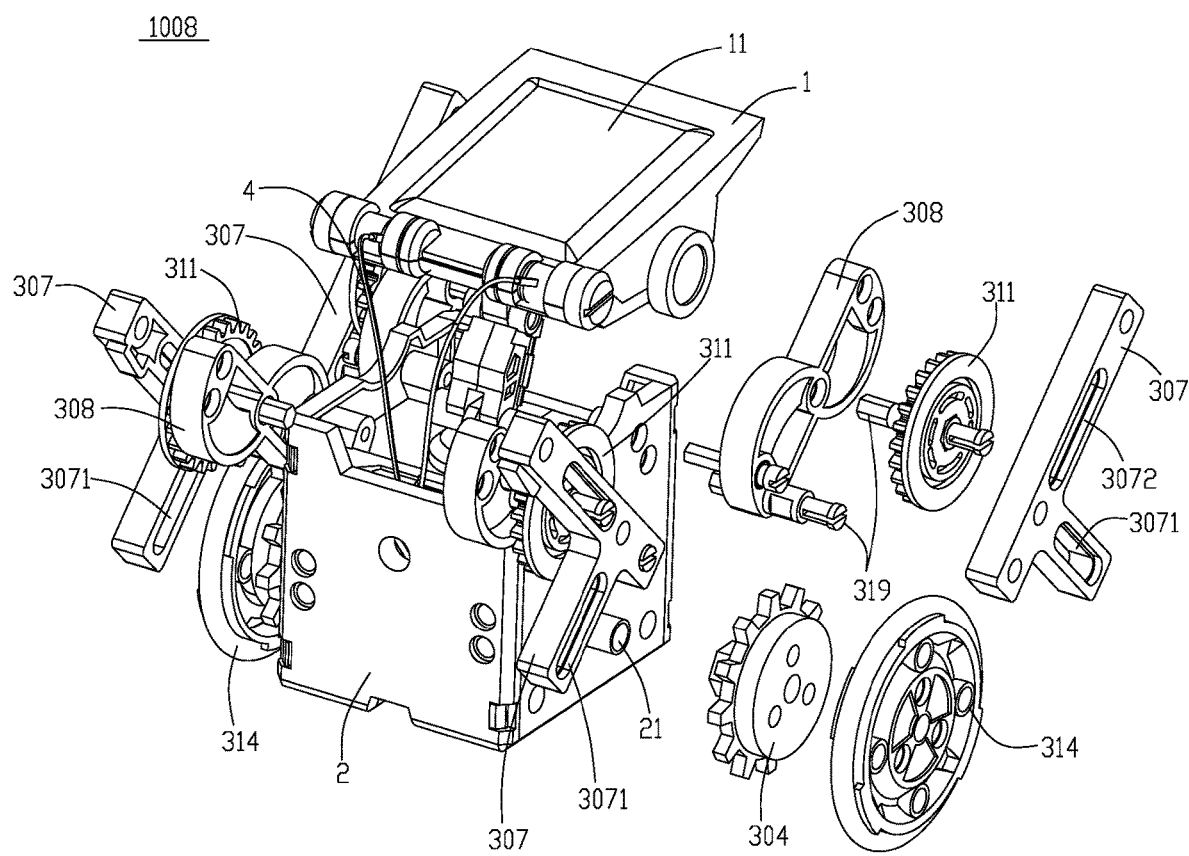
FIG. 47 is an exploded view of the part of a pudgy robot without an annular wheel in the present disclosure.

Referring to FIG. 46 and FIG. 47, the numbers of the gear boxes 2 and the head parts 1 are one, and the head part 1 is arranged on the top of the gear box 2. The numbers of the wheels 314 and the second cams 304 are two. The two second cams 304 are respectively plugged into two transmission rods 21. Each wheel 314 is coaxially fixed at the center of one second cam 304 through a bolt. The number of the arc-shaped connecting rods 316 is eight. Every four arc-shaped connecting rods 316 are connected end to end to form an annular wheel 3005. The second cam 304 is located on the inner side of the annular wheel 3005, and the first gear teeth 3041 on the second cam 304 are meshed with the second gear teeth 3161. The numbers of the T-shaped connecting rods 307, the third straight gears 311 and the symmetrical semicircular pieces 308 are four. One end of each of the four symmetrical semicircular pieces 308 and one end of the T-shaped connecting rod 307 are fixed at two top corners of the left and right side walls of the gear box 2 through bolts. Each third straight gear 311 is plugged into a central position of the symmetrical semicircular piece 308 and the second sliding hole 3072 through both ends of the bolt to realize the connection with the symmetrical semicircular piece 308 and the T-shaped connecting rod 307 and is located between the symmetrical semicircular piece and the T-shaped connecting rod 307. The third straight gear 311 is located on the inner side of the annular wheel 3005, and the annular wheel 3005 is located between the symmetrical semicircular piece 308 and the T-shaped connecting rod 307.

Thus, when the transmission rod 21 rotates, the second cam 304 and the wheel 314 can be driven to rotate, so that the annular wheel 3005 rotates, and the whole pudgy robot 1008 can move forward.

When the assembly robot toy is assembled into a crawling robot 1009, parts needed for the crawling robot 1009 and the positional relationship of the parts crawl follows.

Figure 49:
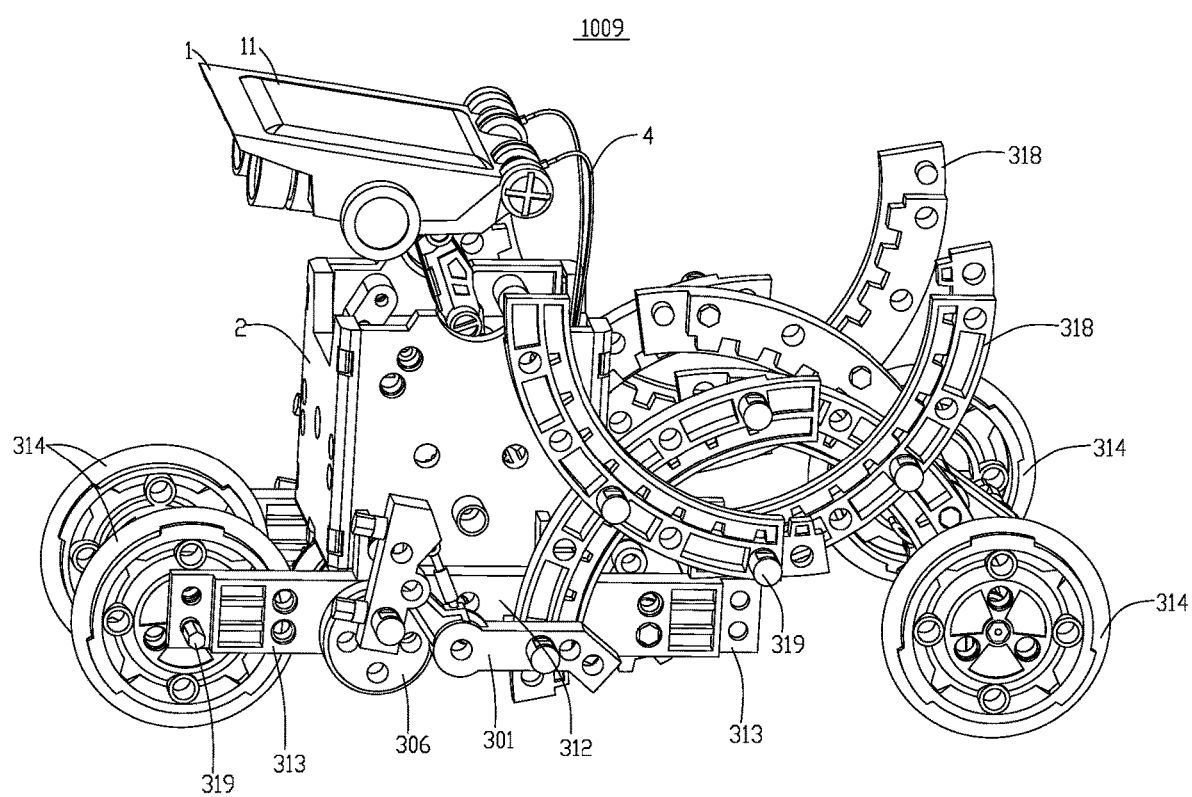
FIG. 49 is a schematic diagram of the form of a crawling robot in the present disclosure.
Figure 50:
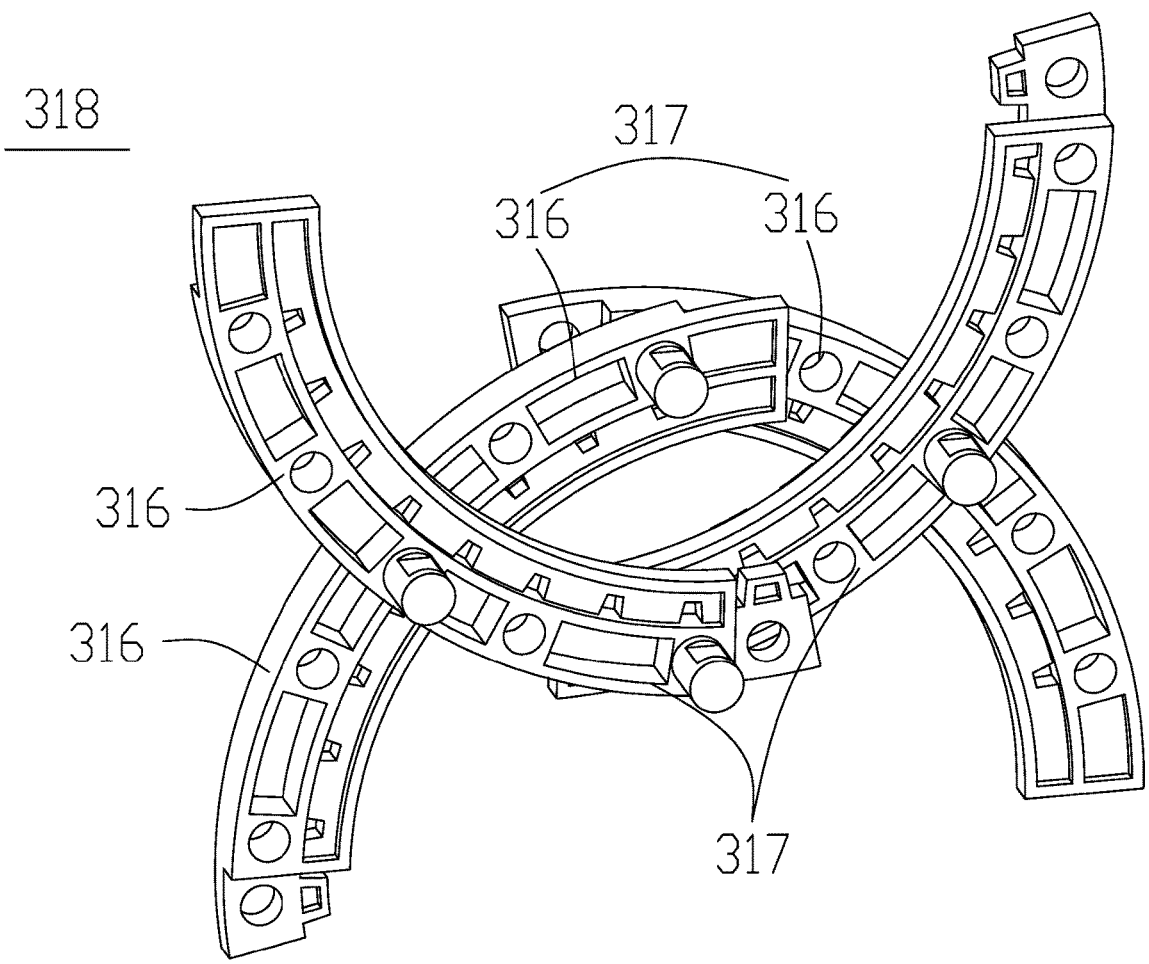
FIG. 50 is a schematic diagram of the form of a crawling robot in the present disclosure.

Referring to FIG. 49 and FIG. 50, the numbers of the gear boxes 2 and the head parts 1 are one, and the head part 1 is arranged on the top of the gear box 2. The number of the fixed plates 312 is two, and the two fixed plates 312 are respectively detachably arranged on the left and right sides of the gear box 2 through bolts, The number of the connecting rods is four, and the four connecting rods are respectively arranged at the front and rear ends of the two fixed plates 312. Wherein, the fixed plate 312 and the connecting plate 313 are connected through bolts. The numbers of the first cams 306, the force arm connecting rods 301 and the third rotating rods 302 are two. The number of the fixed rods 303 is at least two. The number of the wheels 314 is four. The number of the arc-shaped connecting rods 316 is eight. Both ends of one third rotating rod 302 are connected with a central position of the first cam 306 after respectively passing through the front ends of two opposite fixed plates 312. Both ends of one fixed rod 303 are respectively connected with the rear ends of the two opposite fixed plates 312. One end of each of every two arc-shaped connecting rods 316 is rotatably connected through a bolt to form a similarly semicircular connecting rod 317. Three-quarters and one-quarter positions of every two similarly semicircular connecting rods 317 are connected through a bolt to form a crawling component 318. The opening directions of the two similarly semicircular connecting rods 317 in the crawling component 318 are opposite. Both ends of each force arm connecting rod 301 are respectively connected with a non-central position of the first cam 306 and one end of the crawling component 318 through bolts. Both ends of one third rotating rod 302 are connected with the wheels 314 after respectively passing through the other end of the crawling component 318. The two wheels 314 are respectively connected with the front ends of two opposite connecting plates 313 at the front end of the fixed plate 312 through bolts. The number of the third straight gears 311 is at least two. One third straight gear 311 sleeves the third rotating rod 302 with the first cam 306, and the other third straight gear 311 sleeves the fixed rod 303 adjacent to one third straight gear 311 and is respectively meshed with the second straight gear 23 and the third straight gear 311 located on the fixed rod 303.

Therefore, when the second straight gear 23 rotates to drive the third straight gear 311 to rotate, the third rotating rod 302 can rotate and drive the first cam 306 to rotate, so that the semicircular arc connecting rod is pulled forward by the force arm connecting rod 301. During the movement, each semicircular arc connecting rod can be contracted, arched and be pulled and expanded, thus realizing walking state of a caterpillar.

Figure 51:
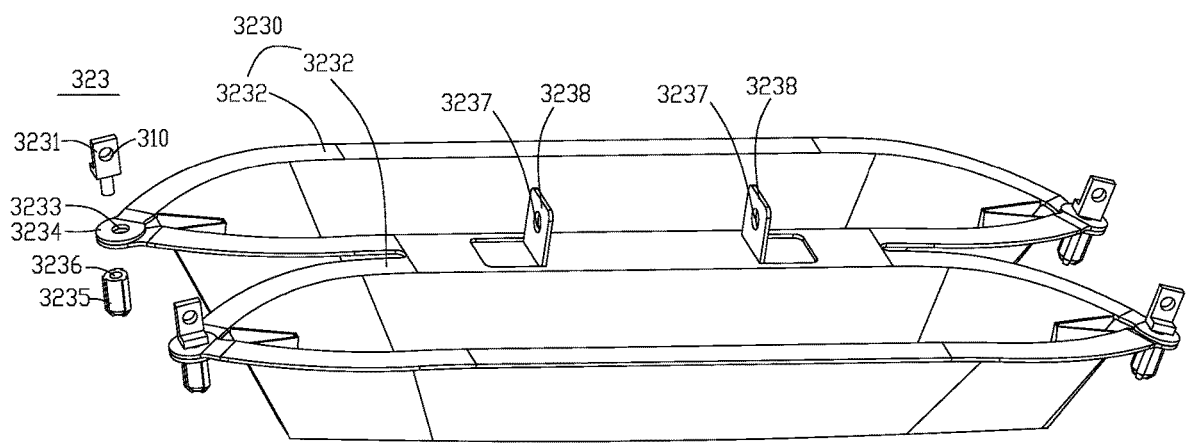
FIG. 51 is a schematic diagram of a hull in the present disclosure.

In one embodiment, referring to FIG. 51, the assembly component 3 also includes a hull 323. Two first lugs 3238 arranged at intervals are formed on the hull 323. A fourth assembly hole 3237 is formed in the first lug 3238. The number of the fixed plates 312 is two, and the two fixed plates 312 are respectively fixed on the front and rear side walls of the gear box 2. The first lug 3238 is connected to the fixed plate 312 after passing through the fourth assembly hole 3237 through a bolt. Specifically, the first lug 328 can be fixed with the gear box 2 through the bolt. Therefore, the assembly of the hull 323 and the gear box 2 is realized.

In the above embodiment, the hull 323 includes a foldable plastic sheet 3230, a first plug connector 3231 and a cap body 3235 with a third plugging groove 3236, and the first lug 3238 is foldably connected to the hull 323. The plastic sheet 3230 includes two connected first sheets 3232, and the first lug 3238 is located at the position where the two first sheets 3232 are connected. Both ends of the first sheet 3232 are provided with two second lugs 3234 at intervals. A fifth assembly hole 3233 is formed in the second lug 3234. The first plug connector 3231 is arranged in the third plugging groove 3236 after passing through the fifth assembly holes 3233 in the two lugs at one end of the first sheet 3232. Thus, the sheet-like plastic sheet 3230 can be folded to form a catamaran hull 323 so as to effectively reduce the overall volume of the assembly robot toy in the embodiment and facilitate transportation. Certainly, in other embodiments, the hull 323 may also be a complete body without being folded.

In one embodiment, the assembly robot toy may also be a surfing robot 1011. When the assembly robot toy is assembled into a surfing robot 1011, parts needed for the surfing robot 1011 and the positional relationship of the parts crawl follows.

Figure 52:
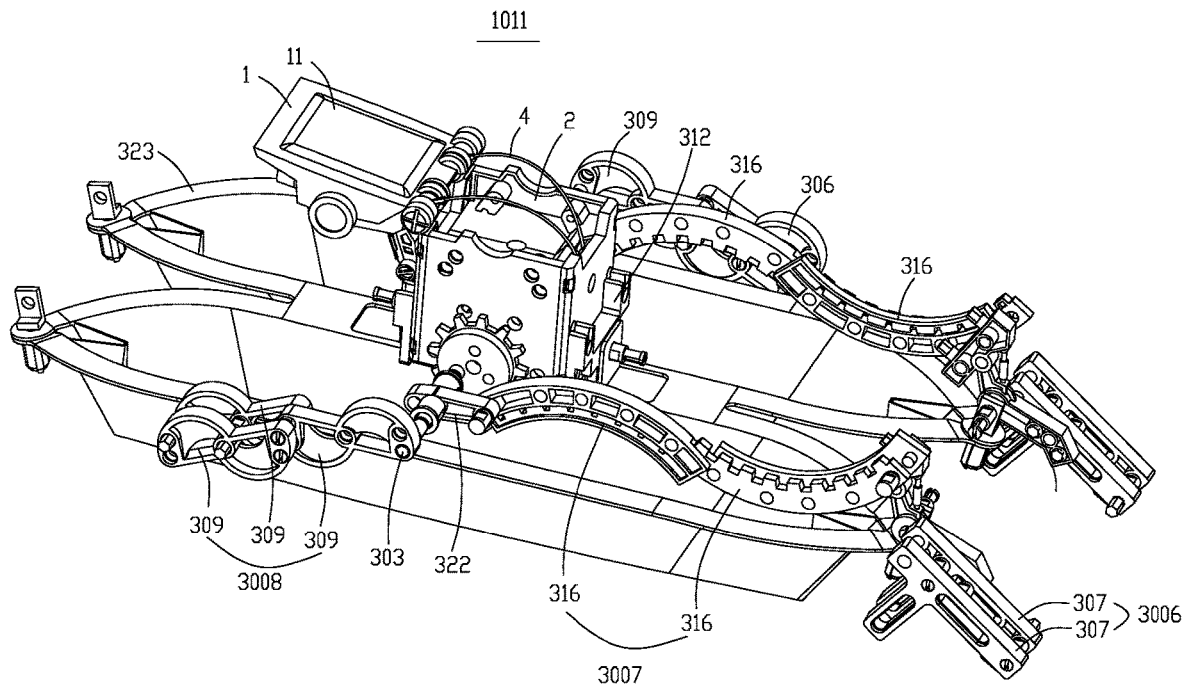
FIG. 52 and FIG. 53 are schematic diagrams of the form of a surfing robot in the present disclosure.
Figure 53:
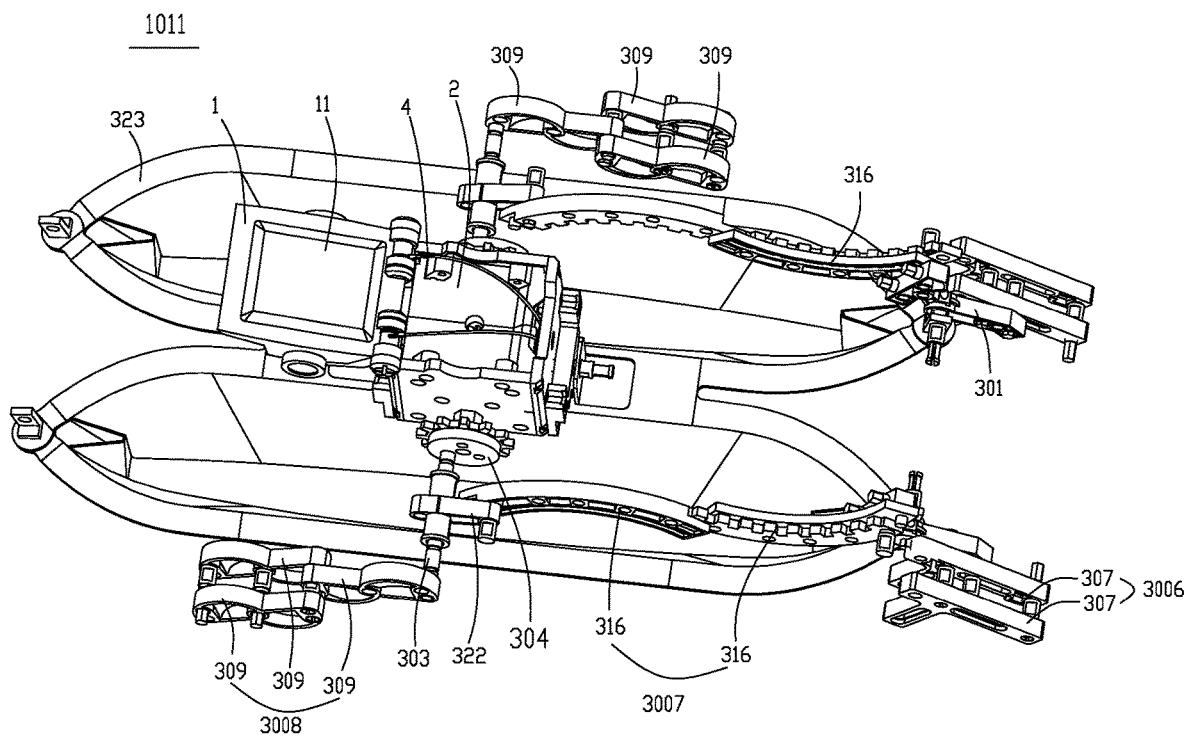

Referring to FIG. 52 and FIG. 53, the numbers of the gear boxes 2 and the head parts 1 are one, and the head part 1 is arranged on the front side wall of the gear box 2. The number of the hulls 323 is one, and the gear box 2 is fixed to the hull 323. The numbers of the second cams 304, the fixed rods 303, the straight-line connecting rods 322 and the force arm connecting rods 301 are all two. The two second cams 304 are respectively plugged on two transmission rods 21. The two fixed rods 303 are respectively plugged at non-central positions of two second cams 304. The two straight-line connecting rods 322 respectively sleeve two fixed rods 303. The numbers of the arc-shaped connecting rods 316 and the T-shaped connecting rods 307 are four. Both ends of every two arc-shaped connecting rods 316 are connected to form a wave-shaped leg part 3007. One end of each of the two leg parts 3007 is respectively connected to two straight-line connecting rods 322 through bolts. Every two T-shaped connecting rods 307 are oppositely arranged side by side through bolts to form a sole piece 3006. The first sliding hole 3071 and the second sliding hole 3072 on each T-shaped piece are splayed. Both ends of each force arm connecting rod 301 are respectively connected to the other end of the leg part 3007 and one end of the sole piece 3006 through bolts, and the middle position of each force arm connecting rod 301 is rotatably connected to the first plug connector 3231 through bolts. The number of the symmetrical semicircular pieces 308 is six, and every three symmetrical semicircular pieces 308 are matched with the bolts to form a paddling arm 3008. In each paddling arm 3008, one end of each of the three symmetrical semicircular pieces 308 is connected through bolts. The other end of the symmetrical semicircular piece 308 in the middle is arranged on one fixed rod 303 through a bolt. Central positions of the other two symmetrical semicircular pieces 308 are connected through bolts and away from one side of the fixed plate 312.

In this way, the shape of surfing is formed. When the surfing robot 1011 is placed on the water surface and the transmission rod 21 rotates, the second cam 304 can be driven to rotate, and one end of the sole piece 3006 can be driven to swing up and down through the fixed rod 303, the straight-line connecting rod 322, the leg part 3007 and the force arm connecting rod 301, and the fixed rod 303 can rotate to drive the paddling arm 3008 to rotate and realize paddling operation.

In one embodiment, the assembly robot toy may also be a rowing robot 1012. When the assembly robot toy is assembled into a rowing robot 1012, parts needed for the rowing robot 1012 and the positional relationship of the parts crawl follows.

Figure 54:
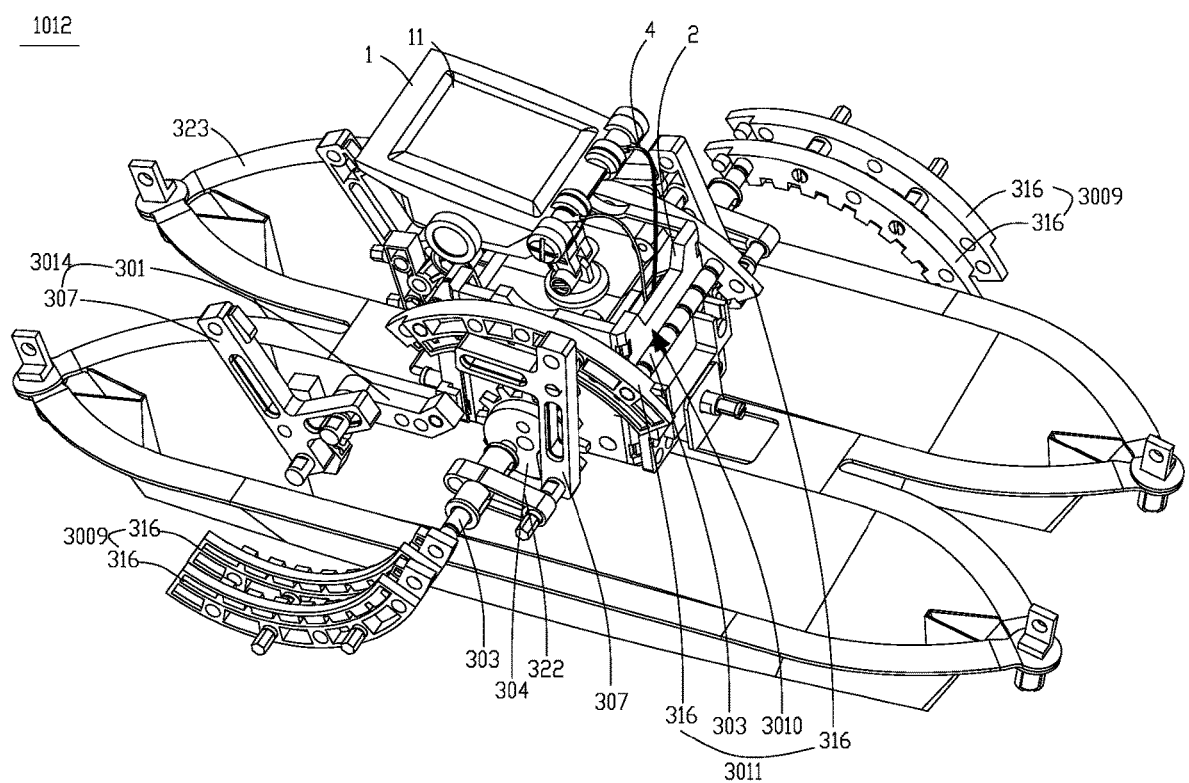
FIG. 54 is a schematic diagram of the form of a bowing robot in the present disclosure.

Referring to FIG. 54, the numbers of the gear boxes 2 and the head parts 1 are one, and the head part 1 is arranged on the top of the gear box 2. The number of the hulls 323 is one, and the gear box 2 is fixed on the hull 323. The numbers of the second cams 304, the straight-line connecting rods 322 and the force arm connecting rods 301 are all two. The two second cams 304 are respectively fixed on two transmission rods 21. The numbers of the arc-shaped connecting rods 316, the fixed rods 303 and the T-shaped connecting rods 307 are four. The two fixed rods 303 are respectively plugged on non-central positions of two second cams 304. The two straight-line connecting rods 323 respectively sleeve two fixed rods 303. The two arc-shaped connecting rods 316 are oppositely connected through a bolt to form a rowing paddle 3009. The number of the rowing paddles 3009 is two, and the two rowing paddles 3009 are respectively fixed on the fixed rod 303 connected with the first cam 306. Both ends of the two arc-shaped connecting rods 316 are connected through two fixed rods 303 to form a survival suit piece 3011 with a sleeve opening 3010. The gear box 2 is arranged in the sleeve opening 3010. Both sides of the survival suit piece 3011 are fixed on the gear box 2 through bolts. One end of each of the two T-shaped connecting rods 307 is connected to the bolt, connected with the gear box 2, of the survival suit piece 3011, and the other ends of the two T-shaped connecting rods 307 are rotatably connected to the straight-line connecting rod 322 through bolts. The first sliding holes 3071 in the two T-shaped connecting rods 307 are located above the second sliding holes 3072. One end of each of the two force arm connecting rods 301 is respectively plugged on both sides of the fixed plate 312. In addition, the two T-shaped connecting rods 307 are respectively corresponding to one force arm connecting rod 301 and are connected through bolts. The first sliding hole 3071 and the second sliding hole 3072 in the two T-shaped connecting rods 307 form a forward-tilting L shape, and form a human body leg part 3014 with the two force arm connecting rods 301.

In this way, a toy in a rowing form is formed. When the transmission rod 21 rotates, the second cam 304 can be driven to rotate, and the rowing paddle 3009 can be driven to rotate through the fixed rod 303 so as to realize rowing actions.

In the above embodiment, limit discs 231 are arranged on one side, away from the straight gear III 233, of the straight gear IV 232 (that is, on one side, away from the first face gear 24, of the second straight gear 23) and on the side of the third straight gear 311, so that the third straight gear 311 can be meshed with the straight gear IV 232 stably.

Here, it should be noted that the assembly robot toy in the embodiment can also be assembled into other shapes by using the assembly component 3, and the user can also make various shapes through other paper materials to be assembled together with the components of the assembly robot toy in the embodiment, so that the practical ability and creativity of children are improved.

It should be noted that all directional indications (such as up, down, left, right, front, back . . . ) in the embodiments of the present disclosure are only used to explain a relative positional relationship between components, motion situations, etc. at a certain specific attitude (as shown in the figures). If the specific attitude changes, the directional indication also correspondingly changes.

In addition, the descriptions of "first", "second", etc. in the present disclosure are only used for descriptive purposes, and cannot be understood as indicating or implying its relative importance or implicitly indicating the number of technical features indicated. Therefore, features defined by "first" and "second" can explicitly instruct or impliedly include at least one feature. In addition, "and/or" in the entire text includes three solutions. A and/or B is taken as an example, including technical solution A, technical solution B, and technical solutions that both A and B satisfy. In addition, the technical solutions between the various embodiments can be combined with each other, but it needs be based on what can be achieved by those of ordinary skill in the art. When the combination of the technical solutions is contradictory or cannot be achieved, it should be considered that such a combination of the technical solutions does not exist, and is not within the scope of protection claimed by the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. An assembly robot toy, comprising a gear box, a head part and an assembly component,
   wherein the head part and the assembly component are detachably arranged on the gear box, the gear box internally is provided with a gear set, and a motor and a plurality of transmission rods which are respectively connected with the gear set;
   first avoidance holes are formed in a left and right side walls of the gear box,
   a second avoidance hole corresponding to a position of the gear set is formed in a bottom of the gear box,
   and at least two of the transmission rods are arranged on an outer side of the gear box after respectively passing through the first avoidance holes in left and right side walls of the gear box;
   or, at least two of the transmission rods are respectively arranged near positions of the first avoidance holes in the left and right side walls of the gear box;
   the assembly component is connected with the gear set and/or the transmission rod, and the head part is provided with a power supply module which is electrically connected with the motor and used for supplying power to the motor;

and the transmission rod is configured to rotate by transmission of the gear set when the motor is driven,
and at least part of the assembly component is configured to move and drive the gear box to move when the gear set and/or the transmission rod rotate/rotates,
wherein the gear set comprises a first rotating rod, a first straight gear arranged on a rotating shaft of the motor, a first face gear arranged on the first rotating rod and meshed with the first straight gear, and a second straight gear arranged on the first rotating rod and connected with the assembly component;
a number of the transmission rods is two, and the two transmission rods are respectively arranged at two ends of the first rotating rod;
when the motor drives the first straight gear to rotate, the first rotating rod rotates through the transmission of the first face gear and drives the second straight gear and the transmission rods to rotate;
wherein the second straight gear comprises a straight gear I, a straight gear II, a straight gear III and a straight gear IV which are arranged on the first rotating rod in turn, and
a straight gear V and a straight gear VI which are rotatably arranged in the gear box; and
the straight gear I is integrally molded with the first face gear,
the straight gear V is integrally molded with the straight gear VI, the straight gear III, the straight gear IV and one transmission rod are integrally molded,
the straight gear I is meshed with the straight gear V,
the straight gear VI is meshed with the straight gear II,
the straight gear III and the straight gear IV are both used for connecting with the assembly component, and
the two transmission rods are respectively arranged on the outer side of the gear box after passing through the first avoidance holes in the left and right side walls of the gear box.

2. The assembly robot toy according to claim 1, wherein the gear box comprises a first shell and a second shell, and the second shell is detachably connected with the first shell to form a first mounting cavity, a second mounting cavity and a second avoidance hole; and
the motor is mounted in the first mounting cavity, the gear set is mounted in the second mounting cavity, and a wiring hole connected with the first mounting cavity is formed in the first shell and/or the second shell.

3. The assembly robot toy according to claim 2, wherein a rotating hole is formed in the second mounting cavity;
the gear set also comprises a second rotating rod with one end arranged in the rotating hole after passing through the straight gear V and the straight gear VI, and a limit cap arranged at an end of the second rotating rod;
and the straight gear III is located between the straight gear V and the limit cap.

4. The assembly robot toy according to claim 2, wherein the first shell protrudes on one side opposite to the second shell to form a plurality of first plugging ends, a plurality of first plugging grooves are formed in one side, opposite to the first shell, of the second shell, and the first plugging end is arranged in the first plugging groove; and
the gear box also comprises a plurality of reinforcing cover plates, a plurality of first clamping holes are formed in the reinforcing cover plate, and a plurality of first clamping buckles are arranged on two sides of the first shell and the second shell, and a first clamping buckle is clamped with a first clamping hole.

5. The assembly robot toy according to claim 1, wherein the head part is rotatably connected with the gear box, and the head part is located at one of top, front and back positions of the gear box.

6. The assembly robot toy according to claim 5, wherein the power supply module is a solar panel.

7. The assembly robot toy according to claim 6, wherein the head part comprises a bottom shell, a face shell which is detachably connected with the bottom shell and forms a third mounting cavity and two fourth mounting cavities with the bottom shell, and two conducting springs respectively arranged in the two fourth mounting cavities and welded to the solar panel; and
the solar panel is arranged in the third mounting cavity, the two fourth mounting cavities are arranged at intervals and are both connected with the third mounting cavity, a third avoidance hole is formed in the face shell and/or the bottom shell at a position corresponding to the fourth mounting cavity, a display port is formed in the face shell at a position corresponding to the solar panel, the motor is electrically connected with two conducting wires, a tail end of the conducting wire is provided with a conducting plate, and the conducting plate is plugged in a conducting spring.

8. The assembly robot toy according to claim 7, wherein the bottom of one end of the face shell extends downward to form a second plugging end, the bottom of a other end of the face shell extends downward to form a plurality of first stop blocks arranged at intervals, and the first stop block protrudes at the bottom of one side opposite to the second plugging end to form a second stop block;
a second plugging groove with a length larger than a length of the second plugging end is formed in the bottom shell, a front end of the bottom shell is arranged above the second stop block, and the second plugging end is arranged in the second plugging groove; and
the head part also comprises a plurality of cover bodies with accommodating grooves, the bottom shell is connected with the face shell to a form first joint ends on two sides of the head part, and the first joint ends are arranged in the accommodating grooves.

9. The assembly robot toy according to claim 6, wherein the assembly component comprises a plurality of bolts, fixed plates, connecting plates, third rotating rods, wheels, straight-line connecting rods, symmetrical semicircular sole pieces, U-shaped pieces, force arm connecting rods, arc-shaped connecting rods, T-shaped connecting rods, first cams, second cams, fluctuating gears, third straight gears and fixed rods;
any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod, the third straight gear can be used for being meshed with the second straight gear, the third straight gear, the wheel, the first cam, the second cam, the fluctuating gear and the wheel can detachably sleeve the third rotating rod or the fixed rod, and the second cam is detachably plugged in the transmission rod.

10. The assembly robot toy according to claim 9, wherein a first sliding hole and a second sliding hole perpendicular to the first sliding hole are formed in the T-shaped connecting rod, and the fluctuating gear is provided with a plurality of arc-shaped teeth arranged around the fluctuating gear;

the symmetrical semicircular piece is formed by connecting two semicircular plates in central symmetry, a side wall of the second cam is surrounded by first gear teeth, and the inner side of the arc-shaped connecting rod is provided with second gear teeth meshed with the second cam.

11. The assembly robot toy according to claim 10, wherein at least one plane is formed on an outer side wall of the third rotating rod.

12. The assembly robot toy according to claim 11, wherein a plurality of annular clamping grooves are formed in an outer side walls of the fixed rod and the third rotating rod at equal intervals, the assembly component also comprises a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove; and the position of the third straight gear on the third rotating rod or the fixed rod is limited by two fixed sleeves respectively sleeving two sides of the third straight gear.

13. The assembly robot toy according to claim 12, wherein a cross section of the outer side wall of the third rotating rod is a hexagon, a cross section of an outer side wall of the fixed rod is circular, and a diameter of the fixed rod is equal to a distance between two opposite sides of the hexagon.

14. The assembly robot toy according to claim 13, wherein a shape of the assembly robot toy is one of a baby carriage robot, a quadruped robot, a turtle robot, a puppy robot, a beetle robot, a Walker robot, a crab robot, a pudgy robot, a crawling robot and a zombie robot;

when the assembly robot toy is a baby carriage robot, the head part is located on the top of the gear box; a number of the fixed plates is two, and the two fixed plates are respectively detachably arranged on the left and right side walls of the gear box through bolts; a number of the connecting plates is four, a front end of each fixed plate is connected with another connecting plate through one connecting plate, and each fixed plate and two connecting plates on a same side form a first long arm; a number of the third rotating rods is two, and the two third rotating rods are respectively located at front and rear ends of the first long arm and at the bottom of the gear box; a number of the wheels is four, and two ends of each third rotating rod are connected with the wheels after respectively passing through two opposite first long arms; a number of the fixed rods is five, and the five fixed rods are located at the bottom of the gear box and are plugged and arranged on the first long arm at intervals and located between the two third rotating rods; a number of the third straight gears is six, and the six third straight gears respectively sleeve five fixed rods and the third rotating rod at the front end; the two adjacent third straight gears are meshed, and the third straight gear located at a rear end of the first long arm is meshed with the second straight gear;

when the assembly robot toy is a quadruped robot, the head part is arranged at a front end of the gear box; a number of the fixed plates is two, and the two fixed plates are respectively detachably arranged on the left and right side walls of the gear box through bolts; a number of the connecting plates is two, the two connecting plates are respectively fixed at front ends of the two fixed plates; the two fixed plates and the connecting plates on a same side of the two fixed plates respectively form two second long arms; a number of the third rotating rods is two, a number of the first cams is four, two ends of one third rotating rod are connected with the first cams after respectively passing through tail ends of two opposite fixed plates, and two ends of the other third rotating rod are connected with the first cams after respectively passing through front ends of two opposite connecting plates; a number of the fixed rods is three, and the three fixed rods are plugged and arranged on the second long arm at intervals and between the two third rotating rods; a number of the third straight gears is five, and the five third straight gears respectively sleeve three fixed rods and two third rotating rods and are located at the bottom of the gear box; two adjacent third straight gears are meshed, and the third straight gear near the third rotating rod at the front end is meshed with the second straight gear; a number of the T-shaped connecting rods is four, each T-shaped connecting rod is connected with one first cam at the position between the first sliding hole and the second sliding hole through a bolt, and the first sliding hole sleeves one end of one fixed rod and is located above the second sliding hole;

when the assembly robot toy is a turtle robot, the head part is arranged on the front side wall of the gear box; a number of the fixed plates is two, and the two fixed plates are respectively detachably arranged on the left and right side walls of the gear box through two bolts; a number of the connecting plates is four, and front and rear ends of each fixed plate are connected with one connecting plate; a number of the third rotating rods is two, a number of the first cams is four, two ends of one third rotating rod are connected with the first cams after respectively passing through front ends of two opposite fixed plates, and two ends of the other third rotating rod are connected with the first cams after respectively pass through rear ends of two opposite fixed plates; a number of the arc-shaped connecting rods and the T-shaped connecting rods are four, each T-shaped connecting rod is connected with the first cam at the position between the first sliding hole and the second sliding hole through a bolt, and the second sliding hole sleeves the bolt, connected with the gear box, of the fixed plate; every two arc-shaped connecting rods are connected to form a turtle shell piece, two turtle shell pieces are respectively detachably arranged on the left and right side walls of the gear box through bolts, one end of each turtle shell piece is located above the connecting plate at a front end of the fixed plate, and the other end of each turtle shell piece is located at the back of the connecting plate at a rear end of the fixed plate; a number of the fixed rods is five, one fixed rod is connected between every two opposite arc-shaped connecting rods, two ends of one fixed rod are arranged on two opposite fixed plates and located between two third rotating rods, two ends of one fixed rod are respectively plugged into two opposite connecting plates at the front end of the fixed plate, and two ends of one fixed rod are respectively plugged into two opposite connecting plates at the rear end of the fixed plate; a number of the third straight gears is three, the three third straight gears are respectively arranged on the two third rotating rods and the fixed rods located between the two third rotating rods, the third straight gears are located at the bottom of the gear box, two adjacent third straight gears are meshed, and the third straight gear located in the middle is meshed with the second straight gear;

when the assembly robot toy is a puppy robot, the head part is arranged on the top of the gear box; a number of the fixed plates is two, and the two fixed plates are respectively detachably arranged on the left and right side walls of the gear box through two bolts; a number of the connecting plates is two, and the two connecting plates are respectively fixed at rear ends of the two fixed plates; a number of the third rotating rods and the symmetrical semicircular pieces are two, two ends of one third rotating rod are connected with one symmetrical semicircular piece after respectively passing through rear ends of two opposite fixed plates, and two ends of the other third rotating rod are respectively plugged in the middle positions of two opposite connecting plates; a number of the fixed rods is three, two ends of one fixed rod are detachably arranged at rear ends of two opposite connecting plates, and the two fixed rods are respectively located at front ends and middle positions of the two opposite fixed plates; a number of the third straight gears is at least three, and the at least three third straight gears respectively sleeve the two third rotating rods and the fixed rod located in the middle of the fixed plate; two adjacent third straight gears are meshed, and the third straight gear located on the fixed rod is meshed with the second straight gear; a number of the straight-line connecting rods is two, the two straight-line connecting rods are detachably connected through bolts to form a tail piece, and the tail piece sleeves the fixed rod at the rear end of the connecting plate; a number of the fluctuating gears is one, and the fluctuating gear sleeves the third rotating rod located in the middle of the connecting plate; one end of the tail piece is arranged between two adjacent arc-shaped teeth; a number of the T-shaped connecting rods is two, one end of each T-shaped connecting rod respectively sleeves the bolts, connected with the fixed plate, of the left and right side walls of the gear box, the first sliding hole is limited on the fixed plate through the bolt and located between two fixed rods, and the second sliding hole and the first sliding hole are splayed; when the second straight gear rotates, the tail piece swings along the fixed rod through the transmission of the third straight gear and a fluctuating part;

when the assembly robot toy is a beetle robot, the head part is arranged on the front side of the gear box; a number of the fixed plates is two, and the two fixed plates are respectively detachably arranged on the left and right side walls of the gear box through bolts; a number of the connecting plates is four, and the four connecting plates are respectively detachably arranged at front and rear ends of the two fixed plates through bolts; a number of the third rotating rods is three, a number of the symmetrical semicircular pieces is six, two ends of one third rotating rod are connected with one symmetrical semicircular piece after respectively passing through two opposite fixed plates, two ends of one third rotating rod are connected with one symmetrical semicircular piece after respectively passing through the connecting plates at front ends of the two opposite fixed plates, and two ends of the third rotating rod are connected with one symmetrical semicircular piece after respectively passing through the connecting plates at rear ends of the two opposite fixed plates; a number of the fixed rods is two, and the two fixed rods are respectively located between two adjacent third rotating rods; a number of the third straight gears is five, and the five third straight gears respectively sleeve three third rotating rods and two fixed rods, the third straight gears are located at the bottom of the gear box, the third straight gear on the third rotating rod in the middle is meshed with the second straight gear, and two adjacent third straight gears are meshed;

when the assembly robot toy is a Walker robot, the head part is arranged on the top of the gear box; a number of the fixed plates is two, and the two fixed plates are respectively detachably arranged on the left and right side walls of the gear box through bolts; a number of the U-shaped pieces, the force arm connecting rods, the T-shaped connecting rods, the straight-line connecting rods and the first cams are two; a number of the third rotating rods is one, and two ends of the third rotating rod are connected with the first cam after respectively passing through two opposite fixed plates; a number of the fixed rods is two, and the two fixed rods are respectively located on the two opposite fixed plates and on two sides of the third rotating rod; the middle of each force arm connecting rod is detachably connected with one first cam through a bolt, one end of each force arm connecting rod is plugged into one U-shaped piece, the other end of each force arm is detachably connected with one end of one T-shaped connecting rod through a bolt, each T-shaped connecting rod is detachably arranged on the gear box on the side connected with the force arm connecting rod through a bolt, and the first sliding hole is located below the second sliding hole and forms an L shape inclined forward with the second sliding hole; one end of each straight-line connecting rod is detachably arranged at one end, away from the force arm connecting rod, of the U-shaped piece through a bolt; the two U-shaped pieces are at least partially oppositely arranged and both located below the third rotating rod; a number of the third straight gears is one, and the third straight gear sleeves the third rotating rod and is meshed with the second straight gear; when the second straight gear rotates, the U-shaped piece is driven by the third straight gear, the third rotating rod, the first cam and the force arm connecting rod to perform a stepping motion forward;

when the assembly robot toy is a crab robot, the head part is located on the top of the gear box; a number of the fixed plates is two, and the two fixed plates are detachably arranged on the left and right sides of the gear box through two bolts respectively; a number of the third rotating rods, the straight-line connecting rods and the U-shaped pieces are two, a number of the first cams, the T-shaped connecting rods and the symmetrical semicircular pieces are four, and two ends of each third rotating rod are connected with the first cam after respectively passing through two opposite fixing plates; a number of the fixed rods is one, and two ends of the fixed rod are plugged into two opposite fixed plates and located between two third rotating rods; the third rotating rod and the fixed rod are respectively located below the gear box, a number of the third straight gears is three, and the three third straight gears respectively sleeve the fixed rod and the two third rotating rods; two adjacent third straight gears are meshed, and the third straight gear located on the fixed rod is meshed with the second straight gear; the T-shaped connecting rod is connected with one first cam at the position between the first sliding hole and the second sliding hole through a bolt, and the second sliding hole sleeves the bolt, connected with the gear box, of the fixed plate; the central positions of every two symmetrical semicircular pieces are rotatably connected through a bolt to form a crab clamp, and one end of the crab clamp is fixed on the top of the left side wall of the gear box through a bolt; two ends of each straight-line connecting rod are respectively fixed at one end of the crab clamp and one end, located above the second sliding hole, of the T-shaped connecting rod, the first sliding hole is located below the second sliding hole, the two U-shaped pieces are respectively fixed on the front and rear side walls of the gear box through bolts, and openings of the U-shaped pieces are downward;

when the assembly robot toy is a zombie robot, the head part is arranged on the top of the gear box; a number of the fixed plates is two, and the two fixed plates are respectively detachably arranged on the left and right side walls of the gear box through bolts; a number of the connecting plates is four, and every two connecting plates are respectively detachably and vertically arranged at the bottom of two ends of one fixed plate; a number of the third rotating rods, the first cams, the force arm connecting rods, the T-shaped connecting rods, the U-shaped pieces and the second cams are two, and two ends of one third rotating rod are connected with the first cam after respectively passing through tail ends of two opposite fixed plates and the connecting plate; two ends of the other third rotating rod are connected with the second cam after respectively passing through bottom ends of two opposite connecting plates; a number of the fixed rods is four, two ends of one fixed rod are fixed on two opposite connecting plates located at the back of the fixed plates and between two third rotating rods, two ends of the two fixed rods are respectively fixed on two opposite fixed plates and located on one side of one third rotating rod, and two ends of one fixed rod are respectively fixed at the bottom of two opposite connecting plates located at the front ends of the fixed plates; a number of the third straight gears is five, and the five third straight gears respectively sleeve two third rotating rods, two fixed rods adjacent to the third rotating rods and the fixed rod located at the bottom of the connecting plate; the third straight gear on the fixed rod connected with the fixed plate is meshed with the second straight gear, and two adjacent third straight gears are meshed; two ends of each force arm connecting rod are respectively connected with one end of the T-shaped connecting rod and the first cam, the first sliding hole is located below the second sliding hole, a number of the symmetrical semicircular pieces is six, and every three symmetrical semicircular pieces are matched with bolts to form a zombie arm; in each zombie arm, one end of each of three symmetrical semicircular pieces is connected through bolts, the other end of the symmetrical semicircular piece in the middle is arranged in the second sliding hole through bolts and connected with one T-shaped connecting rod, and the central positions of the other two symmetrical semicircular pieces are connected through bolts and located on one side away from the T-shaped connecting rod; the two U-shaped pieces are fixed on the rear side wall of the gear box through bolts and are arranged in parallel;

when the assembly robot toy is a chunky robot, the head part is arranged on the top of the gear box; a number of the wheels and the second cams are two, the two second cams are respectively plugged into two transmission rods, and each wheel is coaxially fixed at the center of one second cam through a bolt; a number of the arc-shaped connecting rods is eight, every four arc-shaped connecting rods are connected end to end to form an annular wheel, and the second cam is located on the inner side of the annular wheel and meshed with the second gear teeth; a number of the T-shaped connecting rods, the third straight gears and the symmetrical semicircular pieces are four, one end of each of the four symmetrical semicircular pieces and one end of the T-shaped connecting rod are fixed at two top corners of the left and right side walls of the gear box through bolts, and each third straight gear is plugged into a central position of the symmetrical semicircular piece and the second sliding hole through two ends of the bolt to realize the connection with the symmetrical semicircular piece and the T-shaped connecting rod and is located between the symmetrical semicircular piece and the T-shaped connecting rod; the third straight gear is located on the inner side of the annular wheel, and the annular wheel is located between the symmetrical semicircular piece and the T-shaped connecting rod;

when the assembly robot toy is a crawling robot, the head part is arranged on the top of the gear box; a number of the fixed plates is two, and the two fixed plates are respectively detachably arranged on the left and right sides of the gear box through bolts; a number of the connecting rods is four, and the four connecting rods are respectively arranged at the front and rear ends of the two fixed plates; a number of the first cams and the force arm connecting rods are two, a number of the third rotating rods is two, a number of the fixed rods is at least two, a number of the wheels is four, a number of the arc-shaped connecting rods is eight, two ends of one third rotating rod are connected with the first cam after respectively passing through the front ends of two opposite fixed plates, and two ends of one fixed rod are respectively connected with the rear ends of the two opposite fixed plates; one end of each of every two arc-shaped connecting rods is rotatably connected through a bolt to form a similarly semicircular connecting rod, three-quarters and one-quarter positions of every two similarly semicircular connecting rods are connected through a bolt to form a crawling component, and the opening directions of the two similarly semicircular connecting rods in the crawling component are opposite; two ends of each force arm connecting rod are respectively connected with the first cam and one end of the crawling component through bolts, and two ends of one third rotating rod are connected with the wheels after respectively passing through the other end of the crawling component; the two wheels are respectively connected with the front ends of two opposite connecting plates at the front end of the fixed plate through bolts; a number of the third straight gears is at least two, one third straight gear sleeves the third rotating rod with the first cam, and the other third straight gear sleeves the fixed rod adjacent to one third straight gear and is respectively meshed with the second straight gear and the third straight gear located on the fixed rod.

15. The assembly robot toy according to claim 12, wherein the assembly component also comprises a hull, two first lugs arranged at intervals are formed on the hull, and a fourth assembly hole is formed in the first lug;

a number of the fixed plates is two, and the two fixed plates are respectively fixed on a front and rear side walls of the gear box; and the first lug is connected to the fixed plate after passing through the fourth assembly hole through a bolt.

16. The assembly robot toy according to claim 15, wherein the hull comprises a foldable plastic sheet, a first plug connector and a cap body with a third plugging groove, and the first lug is foldably connected to the hull;
the plastic sheet comprises two connected first sheets, and the first lug is located at a position where the two first sheets are connected;
two ends of the first sheet are provided with two second lugs at intervals, a fifth assembly hole is formed in the second lug, and the first plug connector is arranged in the third plugging groove after passing through the fourth assembly holes in the two second lugs at one end of the first sheet.

17. The assembly robot toy according to claim 16, wherein the assembly robot toy is a surfing robot, and the head part is arranged on the front side wall of the gear box;
a numbers of the second cams, the fixed rods, the straight-line connecting rods and the force arm connecting rods are all two, the two second cams are respectively plugged on two transmission rods, the two fixed rods are respectively plugged at non-central positions of two second cams, and the two straight-line connecting rods respectively sleeve two fixed rods;
a number of the arc-shaped connecting rods and the T-shaped connecting rods are four, two ends of every two arc-shaped connecting rods are connected to form a wave-shaped leg part, and one end of each of the two leg parts is respectively connected to two straight-line connecting rods through bolts;
every two T-shaped connecting rods are oppositely arranged side by side through bolts to form a sole piece, and the first sliding hole and the second sliding hole on each T-shaped piece are splayed;
two ends of each force arm connecting rod are respectively connected to the other end of the leg part and one end of the sole piece through bolts, and the middle position of each force arm connecting rod is rotatably connected to the first plug connector through bolts;
a number of the symmetrical semicircular pieces is six, and every three symmetrical semicircular pieces are matched with the bolts to form a paddling arm;
in each paddling arm, one end of each of the three symmetrical semicircular pieces is connected through bolts, the other end of the symmetrical semicircular piece in the middle is arranged on one fixed rod through a bolt, and the central positions of the other two symmetrical semicircular pieces are connected through bolts and away from one side of the fixed plate;
or, the assembly robot toy is a rowing robot, and the head part is arranged on the top of the gear box;
a number of the second cams, the straight-line connecting rods and the force arm connecting rods are all two, the two second cams are respectively fixed on two transmission rods, a number of the arc-shaped connecting rods, the fixed rods and the T-shaped connecting rods are four, the two fixed rods are respectively plugged on two second cams, and the two straight-line connecting rods respectively sleeve two fixed rods;
the two arc-shaped connecting rods are oppositely connected through a bolt to form a rowing paddle;
a number of the rowing paddles is two, and the two rowing paddles are respectively fixed on the fixed rod connected with the first cam;
two ends of the two arc-shaped connecting rods are connected through two fixed rods to form a survival suit piece with a sleeve opening, the gear box is arranged in the sleeve opening, and two sides of the survival suit piece are fixed on the gear box through bolts;
one end of each of the two T-shaped connecting rods is connected to the bolt, connected with the gear box, of the survival suit piece, the other ends of the two T-shaped connecting rods are rotatably connected to the straight-line connecting rod through bolts, one end of each of the two force arm connecting rods is respectively plugged on two sides of the fixed plate, and the two T-shaped connecting rods are respectively corresponding to one force arm connecting rod and are connected through bolts.

18. An assembly robot toy, comprising a gear box, a head part and an assembly component,
wherein the head part and the assembly component are detachably arranged on the gear box, the gear box internally is provided with a gear set, and a motor and a plurality of transmission rods which are respectively connected with the gear set;
first avoidance holes are formed in a left and right side walls of the gear box, a second avoidance hole corresponding to a position of the gear set is formed in a bottom of the gear box,
and at least two of the transmission rods are arranged on an outer side of the gear box after respectively passing through the first avoidance holes in left and right side walls of the gear box;
or, at least two of the transmission rods are respectively arranged near positions of the first avoidance holes in the left and right side walls of the gear box;
the assembly component is connected with the gear set and/or the transmission rod, and the head part is provided with a power supply module which is electrically connected with the motor and used for supplying power to the motor;
and the transmission rod is configured to rotate by transmission of the gear set when the motor is driven,
and at least part of the assembly component is configured to move and drive the gear box to move when the gear set and/or the transmission rod rotate/rotates,
wherein the gear set comprises a first rotating rod, a first straight gear arranged on a rotating shaft of the motor, a first face gear arranged on the first rotating rod and meshed with the first straight gear, and a second straight gear arranged on the first rotating rod and connected with the assembly component;
a number of the transmission rods is two, and the two transmission rods are respectively arranged at two ends of the first rotating rod; and
when the motor drives the first straight gear to rotate, the first rotating rod rotates through the transmission of the first face gear and drives the second straight gear and the transmission rods to rotate;
wherein the head part is rotatably connected with the gear box, and the head part is located at one of top, front and back positions of the gear box;
wherein a first connecting rod and a second connecting rod are arranged between the head part and the gear box, and the first connecting rod is rotatably connected with the second connecting rod; and
the first connecting rod is configured to drive the head part to rotate along a central axis of the first connecting rod under an action of external force, and the second connecting rod is configured to drive the head part to rotate along a direction perpendicular to the central axis of the first connecting rod under the action of external force.

\* \* \* \* \*